(12) United States Patent
Yao et al.

(10) Patent No.: US 12,445,821 B2
(45) Date of Patent: Oct. 14, 2025

(54) APPLICATION RELOCATION METHOD AND APPARATUS

(71) Applicant: Huawei Technologies Co., Ltd., Shenzhen (CN)

(72) Inventors: Qi Yao, Beijing (CN); Zaifeng Zong, Nanjing (CN)

(73) Assignee: HUAWEI TECHNOLOGIES CO., LTD, Shenzhen (CN)

(*) Notice: Subject to any disclaimer, the term of this patent is extended or adjusted under 35 U.S.C. 154(b) by 441 days.

(21) Appl. No.: 18/167,476

(22) Filed: Feb. 10, 2023

(65) Prior Publication Data
US 2023/0188965 A1 Jun. 15, 2023

Related U.S. Application Data

(63) Continuation of application No. PCT/CN2020/111536, filed on Aug. 26, 2020.

(30) Foreign Application Priority Data

Aug. 12, 2020 (WO) ................ PCT/CN2020/108751

(51) Int. Cl.
*H04W 4/60* (2018.01)
*H04W 8/00* (2009.01)
(Continued)

(52) U.S. Cl.
CPC ............. *H04W 4/60* (2018.02); *H04W 8/005* (2013.01); *H04W 36/0033* (2013.01); *H04W 64/00* (2013.01)

(58) Field of Classification Search
CPC . H04W 64/00; H04W 36/0033; H04W 8/005; H04W 4/60
See application file for complete search history.

(56) References Cited

U.S. PATENT DOCUMENTS

2011/0154211 A1* 6/2011 Yu .................... H04W 36/0033
715/737
2019/0037474 A1 1/2019 Xu et al.
(Continued)

FOREIGN PATENT DOCUMENTS

CN 108934007 A 12/2018
CN 110650513 A 1/2020
(Continued)

OTHER PUBLICATIONS

"3rd Generation Partnership Project; Technical Specification Group Services and System Aspects; Study on application architecture for enabling Edge Applications; (Release 17) ," 3GPP TR 23.758 V17.0.0, Technical Report Dec. 2019, 113 pages.
"3rd Generation Partnership Project; Technical Specification Group Services and System Aspects; Procedures for the 5G System (5Gs); Stage 2 (Release 16)," 3GP TS 23.502 V16.5.1, Technical Specification, Aug. 2020, 594 pages.
(Continued)

*Primary Examiner* — Dai Phuong
(74) *Attorney, Agent, or Firm* — Conley Rose, P.C.

(57) ABSTRACT

An application relocation method and apparatus, to accurately determine a determined target AS and therefore reduce a delay in accessing an application server by a UE. A source application function (AF) obtains first information, where the first information is location information of the UE after a user plane path of a protocol data unit (PDU) session of the UE changes. The source AF determines a target application server (AS) based on the first information.

20 Claims, 20 Drawing Sheets

(51) Int. Cl.
*H04W 36/00* (2009.01)
*H04W 64/00* (2009.01)

(56) References Cited

U.S. PATENT DOCUMENTS

| | | | | |
|---|---|---|---|---|
| 2019/0261260 | A1* | 8/2019 | Dao | H04W 48/00 |
| 2020/0329008 | A1* | 10/2020 | Dao | H04L 61/5007 |
| 2022/0329648 | A1* | 10/2022 | De Foy | H04L 67/10 |
| 2023/0337056 | A1* | 10/2023 | Mas Rosique | H04W 28/0858 |

FOREIGN PATENT DOCUMENTS

| | | |
|---|---|---|
| CN | 108886679 B | 7/2020 |
| JP | 2019511177 A | 4/2019 |

OTHER PUBLICATIONS

3GPP TS 23.501 V16.5.1, Aug. 2020, Technical Specification, "3rd Generation Partnership Project; Technical Specification Group Services and System Aspects; System architecture for the 5G System (5GS); Stage 2 (Release 16)," 440 pages.

3GPP TS 23.502 V16.2.0, Sep. 2019, Technical Specification, "3rd Generation Partnership Project; Technical Specification Group Services and System Aspects; Procedures for the 5G System (5GS); Stage 2 (Release 16)," 525 pages.

S2-2004410, Ericsson, "KI#2, New Sol: DNS for AS Discovery at Edge Relocation," 3GPP TSG SA WG2 Meeting #139E, Jun. 1-12, 2020, Electronic Meeting, 6 pages.

S6-200600 (revision of S6-200510), Huawei, et al, "Basic application context relocation procedure," 3GPP TSG-SA WG6 Meeting #36-BIS-e, E-meeting, Mar. 31-Apr. 8, 2020, 4 pages.

* cited by examiner

APPLICATION RELOCATION METHOD AND APPARATUS

CROSS-REFERENCE TO RELATED APPLICATIONS

This is a continuation of International Patent Application No. PCT/CN2020/111536, filed on Aug. 26, 2020, which claims priority to International Patent Application No. PCT/CN2020/108751, filed on Aug. 12, 2020. The disclosures of the aforementioned applications are hereby incorporated by reference in their entireties.

TECHNICAL FIELD

Embodiments of this application relate to the field of communications technologies, and in particular, to an application relocation method and apparatus.

BACKGROUND

In a 5th generation (5G) mobile communication network, an operator or a service provider may locally deploy an application server (AS) to improve user experience and shorten a delay in accessing the application server by a user. When a terminal is in a moving state, a user plane function (UPF) entity and an AS may change.

An application relocation method based on a session and service continuity (SSC) mode 3 is provided in a conventional technology. The SSC mode 3 is characterized by the following: A connection that passes through a new protocol data unit (PDU) session anchor is first established before a connection between a user equipment (UE) and an old PDU session anchor is released, to ensure service continuity. In a relocation process of an existing relocation method, an operating system (OS) in UE needs to notify an application client (app client or AC) after finding that a new PDU session is established. After receiving the notification, the AC triggers domain name system (DNS) query to obtain an address of a new AS. The AC sends the address of the new AS to an old AS to indicate the old AS to perform application relocation. After status synchronization is performed between the old AS and the new AS, the UE starts to send a data packet to the new AS. In the method, when the new AS is determined through the DNS query, the new AS determined based on a DNS query result is not a most appropriate application server because the DNS query result is not accurate enough. As a result, a delay in accessing the new AS by the UE is long after an AS accessed by the UE is relocated to the new AS.

SUMMARY

Embodiments of this application provide an application relocation method and apparatus, to more accurately determine a target AS, and therefore shorten a delay in accessing an application server by a UE.

To achieve the foregoing objective, the following technical solutions are used in embodiments of this application.

A first aspect of embodiments of this application provides an application relocation method. The method includes: A source application function (AF) obtains first information, where the first information is location information of a UE after a user plane path of a PDU session of the UE changes. The source AF determines a target application server (AS) based on the first information. The source AF sends connection information of the target AS to the UE. According to this solution, the source AF determines the target AS based on the location information that is of the UE and that is obtained after the user plane path of the PDU session of the UE changes. Therefore, the determined target AS is accurate, and a delay in accessing the target AS by the UE is short. In other words, a delay in accessing an application server by the UE can be shortened in this solution. It may be understood that, in this solution, a network side device (the source AF) triggers reselection of the target AS and application relocation, and an AC in the UE is not modified. Therefore, the AC does not need to understand network logic, and a design of the AC can be simplified. For example, the source AF in this solution may be a source AS, or may be a source ES. In other words, in this application, the source AS may determine the target AS, or the source ES may determine the target AS.

With reference to the first aspect, in a possible implementation, the target AS and the source AS serve a same application, and the source AS may be an AS that the UE accesses before the user plane path of the PDU session of the UE changes. According to this solution, the target AS determined by the source AF is an AS that serves the same application as the source AS. Therefore, continuity of a service accessed by the UE can be ensured in a movement process of the UE. Optionally, a change of the user plane path of the PDU session of the UE may be understood as a change of a UPF.

With reference to the first aspect and the foregoing possible implementation, in another possible implementation, the location information of the UE is at least one of an Internet Protocol (IP) address of the UE, a data network access identifier (DNAI) corresponding to the user plane path of the PDU session of the UE, a tracking area identity (TAI) of the UE, a cell identifier (cell ID) of the UE, a radio access network identifier (RAN ID) of the UE, or geographic location information of the UE. According to this solution, the source AF may determine the target AS based on the IP address, the DNAI, the TAI, the cell ID, the RAN ID, or the geographic location information of the UE. Therefore, the determined target AS is accurate. It may be understood that the DNAI corresponding to the user plane path of the PDU session of the UE in this application is a DNAI corresponding to a data network accessible by the UE.

With reference to the first aspect and the foregoing possible implementations, in another possible implementation, that the source AF determines a target AS based on the first information includes: The source AF obtains, based on the first information, information about a UPF entity that is used after the user plane path of the PDU session of the UE changes. The source AF determines the target AS based on the information about the UPF entity. According to this solution, the source AF may determine the target AS based on the information about the UPF. Therefore, the determined target AS is accurate, and therefore the delay in accessing the target AS by the UE is short. For example, the information about the UPF may be the DNAI or other information that can identify the UPF. Optionally, the source AF may obtain the information about the UPF by sending a query request to a 5th Generation (5G) Core (5GC) network.

With reference to the first aspect and the foregoing possible implementations, in another possible implementation, the source AF is the foregoing source AS. According to this solution, the source AS may determine the target AS and send the connection information of the target AS to the UE, to shorten the delay in accessing the application server by the UE.

With reference to the first aspect and the foregoing possible implementations, in another possible implementation, that a source AF obtains first information includes: The source AS receives a first notification message from a policy control function (PCF) entity or a session management function SMF entity, where the first notification message notifies the source AS that the user plane path of the PDU session of the UE changes, and the first notification message includes the first information. According to this solution, the source AS may learn, by receiving the first notification message sent by the PCF or the SMF, that the user plane path of the PDU session of the UE changes, such that the source AS can determine the target AS based on the notification message. Optionally, the first notification message may not include the first information. When the first notification message does not include the first information, the source AS may request the first information from a core network element (for example, the PCF or the SMF) after receiving the first notification message, and then determine the target AS based on the first information.

With reference to the first aspect and the foregoing possible implementations, in another possible implementation, the method further includes: The source AS subscribes to a user plane management event notification from the PCF entity or the SMF entity, where the user plane management event notification notifies the source AS when the user plane path of the PDU session of the UE changes. According to this solution, the source AS subscribes to the user plane management event notification from the PCF or the SMF, such that the PCF or the SMF can notify the source AS when determining that the user plane path of the PDU session of the UE changes.

With reference to the first aspect and the foregoing possible implementations, in another possible implementation, that a source AF obtains first information includes: The source AS receives a second notification message from a source enabler server ES, where the second notification message notifies the source AS that the user plane path of the PDU session of the UE changes, and the second notification message includes the first information. According to this solution, the source AS may learn, by receiving the second notification message sent by the source ES, that the user plane path of the PDU session of the UE changes, such that the source AS can determine the target AS based on the notification message and determine to perform application relocation.

With reference to the first aspect and the foregoing possible implementations, in another possible implementation, the method further includes: The source AS subscribes to a user plane management event notification from the source ES, where the user plane management event notification notifies the source AS when the user plane path of the PDU session of the UE changes. According to this solution, the source AS subscribes to the user plane management event notification from the source ES, such that the source ES can notify the source AS when determining that the user plane path of the PDU session of the UE changes. Optionally, the source ES may learn, by subscribing to the user plane management event notification from a core network element or by receiving a notification message sent by the UE, that the user plane path of the PDU session of the UE changes.

With reference to the first aspect and the foregoing possible implementations, in another possible implementation, the method further includes: The source AS sends the connection information of the target AS to the UE. According to this solution, the source AS sends the connection information of the target AS to the UE, such that the UE can establish a connection to the target AS, to shorten the delay in accessing the application server by the UE.

With reference to the first aspect and the foregoing possible implementations, in another possible implementation, the source AF is the source ES. According to this solution, the source ES may determine the target AS and send the connection information of the target AS to the UE, to shorten the delay in accessing the application server by the UE.

With reference to the first aspect and the foregoing possible implementations, in another possible implementation, that a source AF obtains first information includes: The source ES receives a third notification message from a PCF entity or an SMF entity, where the third notification message notifies the source ES that the user plane path of the PDU session of the UE changes, and the third notification message includes the first information. According to this solution, the source ES may learn, by receiving the third notification message sent by the PCF or the SMF, that the user plane path of the PDU session of the UE changes, such that the source ES can determine the target AS based on the notification message.

With reference to the first aspect and the foregoing possible implementations, in another possible implementation, the method further includes: The source ES subscribes to a user plane management event notification from the PCF entity or the SMF entity, where the user plane management event notification notifies the source ES when the user plane path of the PDU session of the UE changes. According to this solution, the source ES subscribes to the user plane management event notification from the PCF or the SMF, such that the PCF or the SMF can notify the source ES when determining that the user plane path of the PDU session of the UE changes.

With reference to the first aspect and the foregoing possible implementations, in another possible implementation, that a source AF obtains first information includes: The source ES receives a fourth notification message sent by an edge enabler client EEC of the UE, where the fourth notification message notifies the source ES that the PDU session of the UE is re-established, and the fourth notification message includes the first information. According to this solution, the source ES may learn, by receiving the fourth notification message sent by the EEC of the UE, that the PDU session of the UE is re-established, such that the source ES can determine the target AS based on the notification message. Therefore, the determined target AS is accurate, and the delay in accessing the application server by the UE is shortened.

With reference to the first aspect and the foregoing possible implementations, in another possible implementation, the method further includes: The source ES sends the connection information of the target AS to the UE. According to this solution, the source ES sends the connection information of the target AS to the UE, such that the UE can establish a connection to the target AS, to shorten the delay in accessing the application server by the UE.

With reference to the first aspect and the foregoing possible implementations, in another possible implementation, the source AF is a configuration server (CS), and the method further includes: The CS receives first indication information from the UE, where the first indication information indicates the CS to send information about a target data network (DN) to the UE when the user plane path of the PDU session of the UE changes. The CS determines the target DN based on the first information. The CS sends the information about the target DN to the UE. According to this solution, the CS determines the target DN based on the location information that is of the UE and that is obtained after the user plane path of the PDU session of the UE changes. Therefore, the determined target AS is accurate, and a delay in accessing a data network by the UE can be shortened after the UE accesses the target DN. For example, when the UE moves, an SMF determines to re-establish the PDU session. The CS may determine the target DN based on location information that is of the UE and that is obtained after the PDU session is re-established, and send the information about the target DN to the UE, such that the UE can access the target DN.

With reference to the first aspect and the foregoing possible implementations, in another possible implementation, that the CS obtains the first information includes: The CS receives second indication information from the UE, where the second indication information indicates that the PDU session of the UE is re-established, and the second indication information includes the first information. According to this solution, the CS may learn, by receiving the indication information of the UE, that the PDU session of the UE is re-established, such that the CS can determine the target DN based on the indication information. Therefore, the determined target AS is accurate, and the delay in accessing the data network by the UE can be shortened after the UE accesses the target DN.

With reference to the first aspect and the foregoing possible implementations, in another possible implementation, that the CS obtains the first information includes: The CS receives a fifth notification message from a PCF entity or an SMF entity, where the fifth notification message notifies the CS that the user plane path of the PDU session of the UE changes, and the fifth notification message includes the first information. According to this solution, the CS may learn, by receiving the notification message from the PCF or the SMF, that the PDU session of the UE is re-established, such that the CS can determine the target DN based on the notification message. Therefore, the determined target AS is accurate.

With reference to the first aspect and the foregoing possible implementations, in another possible implementation, the method further includes: The CS subscribes to a user plane management event notification from the PCF entity or the SMF entity, where the user plane management event notification notifies the CS when the user plane path of the PDU session of the UE changes. According to this solution, the CS subscribes to the user plane management event notification from the PCF or the SMF, such that the PCF or the SMF can notify the CS when determining that the user plane path of the PDU session of the UE changes.

With reference to the first aspect and the foregoing possible implementations, in another possible implementation, a change of the user plane path of the PDU session of the UE includes a change of a PDU session anchor of the UE, and an SSC mode of the PDU session of the UE is a mode 3. According to this solution, the source AF may determine the target AS when the PDU session anchor of the UE changes. Optionally, the data network accessed by the UE may not change if the PDU session anchor of the UE does not change. Therefore, the application relocation may not need to be performed. As a result, in this application, the change of the user plane path of the PDU session of the UE may be understood as the change of the PDU session anchor of the UE.

A second aspect of embodiments of this application provides an application relocation method. The method includes: A source enabler server ES obtains first information, where the first information is location information of UE after a user plane path of a PDU session of the UE changes. The source ES sends a second notification message to a source AS, where the second notification message notifies the source AS that the user plane path of the PDU session of the UE changes, and the source AS is an AS that the UE accesses before the user plane path of the PDU session of the UE changes. According to this solution, the source ES notifies the source AS that the user plane path of the PDU session of the UE changes, such that the source AS can determine a target AS. It may be understood that the source AS may determine the target AS based on the first information. Therefore, the determined target AS is accurate, and a delay in accessing the target AS by the UE is short. In other words, a delay in accessing an application server by the UE can be shortened in this solution. It may be understood that, in this solution, the source AS may trigger reselection of the target AS and application relocation, and an AC in the UE is not modified. Therefore, the AC does not need to understand network logic, and a design of the AC can be simplified.

With reference to the second aspect, in a possible implementation, the location information of the UE is at least one of an IP address of the UE, a DNAI corresponding to the user plane path of the PDU session of the UE, a TAI of the UE, a cell ID of the UE, a radio access network identifier (RAN ID) of the UE, or geographic location information of the UE. According to this solution, the source AS may determine the target AS based on the IP address, the DNAI, the TAI, the cell ID, the RAN ID, or the geographic location information of the UE. Therefore, the determined target AS is accurate.

With reference to the second aspect and the foregoing possible implementation, in another possible implementation, the method further includes: The source ES receives a request from the source AS for subscribing to a user plane management event notification, where the user plane management event notification notifies the source AS when the user plane path of the PDU session of the UE changes. According to this solution, the source AS subscribes to the user plane management event notification from the source ES, such that the source ES can notify the source AS when determining that the user plane path of the PDU session of the UE changes.

With reference to the second aspect and the foregoing possible implementations, in another possible implementation, that a source ES obtains first information includes: The source ES receives a fourth notification message sent by an edge enabler client EEC of the UE, where the fourth notification message notifies the source ES that the PDU session of the UE is re-established, and the fourth notification message includes the first information. According to this solution, the source ES may learn, by receiving the fourth notification message sent by the EEC of the UE, that the PDU session of the UE is re-established, such that the source ES can notify the source AS that the user plane path of the PDU session of the UE changes.

With reference to the second aspect and the foregoing possible implementations, in another possible implementation, a change of the user plane path of the PDU session of the UE includes a change of a PDU session anchor of the UE, and an SSC mode of the PDU session of the UE is a mode 3. According to this solution, because the SSC mode of the PDU session of the UE is the mode 3, the source ES can notify the source AS after the PDU session anchor of the UE changes, such that the source AS can determine the target AS and trigger the application relocation. The determined target AS is accurate, and the delay in accessing the application server by the UE is shortened. In addition, in this solution, the source AS may trigger the reselection of the target AS and the application relocation, and the AC in the UE is not modified. Therefore, the AC does not need to understand the network logic, and the design of the AC can be simplified.

A third aspect of embodiments of this application provides an application relocation method. The method includes: An edge enabler client EEC of UE subscribes to a session re-establishment event notification from an operating system OS of the UE, where the session re-establishment event notification notifies the EEC when a PDU session of the UE is re-established. The EEC receives a sixth notification message from the OS, where the sixth notification message notifies the EEC that the PDU session of the UE is re-established, the sixth notification message includes first information, and the first information is location information that is of the UE and that is obtained after the PDU session is re-established. According to this solution, the EEC in the UE subscribes to the session re-establishment event notification from the OS in the UE, such that the OS in the UE can notify the EEC in the UE when the PDU session of the UE is re-established, and therefore the EEC learns of related user plane information. Optionally, the EEC in the UE may determine a target AS based on the first information (the location information of the UE). Therefore, the determined target AS is accurate, and a delay in accessing the target AS by the UE is short. In other words, a delay in accessing an application server by the UE can be shortened in this solution. In addition, in the method, an AC in the UE does not need to understand network logic, and a design of the AC can be simplified.

With reference to the third aspect, in a possible implementation, the location information of the UE is at least one of an IP address of the UE, a DNAI corresponding to a user plane path of the PDU session of the UE, a TAI of the UE, a cell ID of the UE, a RAN ID of the UE, or geographic location information of the UE. According to this solution, the EEC may determine the target AS based on the IP address, the DNAI, the TAI, the cell ID, the RAN ID, or the geographic location information of the UE. Therefore, the determined target AS is accurate.

With reference to the third aspect and the foregoing possible implementation, in another possible implementation, the method further includes: The EEC sends a fourth notification message to a source enabler server ES, where the fourth notification message notifies the source ES that the PDU session of the UE is re-established, and the fourth notification message includes the first information. According to this solution, the EEC in the UE notifies the source ES that the PDU session of the UE is re-established, such that the source ES can determine the target AS based on the notification message sent by the EEC and perform application relocation. The target AS determined in this method is accurate, and therefore the delay in accessing the target AS by the UE is short. In addition, in the method, the AC in the UE does not need to understand the network logic, and the design of the AC can be simplified.

With reference to the third aspect and the foregoing possible implementation, in another possible implementation, the method further includes: The EEC determines the target AS based on the first information, where the target AS and a source AS serve a same application, and the source AS is an AS that the UE accesses before the PDU session of the UE is re-established. According to this solution, the EEC in the UE may autonomously determine the target AS when learning that the user plane path of the PDU session of the UE changes. In this way, the determined target AS is accurate, and the AC in the UE does not need to understand the network logic, such that the design of the AC can be simplified.

With reference to the third aspect and the foregoing possible implementations, in another possible implementation, that the EEC determines the target AS based on the first information includes: The EEC determines a target ES based on the first information. The EEC sends a discovery request to the target ES. The EEC receives a first message from the target ES, where the first message includes connection information of one or more ASs managed by the target ES, and the one or more ASs managed by the target ES serve the same application as the source AS. The EEC determines the target AS from the one or more ASs managed by the target ES. According to this solution, the EEC in the UE may determine the target AS from the one or more ASs managed by the target ES, such that the target AS can be accessed. Therefore, the determined target AS is accurate, and the delay in accessing the target AS by the UE is short. In addition, in this solution, the AC in the UE does not need to be modified, such that the design of the AC is simplified.

With reference to the third aspect and the foregoing possible implementations, in another possible implementation, the method further includes: The EEC sends connection information of the target AS to the source AS or a source ES, such that the source AS or the source ES relocates a context of the UE from the source AS to the target AS. According to this solution, the source AS or the source ES may relocate the context of the UE from the source AS to the target AS, such that logic of the AC in the UE does not need to be enhanced, thereby simplifying the design of the AC.

With reference to the third aspect and the foregoing possible implementations, in another possible implementation, a change of the user plane path of the PDU session of the UE includes re-establishment of the PDU session of the UE. According to this solution, the OS in the UE can notify the EEC in the UE when the PDU session of the UE is re-established. In this method, the AC in the UE does not need to understand the network logic, and the design of the AC can be simplified.

With reference to the third aspect and the foregoing possible implementations, in another possible implementation, a change of the user plane path of the PDU session of the UE includes a change of a PDU session anchor of the UE, and an SSC mode of the PDU session of the UE is a mode 3. According to this solution, because the SSC mode of the PDU session of the UE is the mode 3, after the PDU session anchor of the UE changes, the target AS can be determined and the application relocation can be performed, to shorten the delay in accessing the application server by the UE.

A fourth aspect of embodiments of this application provides an application relocation method. The method includes: A source AS sends a subscription request to a source enabler server ES, where the subscription request indicates to notify the source AS when the source ES determines that a target AS exists. The source AS receives a seventh notification message from the source ES, where the seventh notification message includes connection information of the target AS. The source AS determines to relocate a context of UE from the source AS to the target AS. For example, the target AS and the source AS serve a same application. According to this solution, the source AS sends the subscription request to the source ES, such that when determining that the target AS exists in a DN accessible by the UE, the source ES can send the notification message including the connection information of the target AS to the source AS; and then the source AS triggers application relocation. After a user plane path of a PDU session of the UE changes, an AS that serves the same application as the source AS may not be deployed in the data network accessible by the UE. Therefore, the subscription request is sent, such that the source ES can notify the source AS when determining that the AS that serves the same application as the source AS exists in the data network accessible by the UE, to initiate the application relocation. Therefore, an invalid notification in an application relocation process can be reduced, to shorten a delay.

With reference to the fourth aspect, in a possible implementation, the method further includes: The source AS sends fourth indication information to the source ES, where the fourth indication information indicates the source ES to relocate the context of the UE from the source AS to the target AS. According to this solution, the source AS sends, to the source ES, the indication information indicating the source ES to relocate the context of the UE from the source AS to the target AS, such that the source ES can relocate the context of the UE from the source AS to the target AS. This can shorten a delay in accessing an application server by the UE.

With reference to the fourth aspect, in a possible implementation, the method further includes: The source AS sends an application relocation request message to the target AS, where the application relocation request message is for relocating the context on the source AS to the target AS. According to this solution, the source AS sends the application relocation request message to the target AS, such that the target AS can relocate the context on the source AS to the target AS, to shorten the delay in accessing the application server by the UE.

With reference to the fourth aspect, in a possible implementation, the method further includes: The source AS receives an application relocation response message from the target AS, where the application relocation response message includes third indication information, and the third indication information indicates whether the target AS agrees application relocation. Correspondingly, that the source AS determines to relocate a context of UE from the source AS to the target AS includes: If the third indication information indicates that the target AS agrees application relocation, the source AS determines to relocate the context of the UE from the source AS to the target AS. According to this solution, the target AS may send the application relocation response message to the source AS, such that the application relocation is determined to be triggered when the target AS agrees application relocation, to avoid a relocation failure.

With reference to the fourth aspect and the foregoing possible implementations, in another possible implementation, the method further includes: The source AS sends fifth indication information to the source ES, where the fifth indication information indicates whether the source AS supports the application relocation. According to this solution, the source ES can learn whether the source AS supports the application relocation. If the source ES determines that the source AS supports the application relocation, the source ES may perform application relocation after determining that the target AS exists in the data network accessible by the UE.

With reference to the fourth aspect and the foregoing possible implementations, in another possible implementation, the method further includes: The source AS sends seventh indication information to the source ES, where the seventh indication information indicates that service continuity needs to be maintained during the application relocation. According to this solution, the source AS sends the seventh indication information to the source ES, such that when a DNAI changes, a forwarding tunnel between UPFs can be established for the service continuity, to help the UE send application data to the source AS.

A fifth aspect of embodiments of this application provides an application relocation method. The method includes: A source enabler server ES receives a subscription request from a source AS, where the subscription request indicates to notify the source AS when the source ES determines that a target AS exists. The source ES obtains first information, where the first information is location information of UE after a user plane path of a PDU session of the UE changes. The source ES determines the target AS based on the first information. For example, the target AS and the source AS serve a same application. According to this solution, the source AS sends the subscription request to the source ES, such that when determining that the target AS exists in a DN accessible by the UE, the source ES can send a notification message including connection information of the target AS to the source AS. After the user plane path of the PDU session of the UE changes, an AS that serves the same application as the source AS may not be deployed in the data network accessible by the UE. Therefore, the subscription request is sent, such that the source ES can notify the source AS when determining that the AS that serves the same application as the source AS exists in the data network accessible by the UE, to initiate application relocation. Therefore, an invalid notification in an application relocation process can be reduced, to shorten a delay.

With reference to the fifth aspect, in a possible implementation, the source ES sends a seventh notification message to the source AS, where the seventh notification message includes the connection information of the target AS. According to this solution, the source AS sends the subscription request to the source ES, such that when determining that the target AS exists in the DN accessible by the UE, the source ES can send the notification message including the connection information of the target AS to the source AS. It may be understood that the source ES sends the seventh notification message to the source AS when determining that the target AS exists.

With reference to the fifth aspect and the foregoing possible implementation, in another possible implementation, the location information of the UE is at least one of an IP address of the UE, a DNAI corresponding to the user plane path of the PDU session of the UE, a TAI of the UE, a cell ID of the UE, a RAN ID of the UE, or geographic location information of the UE. According to this solution, the source ES may determine, based on the IP address, the DNAI, the TAI, the cell ID, the RAN ID, or the geographic location information of the UE, that the target AS exists in the DN accessible by the UE. Therefore, a determining result is accurate.

With reference to the fifth aspect and the foregoing possible implementations, in another possible implementation, that the source ES obtains first information includes: The source ES receives a third notification message from a PCF entity or an SMF entity, where the third notification message notifies the source ES that the user plane path of the PDU session of the UE changes, and the third notification message includes the first information. According to this solution, the source ES may learn, by receiving the third notification message sent by the PCF or the SMF, that the user plane path of the PDU session of the UE changes, such that the source ES can determine, based on the notification message, that the target AS exists in the DN accessible by the UE.

With reference to the fifth aspect and the foregoing possible implementations, in another possible implementation, the method further includes: The source ES subscribes to a user plane management event notification from the PCF entity or the SMF entity, where the user plane management event notification notifies the source ES when the user plane path of the PDU session of the UE changes. According to this solution, the source ES subscribes to the user plane management event notification from the PCF or the SMF, such that the PCF or the SMF can notify the source ES when determining that the user plane path of the PDU session of the UE changes.

With reference to the fifth aspect and the foregoing possible implementations, in another possible implementation, the subscription request includes information about the PDU session of the UE, and the information about the PDU session of the UE includes at least one of the IP address of the UE, a data network name DNN, or single network slice selection assistance information S-NSSAI. According to this solution, the subscription request carries the information about the PDU session of the UE, such that the source ES can identify, based on the information about the PDU session of the UE, a 5GC network element accessed by the UE.

With reference to the fifth aspect and the foregoing possible implementations, in another possible implementation, the method further includes: The source ES determines the PCF entity or the SMF entity based on the information about the PDU session of the UE. According to this solution, the source ES can determine, based on the information about the PDU session of the UE, the PCF entity or the SMF entity accessed by the UE.

With reference to the fifth aspect and the foregoing possible implementations, in another possible implementation, the subscription request includes application identification information; and that the source ES determines the target AS based on the first information includes: The source ES determines the target AS based on the first information and the application identification information. According to this solution, the source ES may determine the target AS based on the first information and the application identification information. Therefore, the determined target AS is accurate, and a delay in accessing an application server by the UE can be shortened.

With reference to the fifth aspect and the foregoing possible implementations, in another possible implementation, the method further includes: The source ES sends sixth indication information to the SMF, where the sixth indication information indicates whether the source AS supports the application relocation. According to this solution, the source ES sends, to a 5GC, the indication information indicating whether the source AS supports the application relocation, such that in a scenario in which the source AS does not support the application relocation, the 5GC can terminate switching of the user plane path of the PDU session of the UE.

With reference to the fifth aspect and the foregoing possible implementations, in another possible implementation, the method further includes: The source ES receives seventh indication information from the source AS, where the seventh indication information indicates that service continuity needs to be maintained during the application relocation. According to this solution, when the DNAI changes, a forwarding tunnel between UPFs can be established for the service continuity, to help the UE send application data to the source AS.

With reference to the fifth aspect and the foregoing possible implementations, in another possible implementation, the method further includes: The source ES sends eighth indication information to the SMF or the PCF, where the eighth indication information indicates that the service continuity needs to be maintained during the application relocation. According to this solution, the source ES sends the eighth indication information to the SMF or the PCF, such that the 5GC network element can release the forwarding tunnel after the application relocation is completed.

With reference to the fifth aspect and the foregoing possible implementations, in another possible implementation, the method further includes: The source ES sends the connection information of the target AS to the SMF or the PCF. According to this solution, the source ES sends the connection information of the target AS to the SMF or the PCF, such that the SMF or the PCF can send the connection information of the target AS to the UE. Therefore, the UE can establish a connection to the target AS, to shorten the delay in accessing the application server by the UE.

A sixth aspect of embodiments of this application provides an application relocation method. The method includes: A CS receives first indication information from UE, where the first indication information indicates the CS to send information about a target DN to the UE when a user plane path of a PDU session of the UE changes. The CS obtains first information, where the first information is location information that is of the UE and that is obtained after the user plane path of the PDU session of the UE changes. The CS determines the target DN based on the first information. The CS sends the information about the target DN to the UE. According to this solution, the CS determines the target DN based on the location information that is of the UE and that is obtained after the user plane path of the PDU session of the UE changes. Therefore, a determined target AS is accurate, and a delay in accessing a data network by the UE can be shortened after the UE accesses the target DN. Optionally, an SSC mode of the PDU session of the UE may be a mode 3. When the SSC mode of the PDU session of the UE may be the mode 3, a change of the user plane path of the PDU session of the UE includes re-establishment of the PDU session of the UE.

With reference to the sixth aspect, in a possible implementation, the location information of the UE is at least one of an IP address of the UE, a DNAI corresponding to the user plane path of the PDU session of the UE, a TAI of the UE, a cell ID of the UE, a RAN ID of the UE, or geographic location information of the UE. According to this solution, the CS may determine the target DN based on the IP address, the DNAI, the TAI, the cell ID, the RAN ID, or the geographic location information of the UE. Therefore, a determining result is accurate.

With reference to the sixth aspect and the foregoing possible implementation, in another possible implementation, that the CS obtains first information includes: The CS receives second indication information from the UE, where the second indication information indicates that the PDU session of the UE is re-established, and the second indication information includes the first information. According to this solution, the CS may learn, by receiving the indication information of the UE, that the PDU session of the UE is re-established, such that the CS can determine the target DN based on the indication information. Therefore, the determined target AS is accurate, and the delay in accessing the data network by the UE can be shortened after the UE accesses the target DN.

With reference to the sixth aspect and the foregoing possible implementations, in another possible implementation, that the CS obtains first information includes: The CS receives a fifth notification message from a PCF entity or an SMF entity, where the fifth notification message notifies the CS that the user plane path of the PDU session of the UE changes, and the fifth notification message includes the first information. According to this solution, the CS may learn, by receiving the notification message from the PCF or the SMF, that the PDU session of the UE is re-established, such that the CS can determine the target DN based on the notification message. Therefore, the determined target AS is accurate.

With reference to the sixth aspect and the foregoing possible implementations, in another possible implementation, the method further includes: The CS subscribes to a user plane management event notification from the PCF entity or the SMF entity, where the user plane management event notification notifies the CS when the user plane path of the PDU session of the UE changes. According to this solution, the CS subscribes to the user plane management event notification from the PCF or the SMF, such that the PCF or the SMF can notify the CS when determining that the user plane path of the PDU session of the UE changes.

With reference to the sixth aspect and the foregoing possible implementations, in another possible implementation, the change of the user plane path of the PDU session of the UE includes the re-establishment of the PDU session of the UE. According to this solution, the CS may determine the target DN when the PDU session of the UE is re-established. Optionally, a data network accessed by the UE may not change if the PDU session of the UE is not re-established. Therefore, application relocation may not need to be performed. As a result, in this application, the change of the user plane path of the PDU session of the UE may be considered as the re-establishment of the PDU session of the UE.

With reference to the sixth aspect and the foregoing possible implementations, in another possible implementation, the change of the user plane path of the PDU session of the UE includes a change of a PDU session anchor of the UE, and the SSC mode of the PDU session of the UE is the mode 3. According to this solution, because the SSC mode of the PDU session of the UE is the mode 3, the target DN can be determined after the PDU session of the UE is re-established.

A seventh aspect of embodiments of this application provides an application relocation method. The method includes: A CS obtains first information, where the first information is location information of UE after a user plane path of a PDU session of the UE changes. The CS determines a target enabler server ES based on the first information. According to this solution, the CS determines the target ES based on the location information that is of the UE and that is obtained after the user plane path of the PDU session of the UE changes. Therefore, the determined target ES is accurate, such that a target AS determined based on the target ES is accurate, and a delay in accessing the target AS by the UE is short. In other words, a delay in accessing an application server by the UE can be shortened in this solution.

With reference to the seventh aspect, in a possible implementation, the location information of the UE includes at least one of an IP address of the UE, a DNAI corresponding to the user plane path of the PDU session of the UE, a TAI of the UE, a cell identifier of the UE, a radio access network identifier of the UE, or geographic location information of the UE. According to this solution, the CS may determine the target ES based on the IP address, the DNAI, the TAI, the cell ID, the RAN ID, or the geographic location information of the UE. Therefore, the determined target ES is accurate.

With reference to the seventh aspect and the foregoing possible implementation, in another possible implementation, that a CS obtains first information includes: The CS receives the first information from the UE. According to this solution, the CS may receive, from the UE, the location information that is of the UE and that is obtained after the user plane path of the PDU session of the UE changes, such that the target ES determined by the CS based on the location information of the UE is accurate, and the delay in accessing the application server by the UE is shortened.

With reference to the seventh aspect and the foregoing possible implementations, in another possible implementation, the method further includes: The CS sends connection information of the target ES to the UE. According to this solution, the CS sends the connection information of the target ES to the UE, such that the UE can request the target AS based on the connection information of the target ES, to shorten the delay in accessing the application server by the UE.

With reference to the seventh aspect and the foregoing possible implementation, in another possible implementation, that a CS obtains first information includes: The CS receives the first information from a source ES. According to this solution, the CS may receive, from the source ES, the location information that is of the UE and that is obtained after the user plane path of the PDU session of the UE changes, such that the target ES determined by the CS based on the location information of the UE is accurate, and the delay in accessing the application server by the UE is shortened.

With reference to the seventh aspect and the foregoing possible implementations, in another possible implementation, the method further includes: The CS sends connection information of the target ES to the source ES. According to this solution, the CS sends the connection information of the target ES to the source ES, such that the UE can request the target AS based on the connection information of the target ES, to shorten the delay in accessing the application server by the UE.

With reference to the seventh aspect and the foregoing possible implementations, in another possible implementation, the first information is the IP address that is of the UE and that is obtained after the user plane path of the PDU session of the UE changes. That the CS determines a target ES based on the first information includes: The CS determines, based on the IP address that is of the UE and that is obtained after the user plane path of the PDU session of the UE changes, the DNAI that is obtained after the user plane path of the PDU session of the UE changes. The CS determines the target ES based on the DNAI. According to this solution, the CS may determine the DNAI based on the IP address of the UE, and then determine the target ES based on the DNAI. Therefore, the determined target ES is accurate.

With reference to the seventh aspect and the foregoing possible implementations, in another possible implementation, a change of the user plane path of the PDU session of the UE includes a change of a PDU session anchor of the UE, and an SSC mode of the UE is a mode 3. According to this solution, the SSC mode of the PDU session of the UE is the mode 3, and the change of the user plane path of the PDU session of the UE includes the change of the PDU session anchor of the UE. In other words, in this solution, when the PDU session anchor of the UE changes, the target ES is determined based on the location information that is of the UE and that is obtained after the session anchor changes. Therefore, the determined target ES is accurate.

An eighth aspect of embodiments of this application provides an application relocation method. The method includes: A source enabler server ES obtains first information, where the first information is location information of UE after a user plane path of a PDU session of the UE changes. The source ES sends the first information to a CS. The source ES receives connection information of a target ES from the CS. According to this solution, the source ES sends the first information to the CS, such that the CS can determine the target ES based on the first information. Therefore, the determined target ES is accurate, and a delay in accessing an application server by the UE can be shortened.

With reference to the eighth aspect, in a possible implementation, the location information of the UE includes at least one of an IP address of the UE, a DNAI corresponding to the user plane path of the PDU session of the UE, a TAI of the UE, a cell identifier of the UE, a radio access network identifier of the UE, or geographic location information of the UE. According to this solution, the CS may determine the target ES based on the IP address, the DNAI, the TAI, the cell ID, the RAN ID, or the geographic location information of the UE. Therefore, the determined target ES is accurate.

With reference to the eighth aspect and the foregoing possible implementation, in another possible implementation, that a source ES obtains first information includes: The source ES receives the first information from the UE. According to this solution, the source ES receives the first information from the UE, and sends the first information to the CS, such that the CS can accurately determine the target ES based on the first information.

With reference to the eighth aspect and the foregoing possible implementation, in another possible implementation, that a source ES obtains first information includes: The source ES receives a third notification message from a PCF entity or an SMF entity, where the third notification message notifies the source ES that the user plane path of the PDU session of the UE changes, and the third notification message includes the first information. According to this solution, the source ES may alternatively obtain the first information from a 5GC network element, and send the first information to the CS, such that the CS can accurately determine the target ES based on the first information.

With reference to the eighth aspect and the foregoing possible implementations, in another possible implementation, the source ES subscribes to a user plane management event notification from the PCF entity or the SMF entity, where the user plane management event notification notifies the source ES when the user plane path of the PDU session of the UE changes. According to this solution, the source ES may subscribe to the user plane management event notification from the 5GC network element, to learn that the user plane path of the PDU session of the UE changes, and obtain the location information that is of the UE and that is obtained after the user plane path changes.

With reference to the eighth aspect and the foregoing possible implementations, in another possible implementation, the method further includes: The source ES sends a first application discovery request to the target ES, where the first application discovery request requests to obtain a target AS. The source ES receives connection information of the target AS from the target ES. According to this solution, the source ES may send the first application discovery request to the target ES, to obtain information about the target AS from the target ES.

With reference to the eighth aspect and the foregoing possible implementations, in another possible implementation, the target AS and a source AS serve a same application, and the source AS is an AS that the UE accesses before the user plane path of the PDU session of the UE changes. According to this solution, the target AS determined by the target ES is an AS that serves the same application as the source AS. Therefore, continuity of a service accessed by the UE can be ensured in a movement process of the UE.

With reference to the eighth aspect and the foregoing possible implementations, in another possible implementation, the method further includes: The source ES sends the connection information of the target AS to the UE. According to this solution, the source ES sends the connection information of the target AS to the UE, such that the UE can establish a connection to the target AS, and a context of the UE is relocated from the source AS to the target AS, to shorten the delay in accessing the application server by the UE.

A ninth aspect of embodiments of this application provides an application relocation method. The method includes: UE receives first information from an SMF entity or a UPF entity, where the first information is location information of the UE after a user plane path of a PDU session of the UE changes. The UE sends the first information to an AF. The AF may be a CS or a source ES. According to this solution, the UE sends, to the CS or the source ES, the location information that is of the UE and that is obtained after the user plane path of the PDU session of the UE changes, such that the CS can determine a target ES based on the location information of the UE. Therefore, the determined target ES is accurate. Further, a target AS determined based on the target ES is accurate, and a delay in accessing the target AS by the UE is short. In other words, a delay in accessing an application server by the UE can be shortened in this solution.

With reference to the ninth aspect, in a possible implementation, the location information of the UE includes at least one of an IP address of the UE, a DNAI corresponding to the user plane path of the PDU session of the UE, a TAI of the UE, a cell identifier of the UE, a radio access network identifier of the UE, or geographic location information of the UE. According to this solution, the UE may send the IP address, the DNAI, the TAI, the cell ID, the RAN ID, or the geographic location information of the UE to the AF, such that the CS can determine the target ES based on the foregoing information. Therefore, the determined target ES is accurate.

With reference to the ninth aspect and the foregoing possible implementation, in another possible implementation, the AF is the CS, and the method further includes: The UE receives connection information of the target enabler server ES from the CS. According to this solution, the CS may determine the target ES based on the location information that is of the UE and that is obtained after the user plane path of the PDU session changes, and send the connection information of the target ES to the UE, such that the UE can request the target AS from the target ES, and establish a connection to the target AS, to shorten the delay in accessing the application server by the UE.

With reference to the ninth aspect and the foregoing possible implementations, in another possible implementation, the method further includes: The UE sends a second application discovery request to the target ES, where the second application discovery request requests to obtain the target AS. The UE receives connection information of the target AS from the target ES. According to this solution, the UE may request the target AS from the target ES, such that the UE can establish the connection to the target AS, to shorten the delay in accessing the application server by the UE.

With reference to the ninth aspect and the foregoing possible implementation, in another possible implementation, the AF is the source ES. According to this solution, the UE sends, to the source ES, the location information that is of the UE and that is obtained after the user plane path of the PDU session of the UE changes, such that the source ES can send the location information to the CS, and the CS can determine the target ES based on the location information of the UE. Therefore, the determined target ES is accurate. Further, the target AS determined based on the target ES is accurate, and the delay in accessing the target AS by the UE is short. In other words, the delay in accessing the application server by the UE can be shortened in this solution.

With reference to the ninth aspect and the foregoing possible implementations, in another possible implementation, the method further includes: The UE receives connection information of the target AS from the source ES. According to this solution, the UE may obtain the connection information of the target AS from the source ES, such that the UE can establish a connection to the target AS, to shorten the delay in accessing the application server by the UE.

A tenth aspect of embodiments of this application provides an application relocation method. The method includes: A source AS subscribes to an available-AS notification from a source enabler server ES, where the available-AS notification notifies the source AS when the source ES determines that a target AS exists in a DN accessible by UE. The source AS receives a seventh notification message from the source ES, where the seventh notification message includes address information of the target AS. The source AS determines to relocate an AS accessed by the UE from the source AS to the target AS. For example, the target AS and the source AS serve a same application. According to this solution, the source AS subscribes to the available-AS notification from the source ES, such that when determining that the target AS exists in the DN accessible by the UE, the source ES can send the notification message including the address information of the target AS to the source AS, and then the source AS triggers application relocation. After a user plane path of a PDU session of the UE changes, an AS that serves the same application as the source AS may not be deployed in the data network accessible by the UE. Therefore, the available-AS notification is subscribed to, such that the source ES can notify the source AS when determining that the AS that serves the same application as the source AS exists in the data network accessible by the UE, to initiate the application relocation. Therefore, an invalid notification in an application relocation process can be reduced, to shorten a delay.

With reference to the tenth aspect, in a possible implementation, the method further includes: The source AS sends an application relocation request message to the target AS. The source AS receives an application relocation response message from the target AS, where the application relocation response message includes third indication information, and the third indication information indicates whether the target AS agrees application relocation. According to this solution, the source AS may send the application relocation request message to the target AS, and determine, when the target AS agrees application relocation, to trigger the application relocation, such that a relocation failure can be avoided.

With reference to the tenth aspect and the foregoing possible implementation, in another possible implementation, that the source AS determines to relocate an AS accessed by the UE from the source AS to the target AS includes: If the third indication information indicates that the target AS agrees application relocation, the source AS determines to relocate the AS accessed by the UE from the source AS to the target AS. According to this solution, the source AS may determine, when the target AS agrees application relocation, to trigger the application relocation, such that the relocation failure can be avoided.

An eleventh aspect of embodiments of this application provides an application relocation method. The method includes: A source enabler server ES receives an available-AS notification subscribed to by a source AS, where the available-AS notification notifies the source AS when the source ES determines that a target AS exists in a DN accessible by UE. The source ES obtains first information, where the first information is location information of the UE after a user plane path of a PDU session of the UE changes. The source ES determines, based on the first information, that the target AS exists in the DN accessible by the UE. The source ES sends a seventh notification message to the source AS, where the seventh notification message includes address information of the target AS. For example, the target AS and the source AS serve a same application. According to this solution, the source AS subscribes to the available-AS notification from the source ES, such that when determining that the target AS exists in the DN accessible by the UE, the source ES can send the notification message including the address information of the target AS to the source AS. After the user plane path of the PDU session of the UE changes, an AS that serves the same application as the source AS may not be deployed in the data network accessible by the UE. Therefore, the available-AS notification is subscribed to, such that the source ES can notify the source AS when determining that the AS that serves the same application as the source AS exists in the data network accessible by the UE, to initiate application relocation. Therefore, an invalid notification in an application relocation process can be reduced, to shorten a delay. It may be understood that the source ES sends the seventh notification message to the source AS when determining that the target AS exists in the DN accessible by the UE.

With reference to the eleventh aspect, in a possible implementation, the location information of the UE is at least one of an IP address of the UE, a DNAI corresponding to the data network accessible by the UE, a TAI of the UE, a cell ID of the UE, a RAN ID of the UE, or geographic location information of the UE. According to this solution, the source ES may determine, based on the IP address, the DNAI, the TAI, the cell ID, the RAN ID, or the geographic location information of the UE, that the target AS exists in the DN accessible by the UE. Therefore, a determining result is accurate.

With reference to the eleventh aspect and the foregoing possible implementation, in another possible implementation, that the source ES obtains first information includes: The source ES receives a third notification message from a PCF entity or an SMF entity, where the third notification message notifies the source ES that the user plane path of the PDU session of the UE changes, and the third notification message includes the first information. According to this solution, the source ES may learn, by receiving the third notification message sent by the PCF or the SMF, that the user plane path of the PDU session of the UE changes, such that the source ES can determine, based on the notification message, that the target AS exists in the DN accessible by the UE.

With reference to the eleventh aspect and the foregoing possible implementations, in another possible implementation, the method further includes: The source ES subscribes to a user plane management event notification from the PCF entity or the SMF entity, where the user plane management event notification notifies the source ES when the user plane path of the PDU session of the UE changes. According to this solution, the source ES subscribes to the user plane management event notification from the PCF or the SMF, such that the PCF or the SMF can notify the source ES when determining that the user plane path of the PDU session of the UE changes.

A twelfth aspect of embodiments of this application provides a communication system. The communication system includes a source AS and a source enabler server ES. The source AS subscribes to a user plane management event notification from the source ES, where the user plane management event notification notifies the source AS when a user plane path of a PDU session of UE changes, and the source AS is an AS that the UE accesses before the user plane path of the PDU session changes. The source ES obtains first information, where the first information is location information that is of the UE and that is obtained after the user plane path of the PDU session of the UE changes. The source ES sends a second notification message to the source AS, where the second notification message notifies the source AS that the user plane path of the PDU session of the UE changes, and the second notification message includes the first information. The source AS determines a target AS based on the first information, and sends connection information of the target AS to the UE.

With reference to the twelfth aspect, in a possible implementation, the communication system further includes the UE. The UE receives the connection information of the target AS from the source AS. The UE establishes a connection to the target AS based on the connection information of the target AS.

A thirteenth aspect of embodiments of this application provides an application relocation apparatus. The application relocation apparatus has a function of implementing the application relocation method according to any one of the first aspect to the ninth aspect. The function may be implemented by hardware, or may be implemented by hardware executing corresponding software. The hardware or the software includes one or more modules corresponding to the foregoing function.

A fourteenth aspect of embodiments of this application provides an application relocation apparatus, including a processor, a memory, a bus, and a communication interface. The memory is configured to store computer-executable instructions. The processor is connected to the memory through the bus. When the application relocation apparatus runs, the processor executes the computer-executable instructions stored in the memory, such that the application relocation apparatus performs the application relocation method according to any one of the first aspect to the ninth aspect.

A fifteenth aspect of embodiments of this application provides a computer-readable storage medium. The computer-readable storage medium stores instructions. When the instructions are run on a computer, the computer is enabled to perform the application relocation method according to any one of the first aspect to the ninth aspect.

A sixteenth aspect of embodiments of this application provides a computer program product including instructions. When the computer program product runs on a computer, the computer is enabled to perform the application relocation method according to any one of the first aspect to the ninth aspect.

A seventeenth aspect of embodiments of this application provides a system-on-a-chip. The system-on-a-chip includes a processor and a memory. The memory stores instructions. When the instructions are executed by the processor, the application relocation method according to any one of the first aspect to the ninth aspect is implemented.

DESCRIPTION OF EMBODIMENTS

Figure 1:
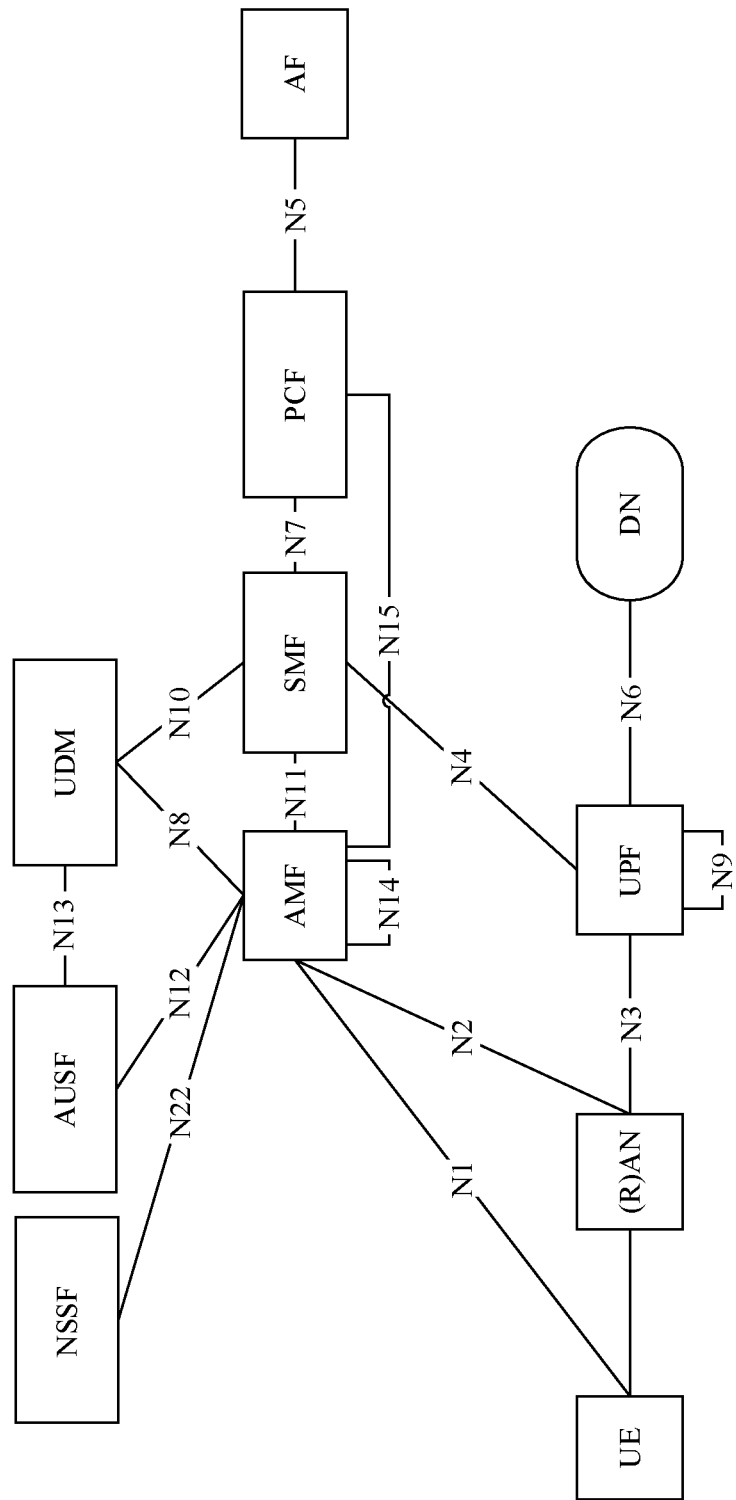
FIG. 1 is a schematic diagram of an architecture of a 5G network according to an embodiment of this application.

The following describes technical solutions in embodiments of this application with reference to the accompanying drawings in embodiments of this application. In this application, "at least one" means one or more, and "a plurality of" means two or more. The term "and/or" describes an association relationship between associated objects and represents that three relationships may exist. For example, A and/or B may represent the following cases: Only A exists, both A and B exist, and only B exists, where A and B may be singular or plural. The character "/" generally indicates an "or" relationship between associated objects. The term "at least one item (piece) of the following" or a similar expression thereof refers to any combination of these items, and includes a single item (piece) or any combination of a plurality of items (pieces). For example, at least one (piece) of a, b, or c may represent: a, b, c, a and b, a and c, b and c, or a, b, and c, where a, b, and c may be singular or plural. In addition, to clearly describe the technical solutions in embodiments of this application, terms such as "first" and "second" are used in embodiments of this application to distinguish between same items or similar items that provide basically same functions and purposes. A person skilled in the art may understand that the terms such as "first" and "second" do not limit a quantity and an execution sequence. For example, "first" in a first notification message and "second" in a second notification message in embodiments of this application are merely used to distinguish between different notification messages. Descriptions such as "first" and "second" in embodiments of this application are merely used for indicating and distinguishing between described objects, do not show a sequence, do not indicate a specific limitation on a quantity of devices in embodiments of this application, and cannot constitute any limitation on embodiments of this application.

It should be noted that, in this application, words such as "example" or "for example" are used to represent giving an example, an illustration, or a description. Any embodiment or design scheme described as an "example" or "for example" in this application should not be explained as being more preferred or having more advantages than another embodiment or design scheme. Exactly, use of the words such as "example" or "for example" is intended to present a relative concept in a specific manner.

"A plurality of" in embodiments of this application refers to two or more than two.

Descriptions such as "first" and "second" in embodiments of this application are merely used for indicating and distinguishing between described objects, do not show a sequence, do not indicate a specific limitation on a quantity of devices in embodiments of this application, and cannot constitute any limitation on embodiments of this application.

"Connection" in embodiments of this application means various connection manners such as a direct connection or an indirect connection, for implementing communication between devices. This is not limited in embodiments of this application.

In embodiments of this application, a "network" and a "system" express a same concept, and a communication system is a communication network.

A network architecture and a service scenario described in embodiments of this application are intended to describe the technical solutions in embodiments of this application more clearly, and do not constitute a limitation on the technical solutions provided in embodiments of this application. A person of ordinary skill in the art may know that: With evolution of the network architecture and emergence of new service scenarios, the technical solutions provided in embodiments of this application are also applicable to similar technical problems.

FIG. 1 is a schematic diagram of an architecture of a 5G network according to an embodiment of this application. As shown in FIG. 1, a user plane network element and a control plane network element are separately deployed in the 5G network. The 5G network includes UE, an access network (AN) device/a radio access network (RAN) device, a user plane function (UPF) entity, a data network (DN), an access and mobility management function (AMF) entity, a session management function (SMF) entity, a policy control function (PCF) entity, an application function (AF), a network slice selection function (NSSF) entity, an authentication server function (AUSF) entity, and a unified data management (UDM) entity.

The access network device is a device that accesses a core network, and for example, may be a base station, a broadband network gateway (BNG), an aggregation switch, or a non-3rd Generation Partnership Project (3GPP) access device. There may be various forms of base stations, for example, a macro base station, a micro base station (also referred to as a small cell), a relay station, and an access point.

The UPF entity is mainly responsible for PDU routing and forwarding and policy enforcement on packet data. For example, the UPF entity can implement user plane functions of a serving gateway (SGW) and a packet data network (PDN) gateway (PGW). The UPF entity may be a software defined networking (SDN) switch. This is not specifically limited in embodiments of this application. The UPF entity communicates with the DN through an N6 interface, and the DN is a destination accessed through a PDU session of a user.

The AMF entity mainly accesses non-access stratum (NAS) signaling (including session management (SM) signaling) of the UE through an N1 interface, accesses radio access network signaling through an N2 interface, and is mainly responsible for access authentication and authorization and mobility management.

The SMF entity communicates with the UPF entity through an N4 interface. The SMF entity is mainly responsible for completing session-related procedures such as establishment, release, and update, IP address assignment and management, UPF entity selection and control, and session-related control functions such as lawful interception.

The PCF entity is mainly responsible for managing user policies including mobility-related policies and protocol data unit (PDU) session-related policies, such as a quality of service (QoS) policy and a charging policy.

The AF is mainly responsible for providing the PCF with service information of a service accessed by the user, where the service information is for policy decision of the PCF. The NSSF is mainly responsible for managing a network slice. The UDM is mainly responsible for storing subscription data of the user. The AUSF is mainly responsible for performing authentication and authorization on access of the UE.

It should be noted that the names of the interfaces between the network elements in FIG. 1 are merely examples, and the interfaces may have other names in another implementation. This is not specifically limited in embodiments of this application. Optionally, the 5G network may further include another network device in addition to the devices shown in FIG. 1. FIG. 1 is merely an example.

It may be understood that an application relocation method provided in embodiments of this application may be applied to the 5G network shown in FIG. 1, or may be applied to a Long-Term Evolution (LTE) wireless communication network, another next generation (NG) communication network, or the like. This is not limited in embodiments of this application. The following embodiments only use the 5G network as an example for description.

Figure 2:
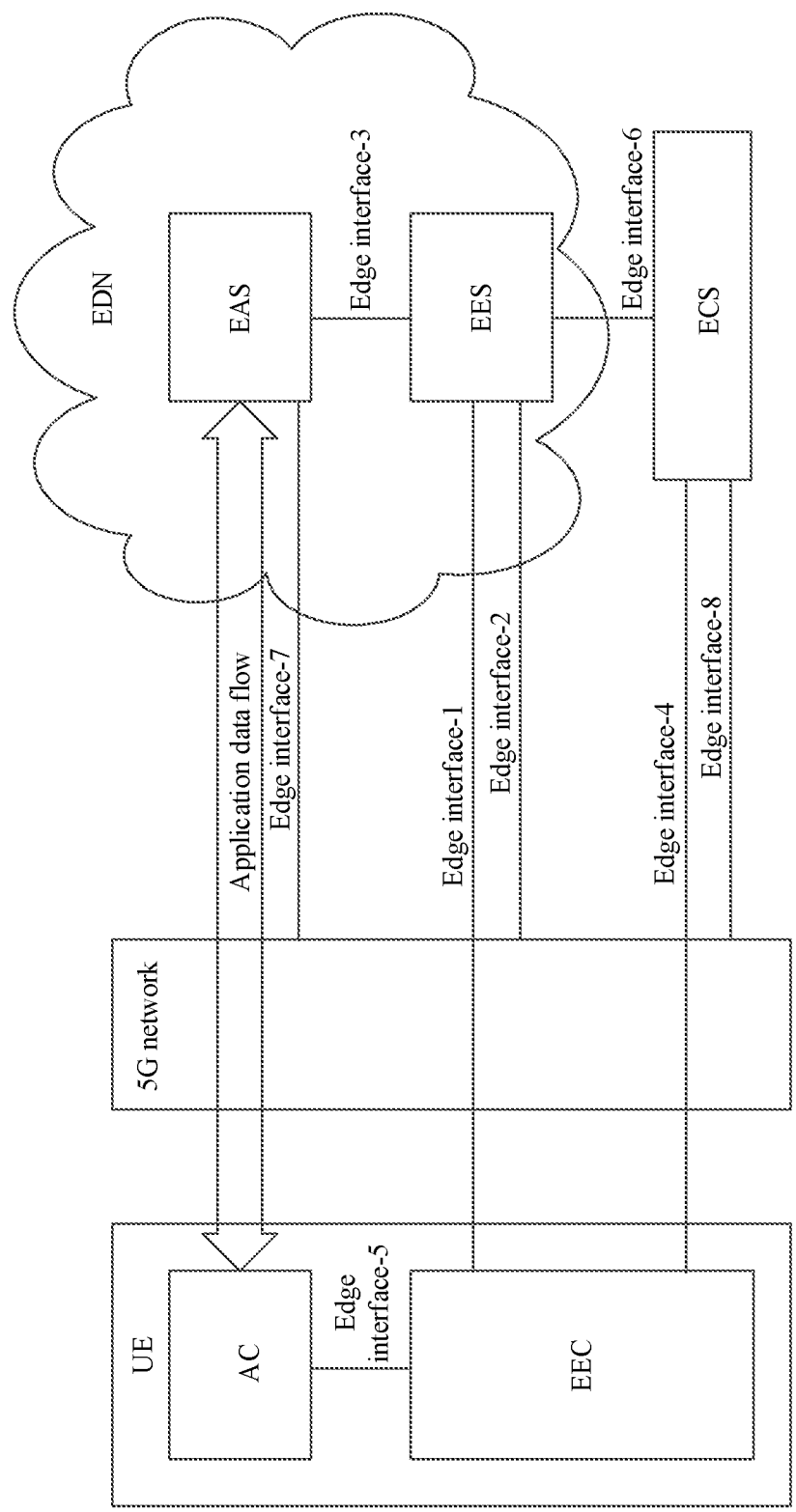
FIG. 2 is a schematic diagram of an edge service enabling architecture of the SA6 working group according to an embodiment of this application.

FIG. 2 shows an edge service enabling architecture of the SA ( ) 6 working group according to an embodiment of this application. As shown in FIG. 2, UE may access an edge data network (EDN) through a 5G network, where the edge data network may also be referred to as a local data network (LDN). The EDN may include an edge enabler server (EES) and an edge application server (EAS). The EES may be a control network element or a management network element in a mobile edge computing (MEC) node. The EES is responsible for management, such as registration and domain name system (DNS) resolution, of the EAS deployed in the EDN. The EES stores a profile of the EAS.

For example, each EDN has a specific service range, and one or more EASs may be deployed in one EDN. FIG. 2 merely shows an example in which one EAS is deployed in the EDN. When a plurality of EASs are deployed in the EDN, the plurality of EASs may serve a plurality of different applications. For example, three EASs, namely, an EAS 1, an EAS 2, and an EAS 3, are deployed in the EDN. The EAS 1 is an EAS corresponding to the Baidu application, the EAS 2 is an EAS corresponding to the iQIYI application, and the EAS 3 is an EAS corresponding to the Tencent Video application. Optionally, when a plurality of EASs are deployed in the EDN, a part or all of the plurality of EASs may serve a same application for disaster recovery, load balancing, or the like. For another example, three EASs, namely, an EAS 1, an EAS 2, and an EAS 3, are deployed in the EDN. The EAS 1 and the EAS 2 are EASs corresponding to the Baidu application, and the EAS 3 is an EAS corresponding to the Tencent Video application.

An edge configuration server (ECS) may be a global management network element, and is responsible for maintaining information about each EDN, where the information includes a service range, an EES address, and the like. It should be noted that in some standard protocols (for example, the technical specification (TS) 23.501 and TS 23.502), the EES, the EAS, and the ECS may all be referred to as AFs.

The UE may include an edge enabler client (EEC) and an application client (AC). The EEC provides necessary support for the AC in the UE. Functions of the EEC include retrieving EDN information, an available EAS, and an EAS availability change through an EDGE-4 interface, receiving an EAS relocation notification, and registering the UE with the EES.

As shown in FIG. 2, the EEC in the UE may communicate with the EES through an EDGE-1 interface (an edge interface-1), and communicate with the AC in the UE through an EDGE-5 interface (an edge interface-5). A network element in the 5G network may communicate with the EES through an EDGE-2 interface (an edge interface-2), and communicate with the ECS through an EDGE-8 interface (an edge interface-8). The EES deployed in the DN may communicate with the EAS through an EDGE-3 interface (edge interface-3), and the ESC may communicate with the EES through an EDGE-6 interface (edge interface-6).

It should be noted that in the following embodiments of this application, a source AS or a target AS may be the EAS in FIG. 2, a source enabler server(ES) or a target ES may be the EES in FIG. 2, and a CS may be the ECS in FIG. 2. In other words, in SA6, the AS may be referred to as the EAS, the ES may be referred to as the EES, and the CS may be referred to as the ECS.

Figure 3:
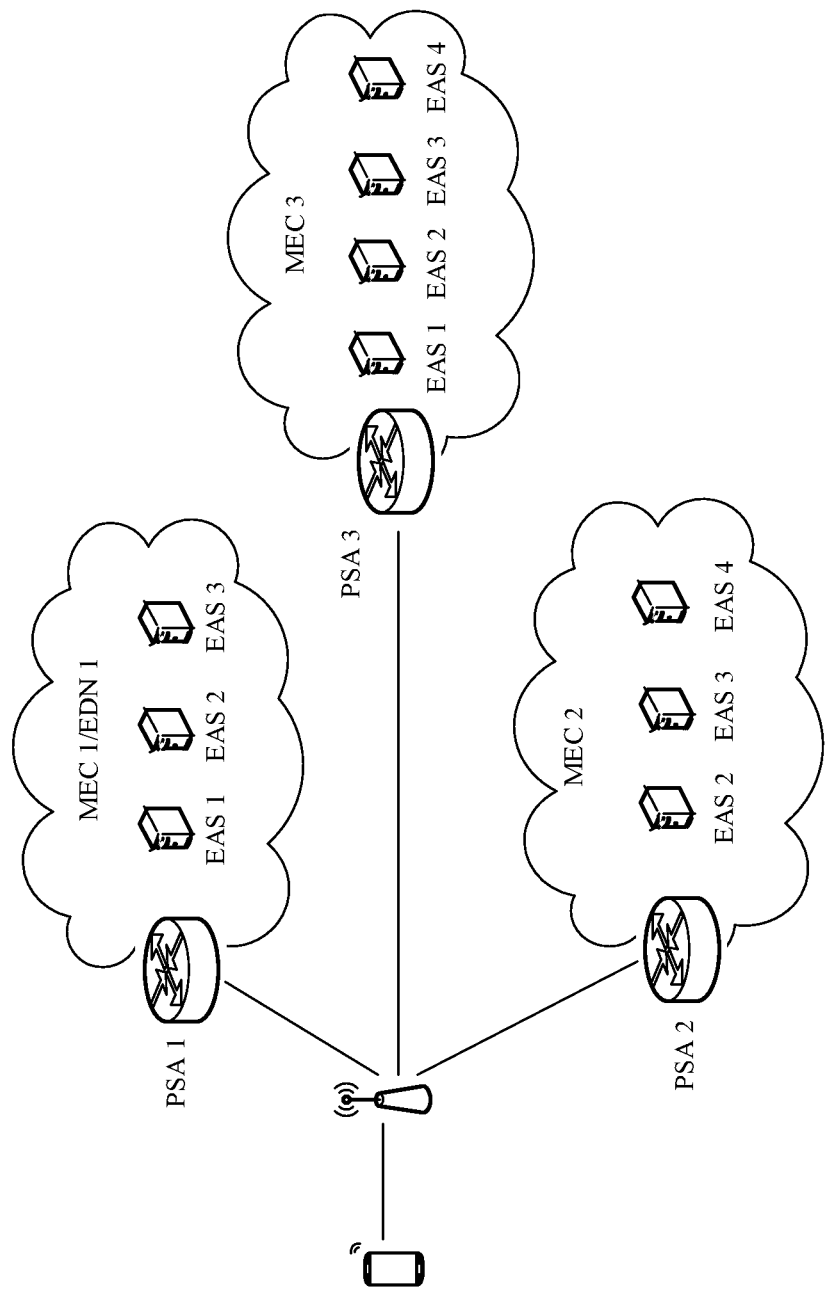
FIG. 3 is a schematic diagram of an architecture of network deployment according to an embodiment of this application.

To improve user experience and shorten a delay in accessing an application server by a user, an operator or a service provider deploys the application server in a city, a hotspot area, or the like. FIG. 3 is a schematic diagram of an architecture of network deployment according to an embodiment of this application.

As shown in FIG. 3, an EAS 1, an EAS 2, and an EAS 3 are deployed in a MEC node 1 or an EDN 1; an EAS 2, an EAS 3, and an EAS 4 are deployed in a MEC node 2; an EAS 1, an EAS 2, an EAS 3, and an EAS 4 are deployed in a MEC 3. In FIG. 3, a PDU session anchor (PSA) 1 is connected to the MEC 1/EDN 1 (in other words, the PSA 1 serves the MEC 1/EDN 1), a PSA 2 is connected to the MEC 2, and a PSA 3 is connected to the MEC 3. Each MEC has a corresponding service area, and service areas of different MECs may overlap.

In FIG. 3, EASs with a same identifier serve a same application, and EASs with different identifiers serve different applications. For example, the EAS 1, the EAS 2, the EAS 3, and the EAS 4 deployed in FIG. 3 serve different applications. The EAS 2 deployed in the MEC 1 and the EAS 2 deployed in the MEC 2 serve a same application, in other words, the EAS 2 deployed in the MEC 1 and the EAS 2 deployed in the MEC 2 are different servers serving a same application. It should be noted that in actual deployment, more EASs may be deployed in one MEC or EDN. FIG. 3 merely shows an example in which three or four EASs are deployed in one MEC.

For example, three session and service continuity (SSC) modes, namely, an SSC mode 1, an SSC mode 2, and an SSC mode 3, are introduced in 5G. For a PDU session in the SSC mode 1, a UPF that serves as a PDU session anchor when the PDU session is established remains unchanged in a network, and an IP address of UE remains unchanged. For a PDU session in the SSC mode 2, if an anchor UPF needs to be relocated in a network, an old PDU session is first released, and then an establishment procedure for a new PDU session is initiated. For a PDU session in the SSC mode 3, a network allows to first establish a PDU session connection that passes through a new anchor and then release a PDU session connection that passes through an old anchor, to ensure service continuity.

Figure 4A:
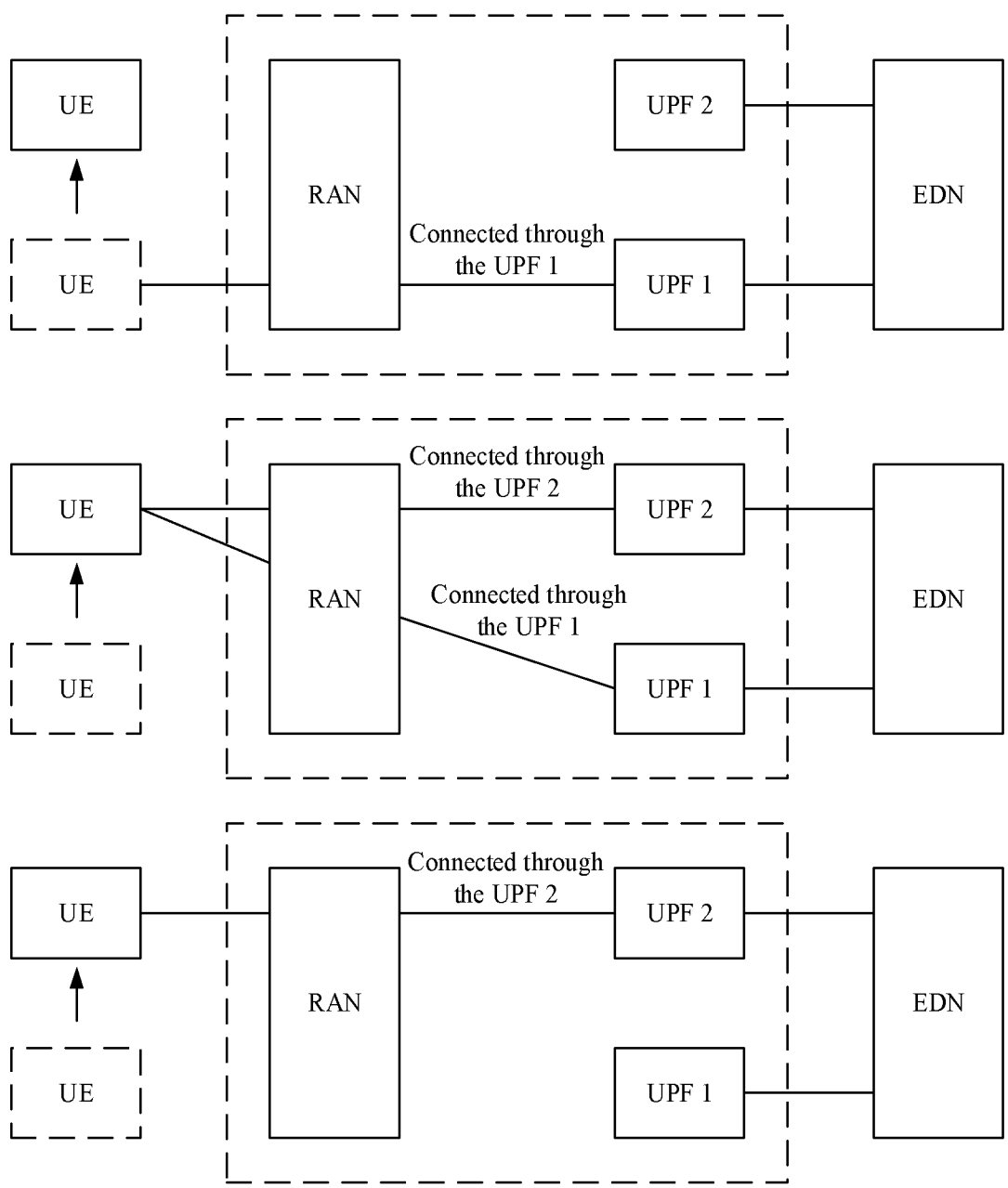
FIG. 4A is a schematic diagram of a PDU session switching procedure in an SSC mode 3 according to an embodiment of this application.

FIG. 4A is a schematic diagram of a PDU session switching procedure in an SSC mode 3 according to an embodiment of this application. As shown in FIG. 4A, for a PDU session in the SSC mode 3, before moving, UE accesses an EAS in an EDN through a UPF 1. When the UE moves and an anchor UPF changes, an SMF notifies the UE to first establish a new PDU session with a UPF 2, and then disconnect a source PDU session when a timer expires. Data may be simultaneously transmitted on the two sessions in a process in which the anchor UPF of the UE changes from the UPF 1 to the UPF 2. An old IP address of the UE corresponds to the UPF 1, and a new address of the UE corresponds to the UPF 2. It should be noted that an EDN accessed by the UE after movement may be the same as or different from an EDN accessed by the UE before the movement. In other words, a data network accessed by the UE may or may not change after the movement. FIG. 4A merely shows an example in which the EDN accessed by UE remains unchanged after the movement.

Figure 4B:
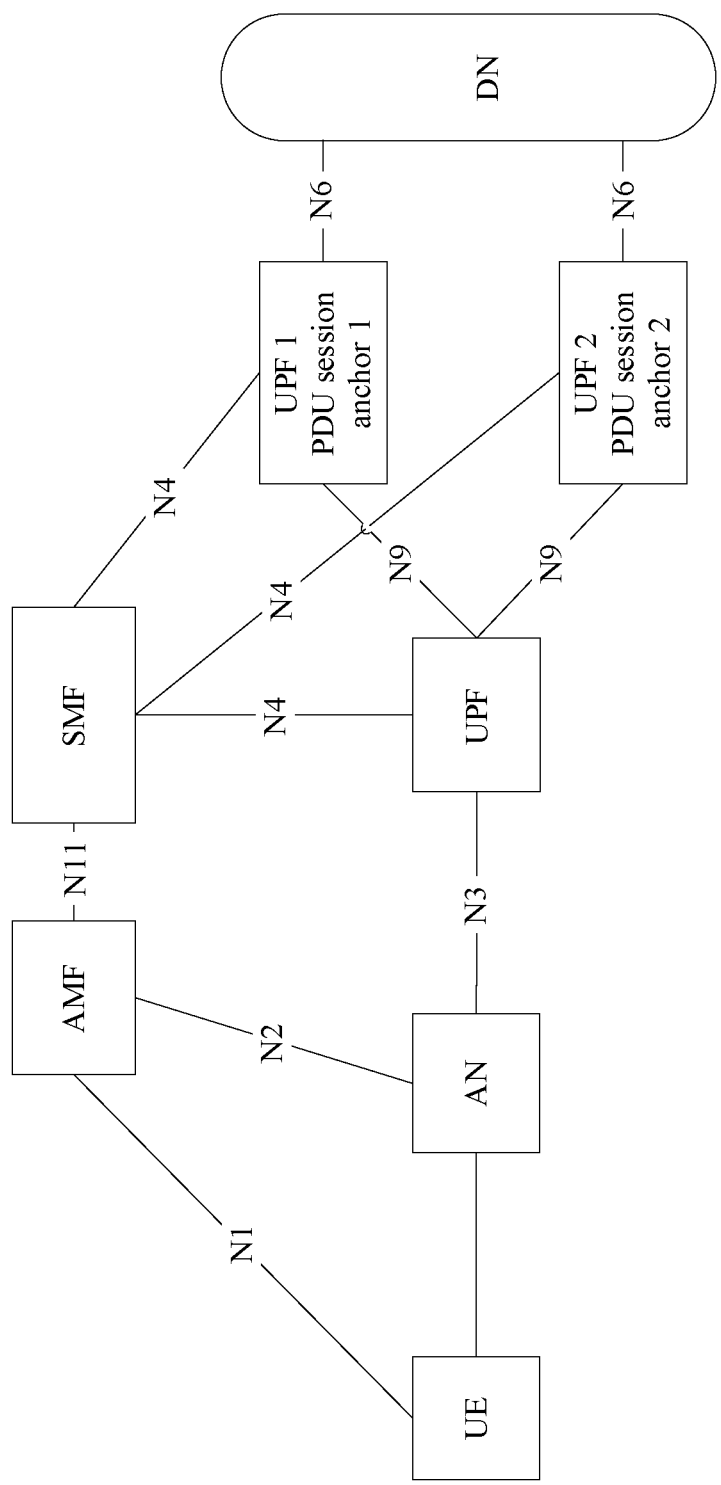
FIG. 4B is a schematic diagram of a PDU session switching procedure in a multi-homed session mechanism according to an embodiment of this application.

FIG. 4B is a schematic diagram of a PDU session switching procedure in a multi-homed session mechanism according to an embodiment of this application. As shown in FIG. 4B, when an SSC mode 3 is implemented using a multi-homed session creation mechanism, UE accesses an AS in a DN through a UPF 1 before movement. When the UE moves and an anchor UPF changes, a branching point UPF and a UPF 2 are created. The branching point UPF is connected to the UPF 1 and the UPF 2 in a change process, and the UPF 1 and a connection between the branching point UPF and the UPF 1 are released after the change is completed.

It should be noted that the AMF, the SMF, the PCF, the UPF, the EDN, the EAS, the EES, and the like in FIG. 1 to FIG. 4B are merely names, and the names do not constitute a limitation on the devices. In the 5G network and another future network, the AMF, the SMF, the PCF, the UPF, the EDN, the EAS, and the EES may alternatively have other names. This is not specifically limited in embodiments of this application.

With reference to FIG. 3 and FIG. 4B, when the SSC mode of the PDU session of the UE is the SSC mode 3, if the UPF needs to change in a movement process of the UE, a corresponding application server may also change accordingly to shorten an application access delay.

In the moving process of the UE, to shorten a delay in accessing the application server by the UE, an application relocation method based on the SSC mode 3 is as follows: An OS in the UE notifies an AC after finding that a new PDU session is established. After receiving the notification, the AC triggers DNS query to obtain an address of a new EAS. The AC sends the address of the new EAS to an old EAS to indicate the old EAS to perform application relocation. After status synchronization is performed between the old EAS and the new EAS, the UE starts to send a data packet to the new EAS. In the method, when the new AS is determined through the DNS query, the new AS determined based on a DNS query result is not a most appropriate application server because the DNS query result is not accurate enough. As a result, a delay in accessing the new AS by the UE is long after an AS accessed by the UE is relocated to the new AS. In addition, in the application relocation method, an interface between the OS and the AC needs to be added, and the AC needs to understand the SSC mode 3, such that after receiving the notification sent by the OS, the AC can initiate the DNS query to determine the new EAS and send the address of the new EAS to the old EAS to trigger the application relocation. Therefore, in this solution, logic of the AC needs to be enhanced. This leads to a difficult design of the AC.

To resolve a problem that the delay in accessing the application server by the UE is long because a target AS determined in the application relocation method is inaccurate, embodiments of this application provide an application relocation method. According to the method, the target AS can be accurately determined, to shorten the delay in accessing the application server by the UE.

Figure 5:
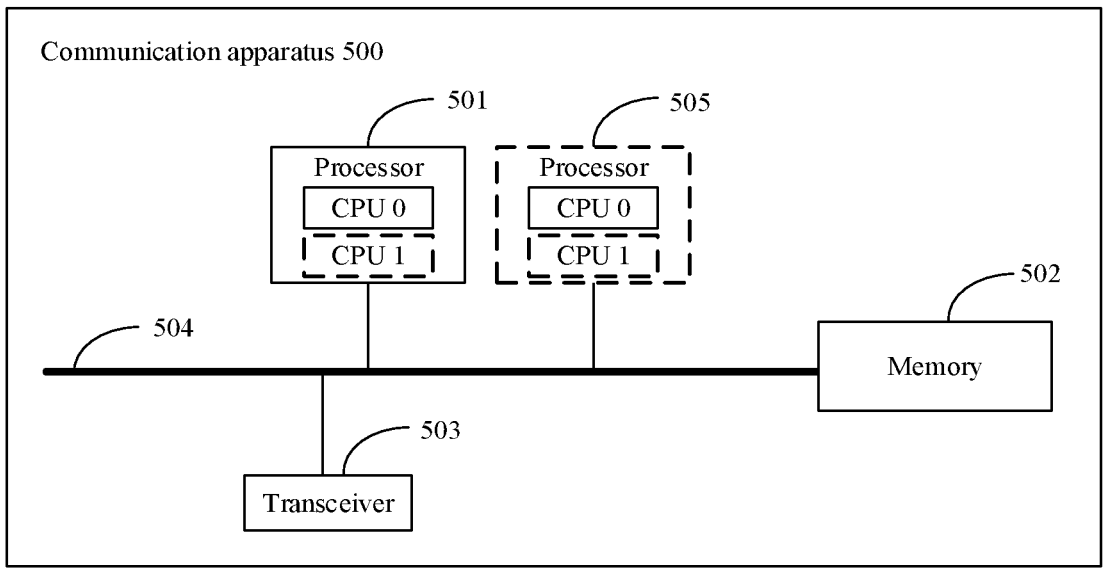
FIG. 5 is a schematic diagram of a structure of a communication apparatus according to an embodiment of this application.

During implementation, in the application relocation method provided in embodiments of this application, a source AS, a source ES, the target AS, a target ES, a CS, the UE, and the like may be in a composition structure shown in FIG. 5 or include components shown in FIG. 5.

For example, FIG. 5 is a schematic composition diagram of a communication apparatus 500 according to an embodiment of this application. As shown in FIG. 5, the communication apparatus 500 may include at least one processor 501, a memory 502, a transceiver 503, and a communication bus 504.

The following describes the components of the communication apparatus 500 with reference to FIG. 5.

The processor 501 is a control center of the communication apparatus 500, and may be one processor or may be a general name of a plurality of processing elements. For example, the processor 501 is a central processing unit (CPU) or an application-specific integrated circuit (ASIC), or is configured as one or more integrated circuits for implementing embodiments of this application, for example, one or more digital signal processors (DSPs) or one or more field-programmable gate arrays (FPGAs).

The processor 501 may perform various functions of the communication apparatus by running or executing a software program stored in the memory 502 and invoking data stored in the memory 502.

During implementation, in an embodiment, the processor 501 may include one or more CPUs, for example, a CPU 0 and a CPU 1 shown in FIG. 5.

During implementation, in an embodiment, the communication apparatus 500 may include a plurality of processors, for example, the processor 501 and a processor 505 shown in FIG. 5. Each of the processors may be a single-core processor (single-CPU) or may be a multi-core processor (multi-CPU). The processor herein may be one or more communication devices, circuits, and/or processing cores configured to process data (for example, computer program instructions).

The memory 502 may be a read-only memory (ROM) or another type of static storage communication device that can store static information and instructions, or a random-access memory (RAM) or another type of dynamic storage communication device that can store information and instructions, or may be an electrically erasable programmable read-only memory (EEPROM), a compact disc read-only memory (CD-ROM) or another compact disc storage device, an optical disc storage device (including a compact disc, a laser disc, an optical disc, a digital versatile disc, a Blu-ray disc, or the like), a magnetic disk storage medium or another magnetic storage communication device, or any other medium that can be used to carry or store expected program code in a form of an instruction or a data structure and that can be accessed by a computer, but is not limited thereto. The memory 502 may exist independently and be connected to the processor 501 via the communication bus 504. Alternatively, the memory 502 may be integrated with the processor 501.

The memory 502 is configured to store a software program for executing the solutions of this application, and the processor 501 controls the execution. The processor 501 is configured to execute application program code stored in the memory 502, to implement the application relocation method provided in the following embodiments of this application.

The transceiver 503 is configured to communicate with an access point. Certainly, the transceiver 503 may be further configured to communicate with a communication network, for example, the Ethernet, a radio access network (RAN), or a wireless local area network (WLAN). The transceiver 503 may include a receiving unit for implementing a receiving function and a sending unit for implementing a sending function.

The communication bus 504 may be an Industry Standard Architecture (ISA) bus, a Peripheral Component Interconnect (PCI) bus, an Extended Industry Standard Architecture (EISA) bus, or the like. The bus may be classified into an address bus, a data bus, a control bus, and the like. For ease of representation, only one thick line is used to represent the bus in FIG. 5, but this does not mean that there is only one bus or only one type of bus.

It should be noted that the communication apparatus 500 may be a general-purpose communication device or a special-purpose communication device. During implementation, the communication apparatus 500 may be a desktop computer, a portable computer, a network server, a mobile phone, a tablet computer, a wireless terminal, an embedded device, a chip system, or a device having a structure similar to that in FIG. 5. A type of the communication apparatus 500 is not limited in this embodiment of this application. In addition, the composition structure shown in FIG. 5 does not constitute a limitation on the communication apparatus. The communication apparatus 500 may include more or fewer components than those shown in the figure in addition to the components shown in FIG. 5, combine some components, or have different component arrangements.

For example, the UE in embodiments of this application may be a handheld device, an in-vehicle device, a wearable device, or a computing device that has a wireless communication function, or another processing device connected to a wireless modem, and may further include a subscriber unit, a cellular phone, a smartphone, a wireless data card, a personal digital assistant (PDA) computer, a tablet computer, a wireless modem, a handheld device, a laptop computer, a cordless phone, a wireless local loop (WLL) station, a machine type communication (MTC) terminal, a user equipment (UE), a mobile station (MS), a terminal device, and the like. For ease of description, in this application, the devices above are collectively referred to as UE.

With reference to FIG. 1 to FIG. 5, the following describes in detail the application relocation method provided in embodiments of this application.

Figure 6:
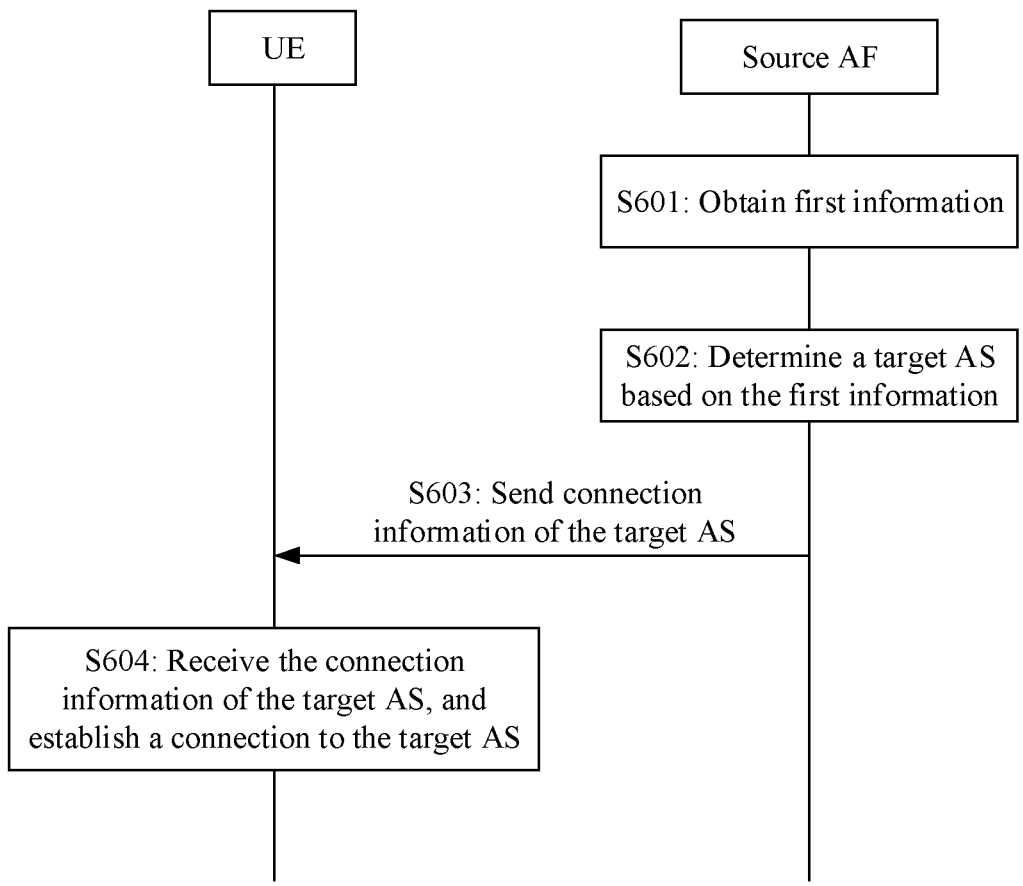
FIG. 6 is a schematic flowchart of an application relocation method according to an embodiment of this application.

With reference to FIG. 1 to FIG. 5, FIG. 6 shows an application relocation method according to an embodiment of this application. As shown in FIG. 6, the application relocation method includes steps S601 to S604.

S601: A source AF obtains first information.

The first information is location information of UE after a user plane path of a PDU session of the UE changes. The location information of the UE may be an IP address of the UE, a data network access identifier (DNAI) corresponding to the user plane path of the PDU session of the UE, or identification information (for example, a cell ID, a RAN ID, a TAI, or geographical location information) of the UE in a network. It may be understood that the DNAI corresponding to the user plane path of the PDU session of the UE is a DNAI corresponding to a data network accessible by the UE. For example, the first information is an IP address that is obtained after the UE re-establishes the PDU session, or is an IP address that is of the UE and that corresponds to an anchor UPF newly inserted when an SSC mode 3 is implemented using a multi-homed session creation mechanism.

For another example, the first information is a DNAI corresponding to a UPF used after the UE re-establishes the PDU session. For another example, the first information is information, for example, the cell ID, about a base station to which the UE is attached after movement. Specific content of the first information is not limited in this embodiment of this application. It should be noted that in a scenario of session re-establishment in the SSC mode 3, the DNAI corresponding to the data network accessible by the UE may be understood as the DNAI corresponding to the UPF used after the UE re-establishes the PDU session, or is the DNAI corresponding to the anchor UPF newly inserted when the SSC mode 3 is implemented using the multi-homed session creation mechanism.

For example, the DNAI may identify a path between the UPF and the data network, in other words, the DNAI may be for determining the UPF or the DN. For example, an SMF may store a relationship between a DNAI and a UPF. In this case, the SMF may determine the UPF based on the DNAI. Conversely, the SMF may determine the corresponding DNAI based on the UPF. Therefore, after the UE re-establishes the PDU session, if the UPF changes, the DNAI corresponding to the UPF also changes accordingly. Because the SMF needs to consider the location information of the UE when selecting the UPF, the DNAI may also be considered as a type of location information of the UE. Alternatively, an SMF, an AF, or another network element may store a relationship between a DNAI and a DN. In this case, the SMF, the AF, or the other network element may determine the DN based on the DNAI. Conversely, the SMF may determine the corresponding DNAI based on the DN.

For example, in step S601, the source AF may obtain the first information when the user plane path of the PDU session of the UE changes.

The user plane path of the PDU session of the UE is a path from the UE to a base station and then to the UPF entity. The user plane path of the PDU session of the UE may change in the following several cases: In a first case, the UPF changes. A change of the UPF includes a change of an anchor UPF, where the change of the anchor UPF may be understood as a change of a PDU session anchor of the UE. When the UPF changes, the IP address of the UE also changes, or the data network accessible by the UE changes, in other words, the DNAI corresponding to the data network accessible by the UE changes. In a second case, the UPF remains unchanged, but the base station changes. In a third case, both the UPF and the base station change. In this embodiment of this application, the user plane path of the PDU session of the UE may change in any one of the foregoing cases. This is not limited in this embodiment of this application. Descriptions are provided in the following embodiments by only using an example in which the change of the user plane path of the PDU session of the UE is re-establishment of the PDU session of the UE. In other words, if the PDU session of the UE is re-established, the user plane path of the PDU session of the UE changes, and the source AF obtains the first information.

For example, the source AF may be a source AS or a source ES. The source AS or the source ES is an AS or an ES that the UE accesses before the user plane path of the PDU session changes. For example, if the UE accesses an AS of Tencent Video before the PDU session of the UE is re-established, the AS of Tencent Video is the source AS. Optionally, the source AS may be the EAS in FIG. 2, and the source ES may be the EES in FIG. 2.

For example, when the source AF in step S601 is the source AS, that a source AF obtains first information in step S601 is: The source AS obtains the first information. The first information obtained by the source AS may be from a core network element (for example, an AMF entity, the UPF entity, a PCF entity, or the SMF entity), or may be from the source ES.

In a first implementation, when the first information obtained by the source AS is from the PCF entity or the SMF entity, the source AS may subscribe to a user plane management event notification from the PCF entity or the SMF entity before step S601, where the user plane management event notification notifies the source AS when the user plane path of the PDU session of the UE changes. When the user plane path of the PDU session of the UE changes, the PCF entity or the SMF entity sends, to the source AS, a first notification message indicating that the user plane path of the PDU session of the UE changes, where the first notification message may include the first information.

In a second implementation, when the first information obtained by the source AS is from the source ES, the source AS may subscribe to a user plane management event notification from the source ES before step S601, where the user plane management event notification notifies the source AS when the user plane path of the PDU session of the UE changes. When the user plane path of the PDU session of the UE changes, the source ES sends, to the source AS, a second notification message indicating that the user plane path of the PDU session of the UE changes, where the second notification message may include the first information. Optionally, the source ES may learn, through the PCF entity, the SMF entity, or the UE, that the user plane path of the PDU session of the UE changes.

In a third implementation, when the first information obtained by the source AS is from the core network element, the source AS may subscribe to a user plane management event notification from the source ES before step S601, where the user plane management event notification notifies the source AS when the user plane path of the PDU session of the UE changes. When the user plane path of the PDU session of the UE changes, the source ES sends, to the source AS, a second notification message indicating that the user plane path of the PDU session of the UE changes. The second notification message may include the first information. If the second notification message does not include the first information, after receiving the second notification message, the source AS may send a request message to the core network element (for example, the AMF entity, the SMF entity, or the UPF entity), to obtain the first information. In other words, in this implementation, the first information is not included in the second notification message sent by the source ES, but is obtained by the source AS by sending the request message to the core network element after the source AS receives the second notification message sent by the source ES.

For example, when the source AF in step S601 is the source ES, that a source AF obtains first information in step S601 is: The source ES obtains the first information. The first information obtained by the source ES may be from a PCF entity or the SMF entity, or may be from the UE.

In a first implementation, when the first information obtained by the source ES is from the PCF entity or the SMF entity, the source ES may subscribe to a user plane management event notification from the PCF entity or the SMF entity before step S601, where the user plane management event notification notifies the source ES when the user plane path of the PDU session of the UE changes. When the user plane path of the PDU session of the UE changes, the PCF entity or the SMF entity sends, to the source ES, a third notification message indicating that the user plane path of the PDU session of the UE changes, where the third notification message may include the first information.

In a second implementation, when the first information obtained by the source ES is from the UE, step S601 includes: The source ES receives a fourth notification message sent by an EEC of the UE and indicating that the PDU session of the UE is re-established, where the fourth notification message includes the first information. Optionally, the first information obtained by the source ES may alternatively be requested by the source ES from a 5GC after the source ES receives the fourth notification message sent by the EEC of the UE.

Optionally, when the third notification message or the fourth notification message does not include the first information, the source ES may further send a request to the core network element (for example, the AMF entity, the SMF entity, or the UPF entity) to obtain the first information.

It should be noted that a specific implementation in which the source AF obtains the first information is not limited in this embodiment of this application.

S602: The source AF determines a target AS based on the first information.

The target AS and the source AS serve a same application. For example, if the source AS is the AS of the Tencent Video app, the target AS is also an AS of the Tencent Video app, in other words, both the source AS and the target AS can serve the Tencent Video app. The target AS can continue to serve the UE after a context of the UE is relocated from the source AS to the target AS. In other words, the source AS and the target AS are two application servers that can serve a same application.

Optionally, the target AS and the source AS have a same edge application server identifier (EAS ID).

In an implementation, that the target AS and the source AS serve a same application indicates that the two application servers can provide a same service, and both the source AS and the target AS can provide only a Tencent Video service. In another implementation, the target AS and the source AS serve the same application, but the two application servers can provide different services. For example, the source AS can provide a Tencent Video service, and the target AS can provide the Tencent Video service and a Tencent Maps service. For example, before the UE moves, the UE is connected to the source AS to access the Tencent Video service. The target AS may continue to provide the Tencent Video service after application relocation.

Optionally, the source AS and the target AS may be deployed in a same data network, or may be deployed in different data networks. For example, if a data network handover occurs when the user plane path of the PDU session of the UE changes, the source AS is an application server deployed in a source data network (a data network used before the handover), and the target AS is an application server deployed in a target data network (a data network used after the handover). For another example, if the same data network is accessed before and after the user plane path of the PDU session of the UE changes, the source AS and the target AS are two servers deployed in the data network that serve the same application. Descriptions are provided in this embodiment of this application by only using an example in which the source AS and the target AS are deployed in different data networks. When the source AS and the target AS are respectively a source EAS and a target EAS, the source AS and the target AS are deployed in different edge data networks EDNs and serve the same application.

For example, that the source AF determines a target AS based on the first information in step S602 may include: The source AF obtains, based on the first information, information about a UPF entity that is used after the user plane path of the PDU session of the UE changes. The source AF determines the target AS based on the information about the UPF entity. For example, the first information is the IP address of the UE, and the information about the UPF entity is the DNAI. After obtaining the IP address of the UE, the source AF may send a request to the 5GC based on the IP address of the UE to obtain the DNAI of the UE, and determine the target AS based on the DNAI.

For example, that the source AF determines the target AS based on the DNAI includes: The source AF determines a new PSA based on the DNAI, determines a MEC connected to the new PSA, and selects an EAS deployed in the MEC as the target AS.

For example, the source AF stores a relationship between the first information and the target AS, and queries the mapping relationship based on the obtained first information to determine the target AS. A storage form of the mapping relationship may be a relationship table, a context, a key-value pair, or the like. This is not limited in this embodiment of this application. For example, the source AF stores a relationship between the target AS and service range information corresponding to the target AS. In this case, after obtaining the location information of the UE, the source AF may determine an AS whose service range protects a location of the UE, and determine the AS as the target AS. Alternatively, the source AF stores a correspondence between the target AS and the DNAI. In this case, the source AF obtains the DNAI corresponding to the UPF entity that is used after the user plane path changes, to determine the target AS. Alternatively, the source AF stores a correspondence between the target AS and the IP address or an IP address segment. In this case, the source AF obtains a new IP address that is of the UE and that is obtained after the user plane path changes, to determine the target AS. A specific implementation in which the source AF determines the target AS based on the first information is not limited in this embodiment of this application, and only an example is provided herein for description.

(Optional) S603: The source AF sends connection information of the target AS to the UE.

The connection information of the target AS includes address information of the AS. The connection information of the target AS may be an IP address of the target AS, a uniform resource identifier (URI) or a uniform resource locator (URL) of the target AS, an end point of the target AS, or the like.

For example, the source AS may send the connection information of the target AS to an AC of the UE.

For example, in step S603, the source AS may send the connection information of the target AS to the UE; the source ES may send the connection information of the target AS to the UE; the source AS may send the connection information of the target AS to the source ES, and then the source ES sends the connection information of the target AS to the UE; or another network device may send the connection information of the target AS to the UE. This is not limited in this embodiment of this application.

Optionally, the connection information of the target AS that is sent by the source AF to the UE in step S603 may be included in an application layer message, or may be included in NAS signaling. This is not limited in this embodiment of this application. For example, when the connection information of the target AS is included in the NAS signaling, that the source AF sends connection information of the target AS to the UE in step S603 may include: The source AF sends the connection information of the target AS to the 5GC (for example, the AMF, the SMF, or the PCF), and the 5GC sends the connection information of the target AS to the UE using the NAS signaling.

(Optional) S604: The UE receives the connection information of the target AS, and establishes a connection to the target AS.

For example, the AC in the UE establishes a socket after receiving the connection information of the target AS, and an OS in the UE selects the target AS based on the connection information of the target AS, and establishes the connection.

Optionally, the connection information of the target AS that is received by the UE in step S604 may be from the source ES. For example, the UE may request information about the target AS from the source ES before step S604. The source ES sends the connection information of the target AS to the UE after receiving the request of the UE. Optionally, the UE sends the request to the source ES after learning that the user plane path of the PDU session of the UE changes.

Optionally, before step S603, the method may further include: The source AF triggers the application relocation. The application relocation is also referred to as state relocation. The application relocation means relocating the context of the UE from the source AS to the target AS. The application relocation may be understood as state synchronization (context synchronization) between the source AS and the target AS. For example, before the user plane path of the PDU session of the UE changes, the UE accesses the source AS corresponding to the Tencent Video app to play a video, and a user watches the video until the 30th minute. After the source AF triggers the application relocation, the source AS and the target AS perform context synchronization. If the relocation succeeds, the UE starts to access the target AS, and the video continues to be watched from the 30th minute.

Optionally, an ES accessed by the UE after the movement may be the same as or different from an ES accessed by the UE before the movement. If the ES accessed by the UE changes after the movement, the ES accessed by the UE before the movement is the source ES, and the ES accessed by the UE after the movement is a target ES.

It may be understood that in this embodiment of this application, when the user plane path of the PDU session of the UE changes, the source AF obtains the location information that is of the UE and that is obtained after the user plane path of the PDU session of the UE changes, and may determine the target AS based on the location information of the UE and trigger the application relocation. In this solution, the target AS determined based on the location information that is of the UE and that is obtained after the user plane path of the PDU session of the UE changes is accurate. Therefore, a delay in accessing the target AS by the UE is short. In addition, in this solution, the AC in the UE does not need to receive a notification that is from the OS and that indicates the UE to re-establish the session, initiate DNS query, or obtain the address of the target AS. To be more specific, in this solution, a network side device triggers reselection of the target AS and the application relocation, and the AC in the UE is not modified. Therefore, the AC does not need to understand network logic, and a design of the AC can be simplified.

The following describes in detail various implementations of the application relocation method provided in embodiments of this application.

Figure 7:
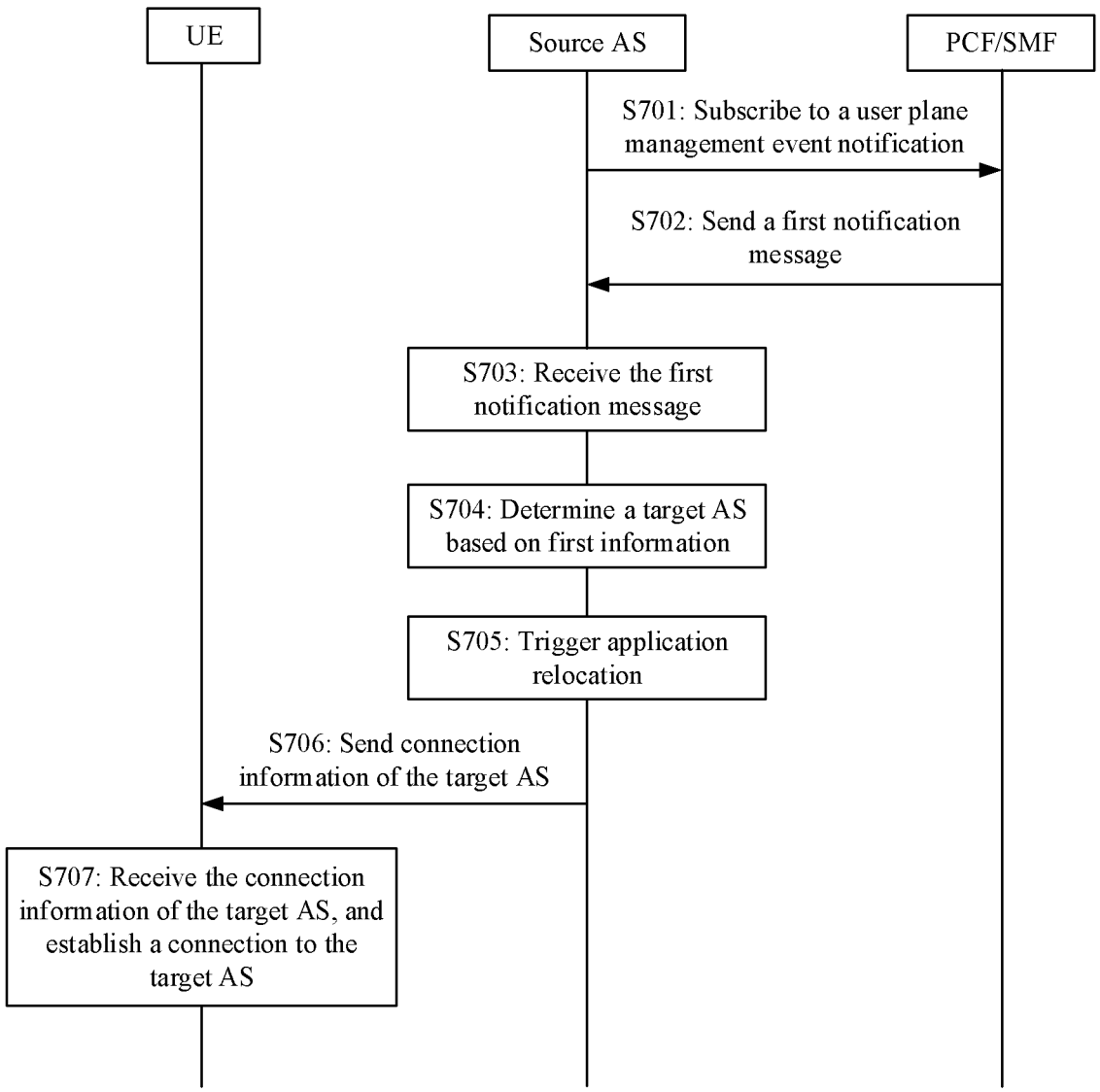
FIG. 7 is a schematic flowchart of another application relocation method according to an embodiment of this application.

FIG. 7 is a schematic flowchart of an application relocation method according to an embodiment of this application. The method relates to interaction between a source AS, a PCF entity/an SMF entity, and UE, and includes the following steps.

S701: The source AS subscribes to a user plane management event notification from the PCF entity or the SMF entity.

The user plane management event notification notifies the source AS when a user plane path of a PDU session of the UE changes.

For example, the source AS may directly subscribe to the user plane management event notification from the PCF entity or the SMF entity. It should be noted that, because whether the user plane path of the PDU session of the UE changes is managed by the SMF, the PCF may subscribe to a user plane management event from the SMF when the source AS subscribes to the user plane management event from the PCF. Therefore, the SMF may notify the PCF when determining to change the user plane path of the PDU session of the UE, and then the PCF notifies the source AS. Optionally, the SMF may directly notify the source AS when determining to change the user plane path of the PDU session of the UE.

Optionally, before step S701, the method may further include: The source AS requests to establish an association (policy association) with the PCF entity or the SMF entity, and the PCF entity or the SMF entity sends a session mode to the source AS, where the session mode may be an SSC mode 3.

S702: The PCF entity or the SMF entity sends a first notification message to the source AS.

The first notification message notifies the source AS that the user plane path of the PDU session of the UE changes. To be more specific, the PCF entity or the SMF entity sends the first notification message to the source AS when determining that the user plane path of the PDU session of the UE changes. Optionally, the first notification message may include first information. For descriptions of the first information, refer to the foregoing embodiment. Details are not described herein again.

When the SSC mode of the PDU session of the UE is the SSC mode 3, a change of the user plane path of the PDU session of the UE includes re-establishment of the PDU session of the UE.

For example, the change of the user plane path of the PDU session of the UE may be triggered based on movement of the UE, load balancing, or the like. For example, as shown in FIG. 3, using an example in which the first information is an IP address of the UE, when the UE accesses the EAS 2 in the MEC 1, an anchor UPF of the session is the PSA 1, and the IP address of the UE is IP@1. If the UE moves to a service range of the MEC 2, the SMF determines to re-establish the PDU session, and sends the UE an indication indicating to newly establish a session. Optionally, the indication may include a timer. An old PDU session is released when the timer expires. Correspondingly, the UE initiates a request for creating a session. After receiving the session request, the SMF selects a new session anchor UPF, namely, the PSA 2, for the current session, and assigns a new IP address IP@2 to the UE. The SMF sends the new IP address IP@2 to the PCF, and the PCF sends the new IP address IP@2 to the source AS.

It should be noted that an SMF for the PDU session used before the re-establishment (the old PDU session) and an SMF for the re-established PDU session (the new PDU session) may be the same or may be different. In other words, the SMF may or may not be changed when the PDU session is re-established.

For example, when the SMF does not change due to the re-establishment of the PDU session, the SMF may associate the old PDU session (the PDU session used before the re-establishment) with the new PDU session (the re-established PDU session), and may send, to the source AS, the new IP address, a DNAI corresponding to the anchor PSA 2 of the new PDU session, or location information of the UE.

For example, when the SMF changes during the re-establishment of the PDU session, the old SMF (namely, the SMF used before the PDU session is re-established) sends information about a PCF to an AMF, the AMF sends the information about the PCF to the new SMF (the SMF used after the PDU session is re-established), and the new SMF selects the same PCF based on the information about the PCF. In other words, although the SMF changes when the PDU session is re-established, the PCF does not change. Therefore, the PCF may associate the new PDU session with the old PDU session, and sends the new IP address, a new DNAI, or location information of the UE to the source AS.

It may be understood that the first notification message in step S702 is in response to the user plane management event notification subscribed to by the source AS from the PCF entity or the SMF entity in step S701.

S703: The source AS receives the first notification message.

S704: The source AS determines a target AS based on the first information.

For example, when the first notification message includes the first information, the source AS may determine the target AS based on the first information included in the first notification message. Optionally, when the first notification message does not include the first information, before step S704, the source AS may send a request to a 5GC network element after receiving the first notification message, to obtain the first information, and determine the target AS based on the first information obtained from the 5GC network element. For example, the source AS may obtain the location information of the UE from the AMF entity, obtain, from the SMF entity, a DNAI corresponding to a UPF that currently serves the UE, or obtain a current IP address of the UE from the SMF entity or a UPF entity.

It may be understood that for an example implementation in which the source AS determines the target AS based on the first information in step S704, refer to the implementation in which the source AF determines the target AS based on the first information in step S602. Details are not described herein again.

S705: The source AS triggers application relocation.

The application relocation means relocating an application server accessed by the UE from the source AS to the target AS.

Optionally, a source ES may trigger the application relocation in step S705. When the source ES triggers the application relocation in step S705, before step S705, the method may further include: The source AS sends connection information of the target AS to the source ES, such that the source ES relocates a context of the UE from the source AS to the target AS based on the connection information of the target AS. In other words, in this embodiment of this application, a device that determines the target AS and a device that triggers the application relocation may be a same device, or may be different devices.

It may be understood that step S705 in FIG. 7 is an optional step.

S706: The source AS sends the connection information of the target AS to the UE.

It may be understood that for related descriptions of the connection information of the target AS, refer to step S603. Details are not described herein again.

S707: The UE receives the connection information of the target AS, and establishes a connection to the target AS.

For example, an AC in the UE establishes a socket after receiving the connection information of the target AS, and an OS in the UE selects the target AS based on the connection information of the target AS, and establishes the connection.

Optionally, if the source AS further receives, after the application relocation is completed, a data packet sent by the UE, the source AS may forward the data packet received by the source AS to the target AS.

It should be noted that an execution sequence of steps S701 to S707 is not limited in this application. FIG. 7 is merely an example for description.

It may be understood that, in the application relocation method provided in this embodiment of this application, the source AS subscribes to the user plane management event notification from a core network element, such that when the user plane path of the PDU session of the UE changes, the source AS can receive the first notification message sent by the core network element, determine the target AS based on the first information included in the first notification message, and trigger the application relocation. In the method, the target AS determined based on the location information that is of the UE and that is obtained after the user plane path of the PDU session of the UE changes is accurate. Therefore, a delay in accessing the target AS by the UE is short. In addition, in the method, the source AS triggers reselection of the target AS and the application relocation, and the AC in the UE is not modified. Therefore, the AC does not need to understand network logic, and a design of the AC can be simplified.

Figure 8:
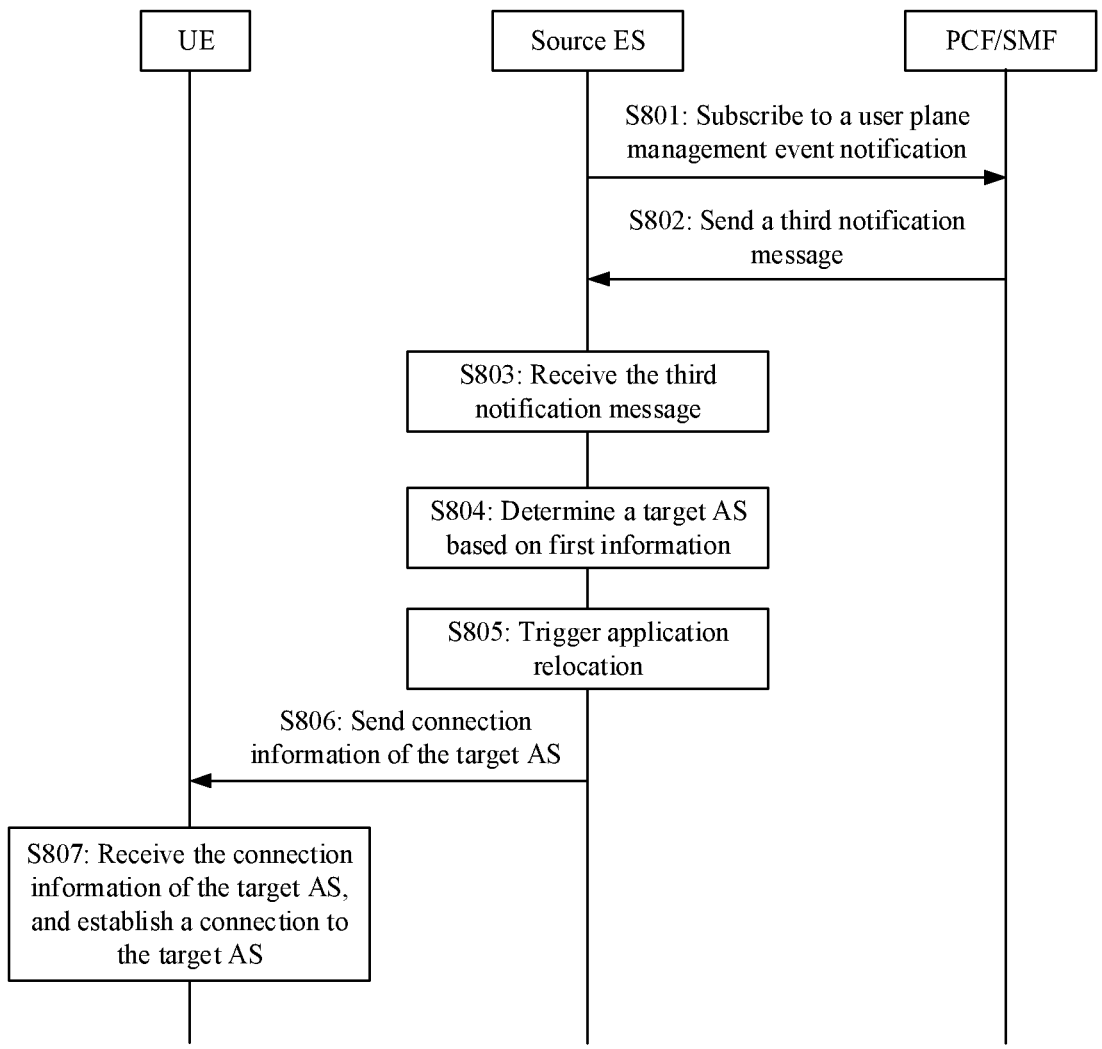
FIG. 8 is a schematic flowchart of another application relocation method according to an embodiment of this application.

FIG. 8 is a schematic flowchart of an application relocation method according to an embodiment of this application. The method relates to interaction between a source ES, a PCF entity/an SMF entity, and UE, and includes the following steps.

S801: The source ES subscribes to a user plane management event notification from the PCF entity or the SMF entity.

The user plane management event notification notifies the source ES when a user plane path of a PDU session of the UE changes.

For example, the source ES may directly subscribe to the user plane management event notification from the PCF entity or the SMF entity. It should be noted that, because whether the user plane path of the PDU session of the UE changes is managed by the SMF, the PCF may subscribe to a user plane management event from the SMF when the source ES subscribes to the user plane management event from the PCF. Therefore, the SMF may notify the PCF when determining to change the user plane path of the PDU session of the UE, and then the PCF notifies the source ES. Optionally, the SMF may directly notify the source ES when determining to change the user plane path of the PDU session of the UE.

Optionally, before step S801, the method may further include: The source ES requests to establish an association (policy association) with the PCF entity or the SMF entity, and the PCF entity or the SMF entity sends a session mode to the source ES, where the session mode may be an SSC mode 3.

S802: The PCF entity or the SMF entity sends a third notification message to the source ES.

The third notification message notifies the source ES that the user plane path of the PDU session of the UE changes. To be more specific, the PCF entity or the SMF entity sends the third notification message to the source ES when determining that the user plane path of the PDU session of the UE changes. Optionally, the third notification message may include first information. For descriptions of the first information, refer to the foregoing embodiments. Details are not described herein again.

It may be understood that the third notification message in step S802 is in response to the user plane management event notification subscribed to by the source ES from the PCF entity or the SMF entity in step S801.

S803: The source ES receives the third notification message.

S804: The source ES determines a target AS based on the first information.

For example, when the third notification message includes the first information, the source ES may determine the target AS based on the first information included in the third notification message. Optionally, when the third notification message does not include the first information, after receiving the third notification message, the source ES may send a request to a 5GC network element to obtain the first information, and determine the target AS based on the first information obtained from the 5GC network element. For example, the source ES may obtain location information of the UE from an AMF entity, obtain, from the SMF entity, a DNAI corresponding to a UPF that currently serves the UE, or obtain a current IP address of the UE from the SMF entity or a UPF entity.

It may be understood that for an example implementation in which the source ES determines the target AS based on the first information in step S804, refer to the implementation in which the source AF determines the target AS based on the first information in step S602. Details are not described herein again.

S805: The source ES triggers application relocation.

The application relocation means relocating an application server accessed by the UE from a source AS to the target AS.

Optionally, the source AS may trigger the application relocation in step S805. When the source AS triggers the application relocation in step S805, before step S805, the method may further include: The source ES sends connection information of the target AS to the source AS, such that the source AS relocates a context of the UE from the source AS to the target AS based on the connection information of the target AS.

It may be understood that step S805 in FIG. 8 is an optional step.

S806: The source ES sends the connection information of the target AS to the UE.

The connection information of the target AS includes address information of the target AS. The connection information of the target AS may be information such as an IP address of the target AS, a URI of the target AS, a URL of the target AS, or an end point of the target AS.

For example, the source ES may send the connection information of the target AS to an AC in the UE.

S807: The UE receives the connection information of the target AS, and establishes a connection to the target AS.

It may be understood that, for implementations of steps S806 and S807, refer to steps S706 and S707. Details are not described herein again.

It should be noted that an execution sequence of steps S801 to S807 is not limited in this application. FIG. 8 is merely an example for description.

It may be understood that, in the application relocation method provided in this embodiment of this application, the source ES subscribes to the user plane management event notification from the core network element, such that when the user plane path of the PDU session of the UE changes, the source ES can receive the third notification message sent by the core network element, determine the target AS based on the first information included in the third notification message, and trigger the application relocation. In the method, the target AS determined based on the location information that is of the UE and that is obtained after the user plane path of the PDU session of the UE changes is accurate. Therefore, a delay in accessing the target AS by the UE is short. In addition, in the method, the source ES triggers reselection of the target AS and the application relocation, and the AC in the UE is not modified. Therefore, the AC does not need to understand network logic, and a design of the AC can be simplified.

Figure 9:
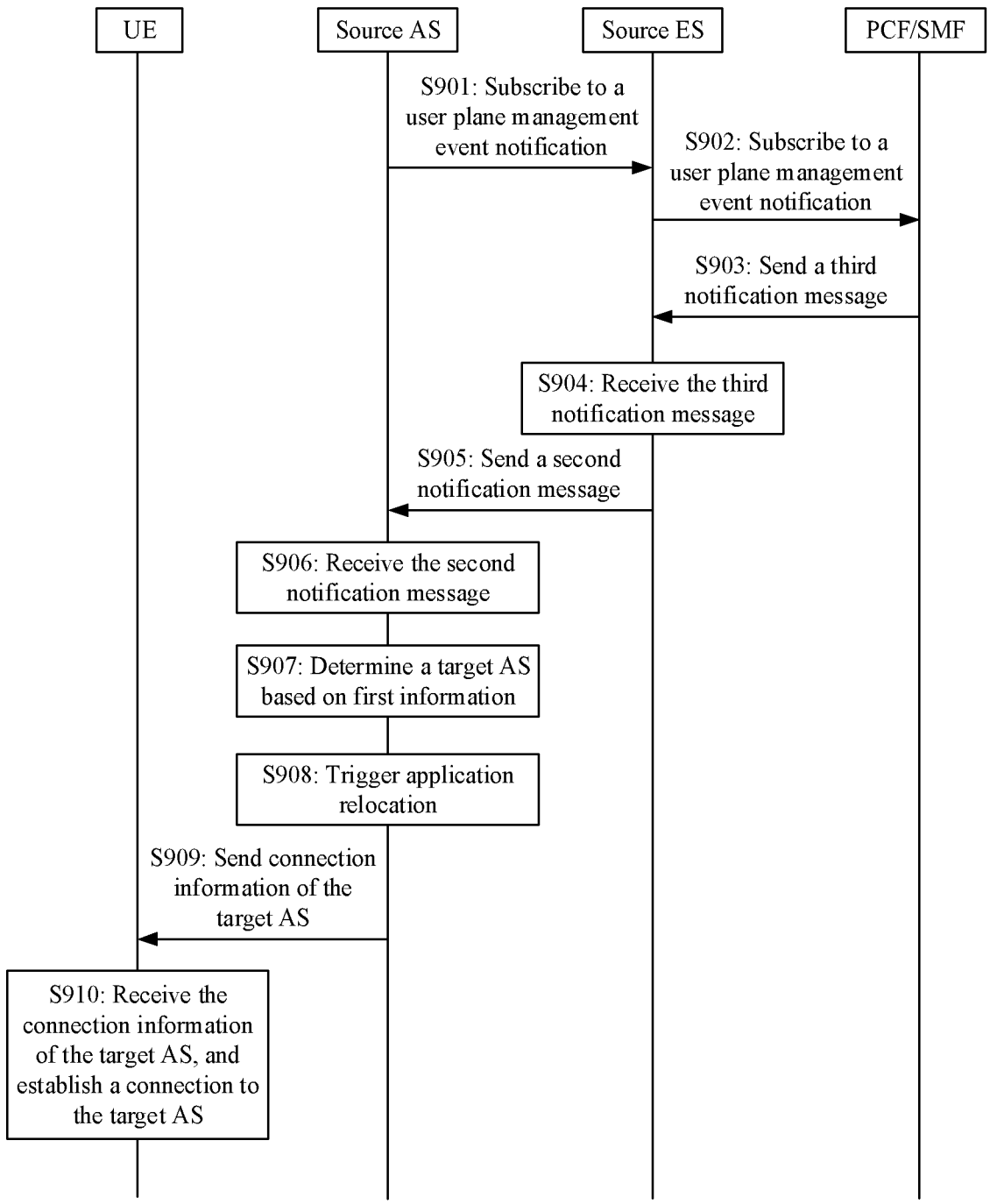
FIG. 9 is a schematic flowchart of another application relocation method according to an embodiment of this application.

FIG. 9 is a schematic flowchart of an application relocation method according to an embodiment of this application. The method relates to interaction between a source AS, a source ES, a PCF entity/an SMF entity, and UE, and includes the following steps.

S901: The source AS subscribes to a user plane management event notification from the source ES.

The user plane management event notification notifies the source AS when a user plane path of a PDU session of the UE changes.

S902: The source ES subscribes to a user plane management event notification from the PCF entity or the SMF entity.

The user plane management event notification notifies the source ES when the user plane path of the PDU session of the UE changes.

S903: The PCF entity or the SMF entity sends a third notification message to the source ES.

The third notification message notifies the source ES that the user plane path of the PDU session of the UE changes. To be more specific, the PCF entity or the SMF entity sends the third notification message to the source ES when determining that the user plane path of the PDU session of the UE changes. Optionally, the third notification message may include first information. For descriptions of the first information, refer to the foregoing embodiments. Details are not described herein again.

It may be understood that the third notification message in step S903 is in response to the user plane management event notification subscribed to by the source ES from the PCF entity or the SMF entity in step S902.

S904: The source ES receives the third notification message.

S905: The source ES sends a second notification message to the source AS.

The second notification message notifies the source AS that the user plane path of the PDU session of the UE changes. To be more specific, the source ES sends the second notification message to the source AS when determining that the user plane path of the PDU session of the UE changes. Optionally, the second notification message may include the first information. The first information may be a DNAI that is of the UE and that is obtained after the user plane path of the PDU session of the UE changes.

It may be understood that the second notification message in step S905 is in response to the user plane management event notification subscribed to by the source AS from the source ES in step S901.

S906: The source AS receives the second notification message.

S907: The source AS determines a target AS based on the first information.

For example, when the second notification message includes the first information, the source AS may determine the target AS based on the first information included in the second notification message. Optionally, when the second notification message does not include the first information, after receiving the second notification message, the source AS may send a request to a 5GC network element to obtain the first information, and determine the target AS based on the first information obtained from the 5GC network element.

It may be understood that for an example implementation in which the source AS determines the target AS based on the first information in step S907, refer to the implementation in which the source AF determines the target AS based on the first information in step S602. Details are not described herein again.

S908: The source AS triggers application relocation.

The application relocation means relocating an application server accessed by the UE from the source AS to the target AS.

Optionally, the source ES may trigger the application relocation in step S908. When the source ES triggers the application relocation in step S908, before step S908, the method may further include: The source AS sends connection information of the target AS to the source ES, such that the source ES relocates a context of the UE from the source AS to the target AS based on the connection information of the target AS.

It may be understood that step S908 in FIG. 9 is an optional step.

S909: The source AS sends the connection information of the target AS to the UE.

S910: The UE receives the connection information of the target AS, and establishes a connection to the target AS.

It may be understood that, for implementations of steps S909 and S910, refer to steps S706 and S707. Details are not described herein again.

It should be noted that an execution sequence of steps S901 to S910 is not limited in this application. FIG. 9 is merely an example for description.

It may be understood that, in the application relocation method provided in this embodiment of this application, the source AS subscribes to the user plane management event notification from the source ES, and the source ES subscribes to the user plane management event notification from the core network element, such that when the user plane path of the PDU session of the UE changes, the source ES can receive the notification message sent by the core network element, and send the notification to the source AS. The source AS may determine the target AS based on the first information included in the notification sent by the source ES, and trigger the application relocation. In the method, the target AS determined based on the location information that is of the UE and that is obtained after the user plane path of the PDU session of the UE changes is accurate. Therefore, a delay in accessing the target AS by the UE is short. In addition, in the method, the source AS triggers reselection of the target AS and the application relocation, and an AC in the UE is not modified. Therefore, the AC does not need to understand network logic, and a design of the AC can be simplified.

Figure 10:
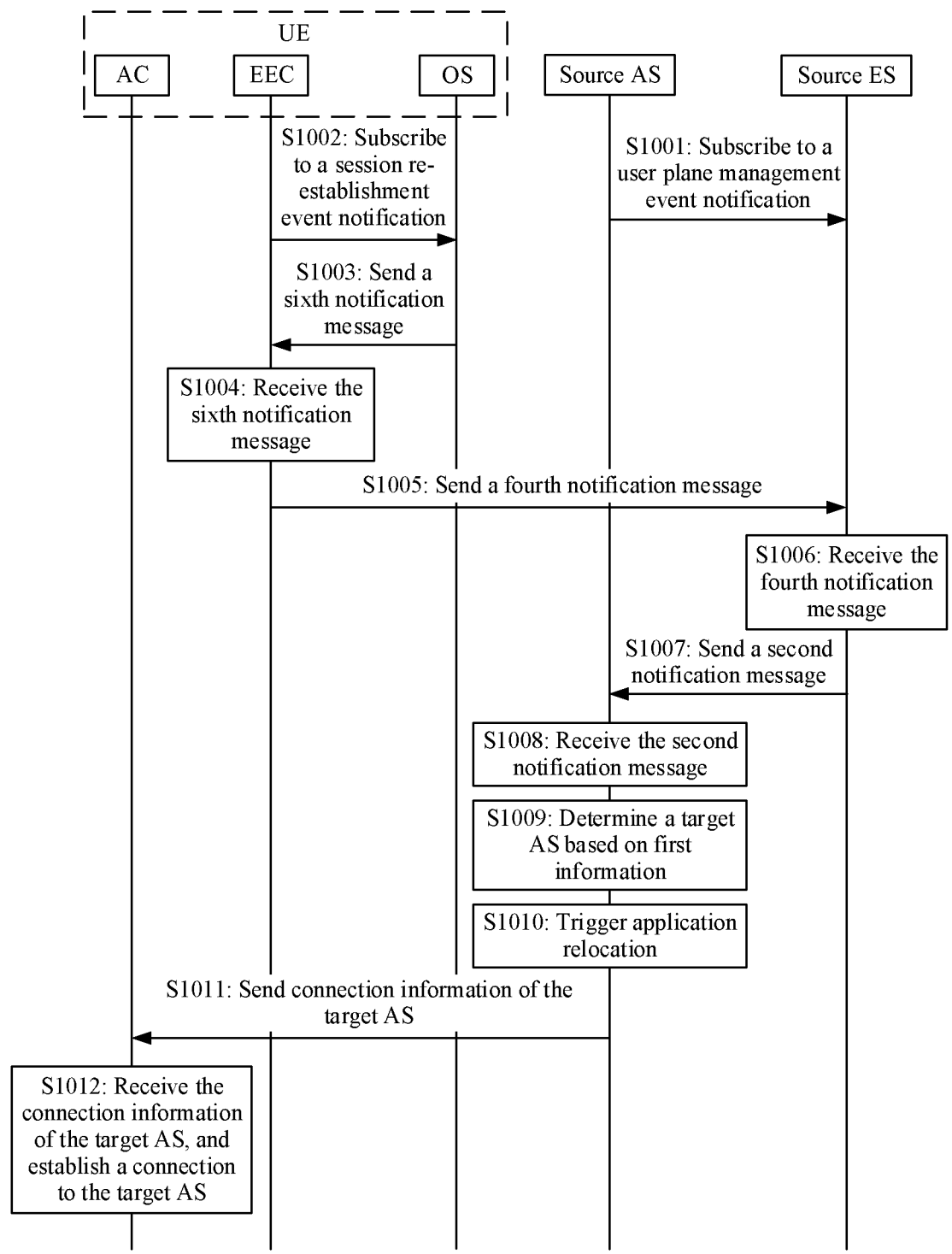
FIG. 10 is a schematic flowchart of another application relocation method according to an embodiment of this application.

FIG. 10 is a schematic flowchart of an application relocation method according to an embodiment of this application. The method relates to interaction between a source AS, a source ES, an EEC in UE, an OS in the UE, and an AC in the UE, and includes the following steps.

S1001: The source AS subscribes to a user plane management event notification from the source ES.

The user plane management event notification notifies the source AS when a user plane path of a PDU session of the UE changes. It may be understood that a change of the user plane path of the PDU session of the UE includes re-establishment of the PDU session of the UE.

S1002: The EEC in the UE subscribes to a session re-establishment event notification from the OS in the UE.

The session re-establishment event notification notifies the EEC in the UE when the PDU session of the UE is re-established.

S1003: The OS in the UE sends a sixth notification message to the EEC in the UE.

The sixth notification message notifies the EEC in the UE that the PDU session of the UE is re-established. To be more specific, the OS in the UE sends the sixth notification message to the EEC in the UE when determining that the PDU session of the UE is re-established. Optionally, the sixth notification message includes first information.

It may be understood that, the sixth notification message in step S1003 is in response to the session re-establishment event notification subscribed to by the EEC in the UE from the OS in the UE in step 1002.

S1004: The EEC in the UE receives the sixth notification message.

S1005: The EEC in the UE sends a fourth notification message to the source ES.

The fourth notification message notifies the source ES that the PDU session of the UE is re-established. To be more specific, the EEC in the UE sends the fourth notification message to the source ES when determining that the PDU session of the UE is re-established. Optionally, the fourth notification message includes the first information.

Optionally, the fourth notification message sent by the EEC in the UE to the source ES in step S1005 may include a new DNAI, a new IP address, and/or location identification information of the UE in a network.

S1006: The source ES receives the fourth notification message.

Optionally, when the fourth notification message does not include the first information, the source ES may send a request to a 5GC network element (for example, an AMF entity or an SMF entity) to obtain the first information, for example, obtain the location identification information of the UE in the network from the AMF entity, obtain, from the SMF entity, a DNAI corresponding to a UPF that currently serves the UE, or obtain, from the SMF entity or a UPF entity, a current IP address of the UE.

S1007: The source ES sends a second notification message to the source AS.

The second notification message notifies the source AS that the user plane path of the PDU session of the UE changes. To be more specific, the source ES sends the second notification message to the source AS when determining that the user plane path of the PDU session of the UE changes. Optionally, the second notification message may include the first information.

It may be understood that the second notification message in step S1007 is in response to the user plane management event notification subscribed to by the source AS from the source ES in step S1001.

S1008: The source AS receives the second notification message.

S1009: The source AS determines a target AS based on the first information.

For example, when the second notification message includes the first information, the source AS may determine the target AS based on the first information included in the second notification message. Optionally, when the second notification message does not include the first information, after receiving the second notification message, the source AS may send a request to the 5GC network element to obtain the first information, and determine the target AS based on the first information obtained from the 5GC network element.

Optionally, when the first information included in the second notification message is the IP address of the UE, after receiving the second notification message, the source AS may query the 5GC network element for path information of the IP address of the UE, and determine the target AS based on the path information. For example, the source AS may establish an AF policy association based on the IP address, query for the path information (for example, the DNAI corresponding to the session) of the session or location information of the UE using the AF policy association, and determine the target AS based on the DNAI or the location information of the UE.

It may be understood that for an implementation in which the source AS determines the target AS based on the first information in step S1009, refer to the implementation in which the source AF determines the target AS based on the first information in step S602. Details are not described herein again.

S1010: The source AS triggers application relocation.

Optionally, the source ES may trigger the application relocation in step S1010. When the source ES triggers the application relocation in step S1010, before step S1010, the method may further include: The source AS sends connection information of the target AS to the source ES, such that the source ES relocates a context of the UE from the source AS to the target AS based on the connection information of the target AS.

It may be understood that step S1010 in FIG. 10 is an optional step.

S1011: The source AS sends the connection information of the target AS to the UE.

The connection information of the target AS includes address information of the target AS. The connection information of the target AS may be information such as an IP address of the target AS, a URI of the target AS, a URL of the target AS, or an end point of the target AS.

For example, the source AS may send the connection information of the target AS to the AC in the UE.

S1012: The UE receives the connection information of the target AS, and establishes a connection to the target AS.

It may be understood that, for implementations of steps S1011 and S1012, refer to steps S706 and S707. Details are not described herein again.

It should be noted that an execution sequence of steps S1001 to S1012 is not limited in this application. FIG. 10 is merely an example for description.

It may be understood that in the application relocation method provided in this embodiment of this application, the EEC in the UE subscribes to the session re-establishment event notification from the OS in the UE, such that when the PDU session of the UE is re-established, the OS in the UE notifies the EEC in the UE, the EEC in the UE notifies the source ES, the source ES sends the notification to the source AS, and the source AS may determine the target AS based on the information included in the notification sent by the source ES, and trigger the application relocation. In the method, the target AS determined based on the location information that is of the UE and that is obtained after the user plane path of the PDU session of the UE changes is accurate. Therefore, a delay in accessing the target AS by the UE is short. In addition, in the method, the source AS triggers reselection of the target AS and the application relocation, and the AC in the UE is not modified. Therefore, the AC does not need to understand network logic, and a design of the AC can be simplified.

Figure 11:
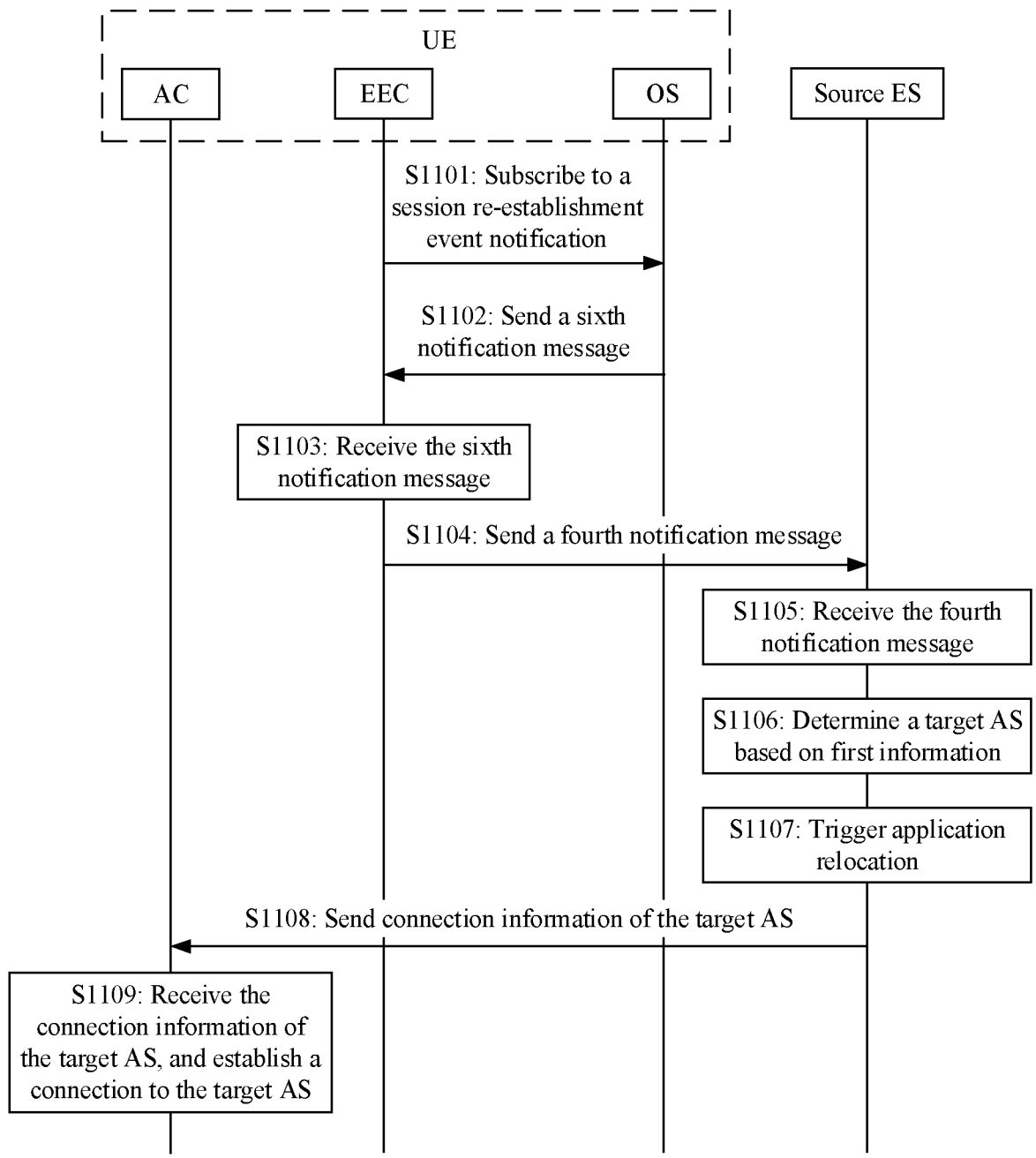
FIG. 11 is a schematic flowchart of another application relocation method according to an embodiment of this application.

FIG. 11 is a schematic flowchart of an application relocation method according to an embodiment of this application. The method relates to interaction between a source ES, an EEC in UE, an OS in the UE, and an AC in the UE, and includes the following steps.

S1101: The EEC in the UE subscribes to a session re-establishment event notification from the OS in the UE.

S1102: The OS in the UE sends a sixth notification message to the EEC in the UE.

S1103: The EEC in the UE receives the sixth notification message.

S1104: The EEC in the UE sends a fourth notification message to the source ES.

S1105: The source ES receives the fourth notification message.

It may be understood that, for implementations of steps S1101 to S1105, refer to the implementations of steps S1002 to S1006. Details are not described herein again.

S1106: The source ES determines a target AS based on first information.

For example, when the fourth notification message includes the first information, the source ES may determine the target AS based on the first information included in the fourth notification message. Optionally, when the fourth notification message does not include the first information, after receiving the fourth notification message, the source ES may send a request to a 5GC network element to obtain the first information, and determine the target AS based on the first information obtained from the 5GC network element.

It may be understood that for an implementation in which the source ES determines the target AS based on the first information in step S1106, refer to the implementation in which the source AF determines the target AS based on the first information in step S602. Details are not described herein again.

S1107: The source ES triggers application relocation.

Optionally, a source AS may trigger the application relocation in step S1107. When the source AS triggers the application relocation in step S1107, before step S1107, the method may further include: The source ES sends connection information of the target AS to the source AS, such that the source AS relocates a context of the UE from the source AS to the target AS based on the connection information of the target AS.

It may be understood that step S1107 in FIG. 11 is an optional step.

S1108: The source ES sends the connection information of the target AS to the UE.

For example, the source ES may send the connection information of the target AS to the AC in the UE.

S1109: The UE receives the connection information of the target AS, and establishes a connection to the target AS.

It should be noted that an execution sequence of steps S1101 to S1109 is not limited in this application. FIG. 11 is merely an example for description.

In the application relocation method provided in this embodiment of this application, the EEC in the UE subscribes to the session re-establishment event notification from the OS in the UE, such that when a PDU session of the UE is re-established, the OS in the UE notifies the EEC in the UE, the EEC in the UE notifies the source ES, and the source ES determines the target AS and triggers the application relocation. In the method, the target AS determined based on location information of the UE after a user plane path of the PDU session of the UE changes is accurate. Therefore, a delay in accessing the target AS by the UE is short. In addition, in the method, the source ES triggers reselection of the target AS and the application relocation, and the AC in the UE is not modified. Therefore, the AC does not need to understand network logic, and a design of the AC can be simplified.

Figure 12:
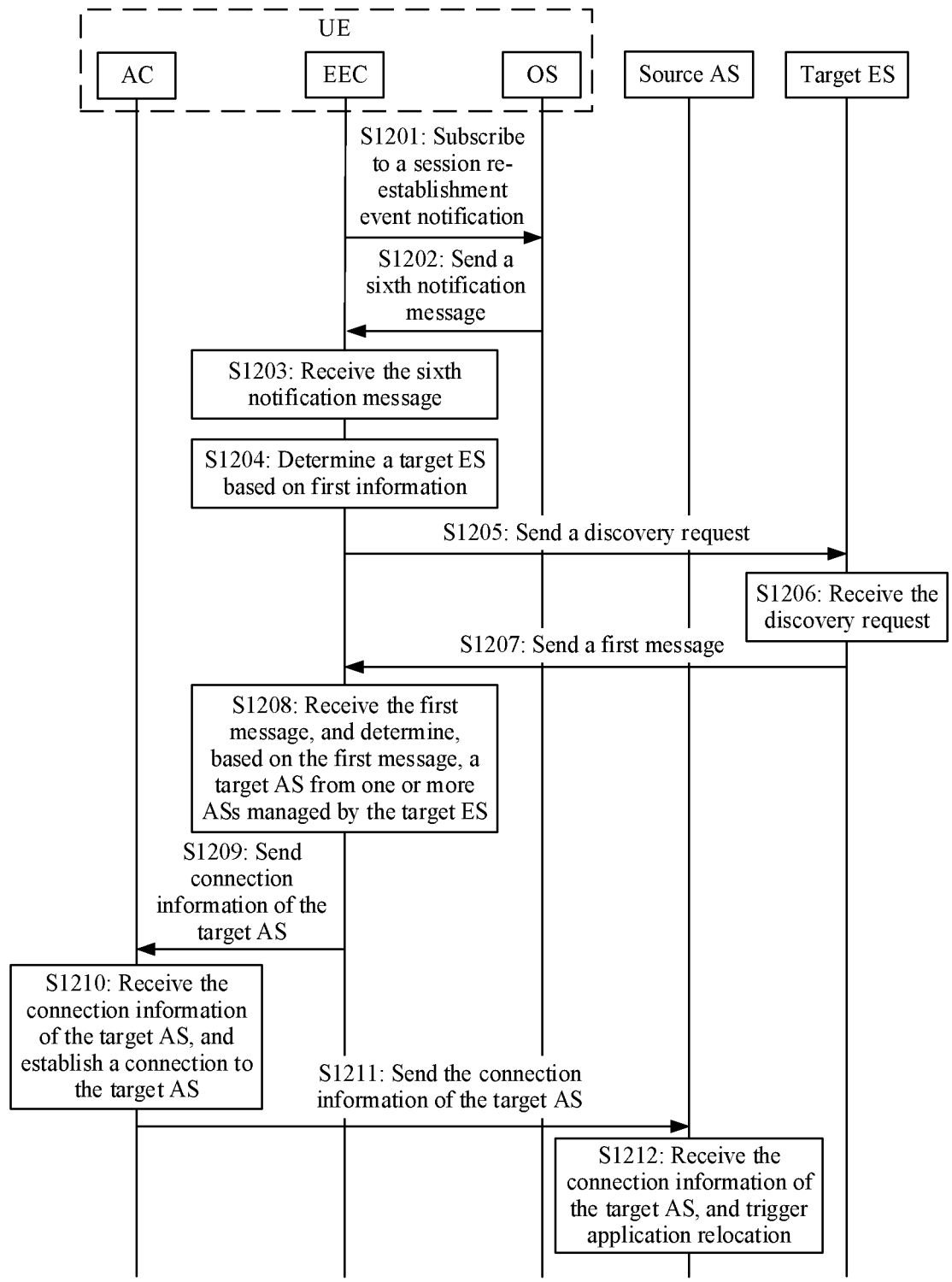
FIG. 12 is a schematic flowchart of another application relocation method according to an embodiment of this application.

FIG. 12 is a schematic flowchart of an application relocation method according to an embodiment of this application. The method relates to interaction between a source AS, a target ES, an EEC in UE, an OS in the UE, and an AC in the UE, and includes the following steps.

S1201: The EEC in the UE subscribes to a session re-establishment event notification from the OS in the UE.

S1202: The OS in the UE sends a sixth notification message to the EEC in the UE.

S1203: The EEC in the UE receives the sixth notification message.

For example, after receiving the sixth notification message, the EEC in the UE learns, based on the sixth notification message, that a PDU session of the UE is re-established, and determines that application relocation needs to be performed.

It may be understood that, for implementations of steps S1201 to S1203, refer to the implementations of steps S1002 to S1004. Details are not described herein again.

S1204: The EEC in the UE determines the target ES based on first information.

For example, when the sixth notification message includes the first information, the EEC in the UE may determine the target ES based on the first information in the sixth notification message.

In an implementation, the target ES and a source ES are a same ES. In another implementation, the target ES and a source ES are different ESs.

The target ES may be an ES deployed in a DN accessible by the UE. Optionally, there may be one or more DNs accessible by the UE.

S1205: The EEC in the UE sends a discovery request to the target ES.

The discovery request requests a list of one or more ASs managed by the target ES. Optionally, the list of ASs may be a list of ASs serving a same application as the source AS. For example, the source AS is an AS of Tencent Video, and the discovery request requests a list of one or more ASs of Tencent Video that are managed by the target ES.

Optionally, the discovery request may include identification information of the source AS.

S1206: The target ES receives the discovery request.

S1207: The target ES sends a first message to the EEC in the UE.

The first message includes connection information of the one or more ASs managed by the target ES. Optionally, the one or more ASs may serve the same application as the source AS. For example, the target ES sends the UE connection information of all the ASs of Tencent Video that are managed by the target ES.

S1208: The EEC in the UE receives the first message, and determines, based on the first message, a target AS from the one or more ASs managed by the target ES.

For example, the EEC in the UE may select one AS as the target AS from the one or more ASs managed by the target ES. In an implementation, the first message includes one or more priorities of the one or more ASs, and the EEC selects an AS with a highest priority as the target AS.

S1209: The EEC in the UE sends connection information of the target AS to the AC in the UE.

S1210: The AC in the UE receives the connection information of the target AS, and establishes a connection to the target AS.

S1211: The AC in the UE sends the connection information of the target AS to the source AS.

Optionally, in step S1211, the AC in the UE may alternatively send the connection information of the target AS to the source ES, such that the source ES receives the connection information of the target AS and relocates a context of the UE from the source AS to the target AS.

S1212: The source AS receives the connection information of the target AS, and triggers the application relocation.

For example, after receiving the connection information of the target AS, the source AS may perform state relocation between the source AS and the target AS, where the state relocation is also referred to as application context relocation.

The application relocation means relocating the context of the UE from the source AS to the target AS.

Optionally, when the AC in the UE sends the connection information of the target AS to the source ES in step S1211, the source ES may receive the connection information of the target AS and trigger the application relocation in step S1212. In other words, in this embodiment, the source AS or the source ES may trigger the application relocation.

It may be understood that steps S1211 and S1212 are optional steps. To shorten a delay in accessing the application by the UE, the source AS or the source ES may perform context synchronization between the source AS and the target AS.

It should be noted that an execution sequence of steps S1201 to S1212 is not limited in this application. FIG. 12 is merely an example for description.

It may be understood that, in the application relocation method provided in this embodiment of this application, the EEC in the UE subscribes to the session re-establishment event notification from the OS in the UE, such that when the PDU session of the UE is re-established, the OS in the UE notifies the EEC in the UE, the EEC in the UE determines the target AS and sends the connection information of the target AS to the source ES or the source AS, and the source ES or the source AS triggers the application relocation. In the method, the target AS determined based on location information of the UE after a user plane path of the PDU session of the UE changes is accurate. Therefore, a delay in accessing the target AS by the UE is short. In addition, in the method, the source ES or the source AS triggers reselection of the target AS and the application relocation, and the AC in the UE is not modified. Therefore, the AC does not need to understand network logic, and a design of the AC can be simplified.

An example in which a source ES subscribes to a user plane management event notification from a PCF entity/an SMF entity is used. When UE accesses a source AS (where for example, the source AS is an AS of Tencent Video) deployed in a source DN, if the UE moves and a PDU session of the UE is re-established, the source ES may learn, from the PCF entity/SMF entity, that a user plane path of the PDU session of the UE changes. However, because the source ES does not know an AS that is in the source DN and that is currently accessed by the UE, the source ES sends, to all ASs deployed in the source DN, a notification message indicating that the user plane path of the PDU session of the UE changes, but the UE may access only the AS of Tencent Video in the source DN. Therefore, the notification message sent by the source ES to another AS (an AS that is deployed in the source DN and that is not accessed by the UE) is invalid. In addition, after the movement, if no AS of Tencent Video is deployed in a DN accessible by the UE, a notification message sent by the source ES to the source AS is invalid. Therefore, to reduce an invalid notification in an application relocation process, embodiments of this application further provides an application relocation method. In the method, a source AS sends a subscription request to the source ES, such that when determining that a target AS exists, the source ES can send a notification message including connection information of the target AS to the source AS. This can reduce the invalid notification in the application relocation process.

Figure 13:
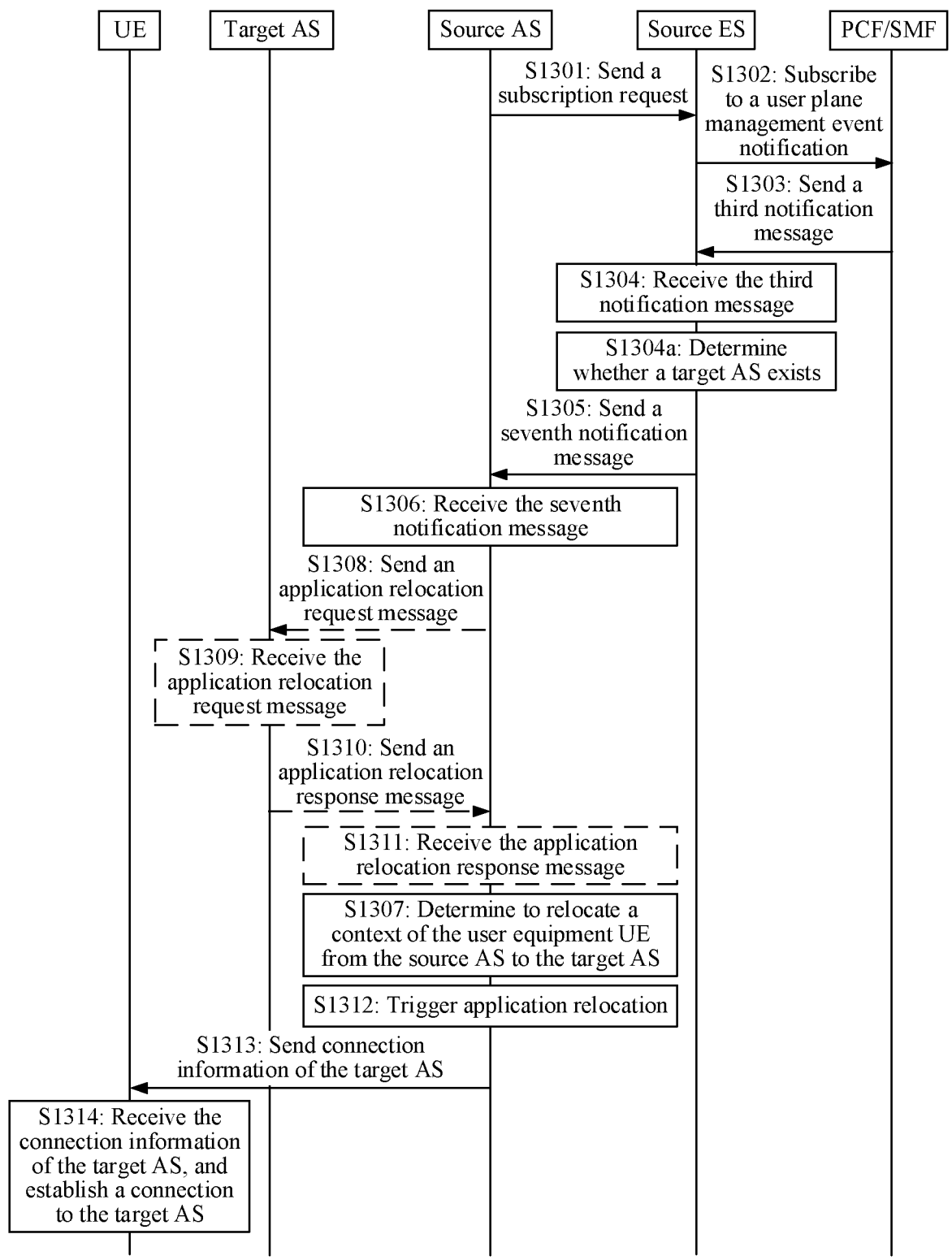
FIG. 13 is a schematic flowchart of another application relocation method according to an embodiment of this application.

FIG. 13 is a schematic flowchart of an application relocation method according to an embodiment of this application. The method relates to interaction between a source AS, a source ES, a PCF entity/an SMF entity, a target AS, and UE, and includes the following steps.

S1301: The source AS sends a subscription request to the source ES.

The subscription request indicates to notify the source AS when the source ES determines that the target AS exists. Optionally, the subscription request may further notify the source AS when the source ES determines that the target AS exists in a DN accessible by the UE. In an implementation, the subscription request may be an application relocation event notification, and a name of the subscription request is not limited.

Optionally, the subscription request may include application identification information. The application identification information is identification information, for example, an application ID, corresponding to an application, or is identification information, for example, an EAS ID (edge application server ID), of a server corresponding to an application.

For example, the target AS and the source AS serve the same application. To be more specific, the target AS and the source AS have a same application identifier (edge application server ID, EAS ID).

Optionally, the source ES obtains an available AS or an accessible AS from a target ES or a CS, and determines that the target AS exists in the DN accessible by the UE, to relocate an application server accessed by the UE from the source AS to the target AS. This improves user experience, for example, achieves a shorter delay and higher bandwidth.

Optionally, the source AS may send the subscription request to the source ES when or after the UE establishes a connection to the source AS.

For example, the DN accessible by the UE may be one or more data networks that can be accessed by the UE at a location to which the UE moves. It may be understood that, after the UE moves, an AS that serves the same application as the source AS may not be deployed in the data network accessible by the UE. Therefore, the subscription request is sent, such that the source ES can notify the source AS when determining that the AS that serves the same application as the source AS exists in the data network accessible by the UE, to initiate application relocation.

In an implementation, a DN has a specific service range or service area. When the UE enters the specific service range or service area, it may be considered that the DN is a DN accessible by the UE. Otherwise, it may be considered that the DN is not a DN accessible by the UE at a current location. It should be understood that the UE may access zero, one, or more DNs at the current location. In other words, the subscription request may notify the source AS when the source ES determines that the target AS that can serve the UE at the current location exists, where the target AS and the source AS serve the same application. For example, an AS has a specific service range or service area. When the UE is in the specific service range or service area, it may be considered that the AS can serve the UE at a current location; otherwise, it may be considered that the AS cannot serve the UE at the current location. It should be understood that, that the source ES determines that the target AS exists in the DN accessible by the UE has a same meaning as that the source ES determines that the target AS that can serve the UE at the current location exists. The following provides descriptions by only using an example in which the source ES determines that the target AS exists in the DN accessible by the UE.

Optionally, step S1301 may alternatively be: The source AS sends the source ES indication information indicating whether the source AS supports the application relocation or indicating whether an application corresponding to the source AS supports relocation. It may be understood that the source AS sends the source ES indication information indicating that the source AS supports the application relocation, such that when determining that the target AS exists in the DN accessible by the UE, the source ES may directly perform application relocation or determine to perform application relocation. It should be noted that the application relocation in embodiments of this application may also mean relocating a context of the UE from the source AS to the target AS.

Optionally, the subscription request may further include information about a PDU session of the UE. The information about the PDU session of the UE includes at least one of an IP address of the UE, a data network name (DNN), or single network slice selection assistance information (S-NSSAI). Optionally, the source ES may determine the PCF entity or the SMF entity based on the information about the PDU session of the UE that is included in the subscription request.

Optionally, the subscription request includes application identification information. The source ES may determine the target AS based on the application identification information, and notify the source AS when determining that the target AS that can serve the UE at the current location exists. In another implementation, the source ES may determine, based on the received subscription request of the source AS, the application identification information corresponding to the source AS.

S1302: The source ES subscribes to a user plane management event notification from the PCF entity or the SMF entity, where the user plane management event notification notifies the source ES when a user plane path of the PDU session of the UE changes. Optionally, a change of the user plane path of the PDU session of the UE includes re-establishment of the PDU session of the UE. Alternatively, the source ES subscribes to a mobility event notification or a location change event notification for the UE from an AMF entity, where the mobility event notification or the location change event notification notifies the source ES when the location of the UE changes. Optionally, a location change granularity may include a cell change, a RAN change, a TA change, a RA change, or the like of the UE. This is not limited in this application.

It may be understood that, that the source ES subscribes to the notification from the PCF entity, the SMF entity, or the AMF entity may be that the source ES directly subscribes to the notification from the PCF entity, the SMF entity, or the AMF entity, or may subscribe to the notification through another entity, for example, a NEF. This is not limited in this application.

Optionally, in this embodiment, an SSC mode of the PDU session of the UE may be an SSC mode 1, an SSC mode 2, or an SSC mode 3.

S1303: The PCF entity or the SMF entity sends a third notification message to the source ES.

It may be understood that the third notification message in step S1303 is in response to the user plane management event notification subscribed to by the source ES from the PCF entity or the SMF entity in step S1302, or may be in response to the location change event notification subscribed to by the source ES from the AMF entity in step S1302. Optionally, the third notification message may include first information. For related descriptions of the first information, refer to the foregoing embodiments. Details are not described herein again.

Optionally, step S1303 may alternatively be: The AMF entity sends a third notification message to the source ES.

Optionally, the third notification message may be an earlier notification sent by the SMF or the PCF, and indicates to the source ES that a 5GC is to switch or expects to switch the user plane path of the UE session.

S1304: The source ES receives the third notification message.

S1304a: The source ES determines whether the target AS exists.

Optionally, that the source ES determines, based on the first information, whether the target AS exists in the DN accessible by the UE includes: The source ES may request the CS or the target ES to determine whether the target AS exists in the DN accessible by the UE. In an implementation, the source ES sends the first information and the application identification information to the CS. The CS determines the target ES based on the first information and the application identification information, and sends the target ES to the source ES. The source ES learns, from the target ES, that one or more ASs exist in the DN accessible by the UE, where the target ES is located in the DN accessible by the UE. The target ES sends information about the one or more ASs to the source ES. If the target ES manages a plurality of ASs, the target ES may determine one AS and send information about the AS to the source ES; or the target ES may send information about the plurality of ASs to the source ES, and the source ES determines the target AS. In another implementation, the source ES sends the first information and the application identification information to the CS. The CS determines, based on the first information and the application identification information, that one or more ASs exist in the DN accessible by the UE, and sends information about the one or more ASs to the source ES. The source ES determines the target AS. In another implementation, the source ES sends the first information and the application identification information to the target ES. The target ES determines, based on the first information and the application identification information, that one or more ASs exist in a DN corresponding to the target ES, and sends information about the one or more ASs to the source ES. The source ES determines the target AS. If the source ES obtains the target AS from the target ES or the CS, the source ES determines that the accessible target AS exists; otherwise, the source ES determines that the accessible target AS does not exist. It may be understood that, if both the source AS and the target ES are managed by the source ES, the source ES and the target ES may be a same ES, and interaction between the source ES and the target ES may be skipped. The information about the AS may be connection information of the AS.

Optionally, that the source ES determines whether the target AS exists may include: The source ES determines, based on the first information and the application identification information, whether the target AS exists. In an implementation, the first information included in the third notification message is a DNAI corresponding to the user plane path of the PDU session of the UE. If the source ES determines that an AS corresponding to the application identification information exists in a DN corresponding to the DNAI, the source ES determines that the target AS exists. Otherwise, the source ES determines that the AS corresponding to the application identification information does not exist in the DN corresponding to the DNAI, and the source ES may send the first information and the application identification information to the CS or the target ES to determine the target AS. The method is the same as that described above, and details are not described again.

Optionally, if the source ES determines that the target AS does not exist in the DN accessible by the UE, To be more specific, no AS that serves the same application as the source AS is deployed in the DN accessible by the UE, the source ES does not send a notification message to the source AS or sends a notification message indicating that the target AS does not exist, the source AS does not trigger the application relocation, and the UE continues to access the source AS.

Optionally, after receiving the third notification message, the source ES performs the step of determining whether the target AS exists in the DN accessible by the UE. Alternatively, after detecting that the source AS is overloaded, the source ES performs the step of determining whether the target AS exists in the DN accessible by the UE. In another case, this step is not performed, to save computing resources.

Optionally, if the source ES determines that the target AS exists in the DN accessible by the UE, steps S1305 to S1314 continue to be performed.

S1305: The source ES sends a seventh notification message to the source AS.

In an implementation, the source ES sends the seventh notification message to the source AS when determining that the target AS exists in the DN accessible by the UE. Optionally, the seventh notification message includes connection information of the target AS.

Optionally, when the source ES determines that the target AS does not exist in the DN accessible by the UE, the source ES may send the source AS a notification message indicating that the target AS does not exist in the DN accessible by the UE. Alternatively, when the source ES determines that no target AS that can serve the UE at the current location exists, the source ES may send the source AS a notification message indicating that no target AS that can serve the UE at the current location exists.

Optionally, if the source AS sends the indication information to the source ES in S1301, where the indication information indicates that the source AS supports the application relocation, and if the source ES determines that the accessible target AS exists, the source ES may directly determine that the application relocation needs to be performed, in other words, the source ES determines to perform application relocation. Subsequently, a step in which the source AS determines that the application relocation needs to be performed may be skipped.

In another implementation, the source ES sends the seventh notification message to the source AS if the source ES directly determines that the application relocation needs to be performed, where the seventh notification message indicates the source AS to send the context of the UE to the target AS.

It may be understood that the seventh notification message in step S1305 is in response to the subscription request sent by the source AS to the source ES in step S1301. The source ES sends the seventh notification message to the source AS when determining that the target AS exists in the DN accessible by the UE.

S1306: The source AS receives the seventh notification message.

S1307: The source AS determines to relocate the context of the UE from the source AS to the target AS.

Step S1307 may alternatively be: The source AS determines that the application relocation needs to be performed, or the source AS determines to perform application relocation. The application relocation means relocating the context of the UE from the source AS to the target AS. Alternatively, the application relocation refers to application context relocation, To be more specific, relocating the context on the source AS to the target AS. The context of the UE may also be referred to as an application context, and a name of the context is not limited. In an implementation, the source AS sends the context of the UE to the target AS. In another implementation, the source AS sends the context of the UE to the source ES, and subsequently the source ES sends the context to the target AS. The source ES may need to send the context to the target AS through the target ES.

Optionally, the source AS may further send fourth indication information to the source ES, where the fourth indication information indicates the source ES to relocate the context of the UE from the source AS to the target AS.

In an implementation, the source AS receives the seventh notification message, where the seventh notification message includes the connection information of the target AS. The source AS determines that the application relocation needs to be performed. In another implementation, the source AS may determine, based on different scenarios, whether the application relocation needs to be performed, in other words, the source AS may determine that the application relocation needs to be performed or does not need to be performed. For example, the source AS may determine, based on load, service urgency, and another factor, that the application relocation is currently not suitable. This is not limited in this application.

In an implementation, if the source ES determines that the application relocation needs to be performed, the source AS performs application relocation after receiving the seventh notification message.

For example, after receiving the seventh notification message, the source AS may directly determine to trigger the application relocation. To be more specific, when the target AS exists in the DN accessible by the UE, the source AS directly determines to trigger the application relocation.

Optionally, before step S1307, the method may further include steps S1308 to S1311. The source AS may negotiate with the target AS to determine whether the application relocation can be performed currently.

(Optional) S1308: The source AS sends an application relocation request message to the target AS.

The application relocation request message is for relocating the context on the source AS to the target AS.

Optionally, the application relocation request message may alternatively request the target AS to allocate a resource for the application relocation.

(Optional) S1309: The target AS receives the application relocation request message.

(Optional) S1310: The target AS sends an application relocation response message to the source AS.

The application relocation response message includes third indication information, and the third indication information indicates whether the target AS agrees or accept the application relocation.

For example, the target AS may determine, with reference to a resource usage status of the target AS, whether to agree to or accept the application relocation request. If the target AS has a large quantity of remaining resources, the target AS determines to accept the application relocation. The third indication information may indicate that the target AS agrees application relocation.

(Optional) S1311: The source AS receives the application relocation response message.

That the source AS determines to relocate the context of the UE from the source AS to the target AS in step S1307 may include: The source AS determines, based on the third indication information, to relocate the context of the UE from the source AS to the target AS. If the third indication information in the application relocation response message indicates that the target AS agrees application relocation, the source AS determines to trigger the application relocation.

Optionally, the source AS sends fifth indication information to the source ES, where the fifth indication information indicates whether the source AS supports the application relocation, indicates whether the source AS agrees application relocation, or indicates whether the source AS is to perform application relocation. It may be understood that the fifth indication information is in response to the seventh notification message. To be more specific, after the source ES sends, to the source AS, the seventh notification message indicating that the target AS exists in the DN accessible by the UE, the source AS sends, to the source ES, the fifth indication information indicating whether the source AS supports the application relocation.

Optionally, after receiving the fifth indication information, the source ES sends sixth indication information to the 5GC (for example, the SMF, the PCF, or the AMF), where the sixth indication information indicates whether the source AS supports the application relocation. It may be understood that the sixth indication information is in response to the third notification message. The 5GC may determine, based on the sixth indication information, whether to terminate switching of the user plane path of the session. For example, if the sixth indication information indicates that the source AS does not support the application relocation, the SMF terminates the switching of the user plane path of the PDU session of the UE after receiving the sixth indication information sent by the source ES.

Optionally, the source AS may further send seventh indication information to the source ES, where the seventh indication information indicates that service continuity needs to be maintained during the application relocation. The seventh indication information is for establishing a forwarding tunnel between UPFs when the DNAI changes, to implement the service continuity, and help the UE send application data to the source AS.

Optionally, after receiving the seventh indication information, the source ES sends eighth indication information to the SMF or the PCF, where the eighth indication information indicates that the service continuity needs to be maintained during the application relocation. In this way, the source ES sends the eighth indication information to the 5GC network element after completing the relocation, such that the 5GC network element can release the forwarding tunnel. S1312: The source AS triggers the application relocation.

It may be understood that step S1312 in FIG. 13 is an optional step.

In an implementation, the source AS triggers the application relocation if the source AS receives the connection information of the target AS.

In an implementation, the source AS directly sends the application context to the target AS.

In another implementation, the source AS sends the application context to the source ES, the source ES sends the context to the target ES, and then the target ES sends the context to the target AS.

S1313: Optionally, the source AS sends the connection information of the target AS to the UE.

Optionally, step S1313 may alternatively be: The source ES sends the connection information of the target AS to the UE; or the source ES sends the connection information of the target AS to the 5GC network element (for example, the SMF or the PCF), and then the 5GC network element sends the connection information of the target AS to the UE.

S1314: Optionally, the UE receives the connection information of the target AS, and establishes a connection to the target AS.

Optionally, the connection information of the target AS that may be received by the UE may be from the source AS, the source ES, the 5GC network element, or another device. This is not limited in this embodiment of this application.

It should be noted that an execution sequence of steps S1301 to S1314 is not limited in this application. FIG. 13 is merely an example for description.

It may be understood that, in the application relocation method provided in this embodiment, the source AS sends the subscription request to the source ES, such that when determining that the target AS exists, the source ES can send the notification message including the connection information of the target AS to the source AS, and then the source AS triggers the application relocation. After the user plane path of the PDU session of the UE changes, the AS that serves the same application as the source AS may not be deployed in the data network accessible by the UE. Therefore, the subscription request is sent, such that the source ES can notify the source AS when determining that the AS that serves the same application as the source AS exists in the data network accessible by the UE, to initiate the application relocation. Therefore, an invalid notification in an application relocation process can be reduced, to shorten a delay.

Optionally, an embodiment of this application further provides an application relocation method. The method may include: A source AS sends, to a source ES, indication information indicating whether the source AS supports application relocation. The source ES receives the indication information. The source ES subscribes to a user plane management event notification or a mobility event notification from a 5GC network element. The 5GC network element sends a third notification message to the source ES when a user plane path of a PDU session of UE changes or a location of the UE changes. The source ES receives the third notification message, and determines, based on first information, whether a target AS exists in a DN accessible by the UE. If the indication information indicates that the source AS supports the application relocation, after determining that the target AS exists in the DN accessible by the UE, the source ES determines to perform application relocation. The source ES may request a context on the source AS from the source AS, and relocate the context on the source AS to the target AS.

Figure 14:
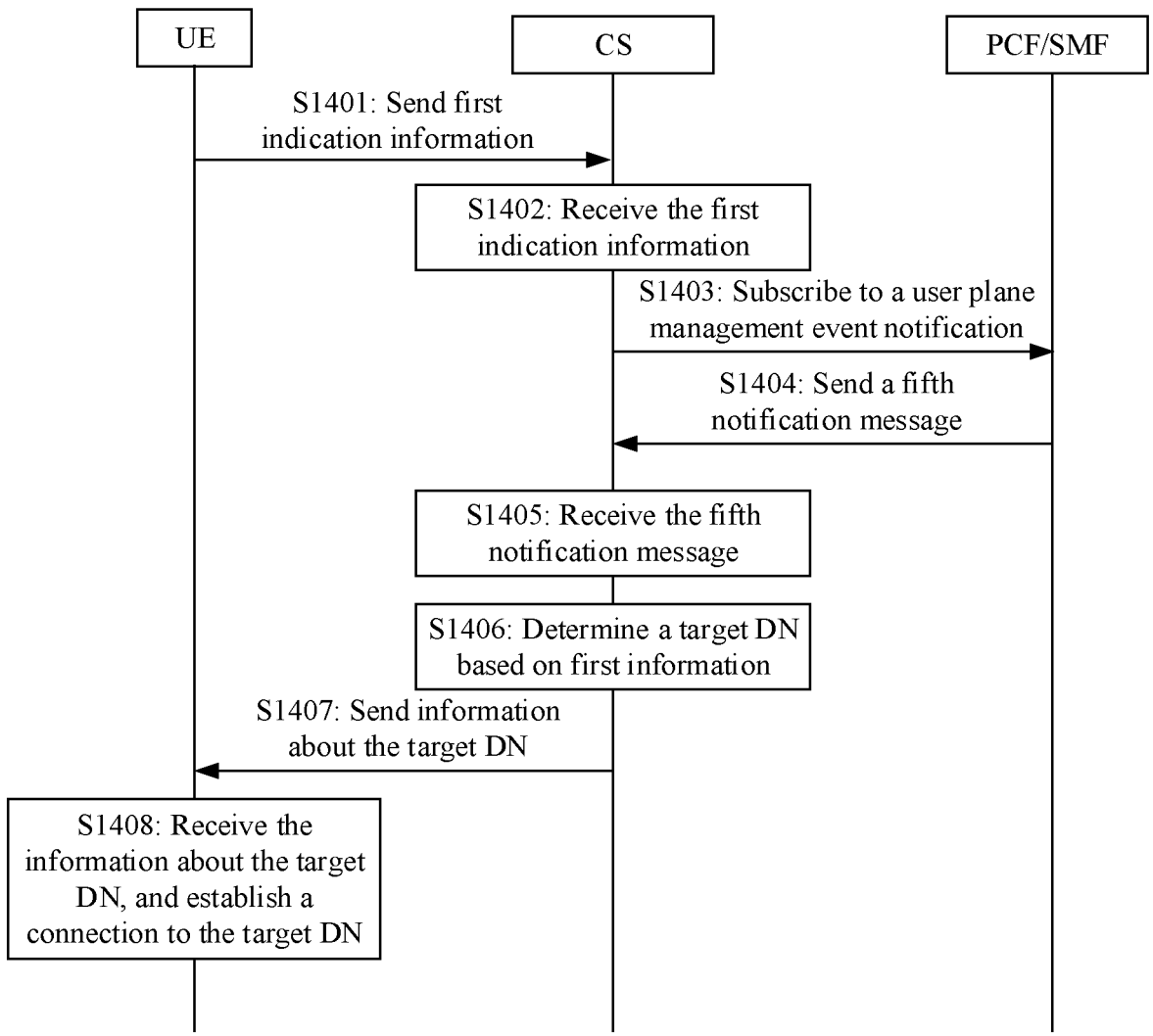
FIG. 14 is a schematic flowchart of another application relocation method according to an embodiment of this application.

For example, a data network serving UE may change in a movement process of the UE, and a CS may update information about the data network that is to be delivered to the UE. Therefore, an embodiment of this application further provides an application relocation method. The method relates to how to update network information in an application relocation process. FIG. 14 is a schematic flowchart of the method. The method relates to interaction between a CS, UE, and a PCF entity/an SMF entity, and includes the following steps.

S1401: The UE sends first indication information to the CS.

The first indication information indicates the CS to send information about a target DN to the UE when a user plane path of a PDU session of the UE changes.

Optionally, in this embodiment, a change of the user plane path of the PDU session of the UE includes re-establishment of the PDU session of the UE. In this embodiment, an SSC mode of the PDU session of the UE may be an SSC mode 3. When the PDU session of the UE is re-established, a handover of a data network accessed by the UE may correspondingly occur.

Optionally, the CS in this embodiment may be the ECS in FIG. 2, and the DN may be the EDN in FIG. 2.

S1402: The CS receives the first indication information.

S1403: The CS subscribes to a user plane management event notification from the PCF entity or the SMF entity.

The user plane management event notification notifies the CS when the user plane path of the PDU session of the UE changes.

S1404: The PCF entity or the SMF entity sends a fifth notification message to the CS.

The fifth notification message notifies the CS that the user plane path of the PDU session of the UE changes. To be more specific, the PCF entity or the SMF entity sends the fifth notification message to the CS when determining that the user plane path of the PDU session of the UE changes. Optionally, the fifth notification message may include first information. For descriptions of the first information, refer to the foregoing embodiments. Details are not described herein again.

It may be understood that the fifth notification message in step S1404 is in response to the user plane management event notification subscribed to by the CS from the PCF entity or the SMF entity in step S1403.

S1405: The CS receives the fifth notification message.

S1406: The CS determines the target DN based on the first information.

For example, the CS may determine the target DN based on the first information included in the fifth notification message. For example, the first information is a DNAI of the UE.

Optionally, the CS may alternatively query the PCF entity or the SMF entity for information about a UPF based on the first information included in the fifth notification message, and determine the target DN based on the information about the UPF. For example, the CS may query the PCF entity or the SMF entity for a DNAI based on an IP address of the UE included in the fifth notification message, and determine the target DN based on the DNAI.

S1407: The CS sends the information about the target DN to the UE.

S1408: The UE receives the information about the target DN, and establishes a connection to the target DN.

It should be noted that an execution sequence of steps S1401 to S1408 is not limited in this application. FIG. 14 is merely an example for description.

In this embodiment, the UE indicates the CS to send the information about the target DN to the UE when the PDU session of the UE is re-established, such that the CS can send the information about the target DN to the UE when the PDU session of the UE is re-established, to enable the UE to access the target DN.

Figure 15:
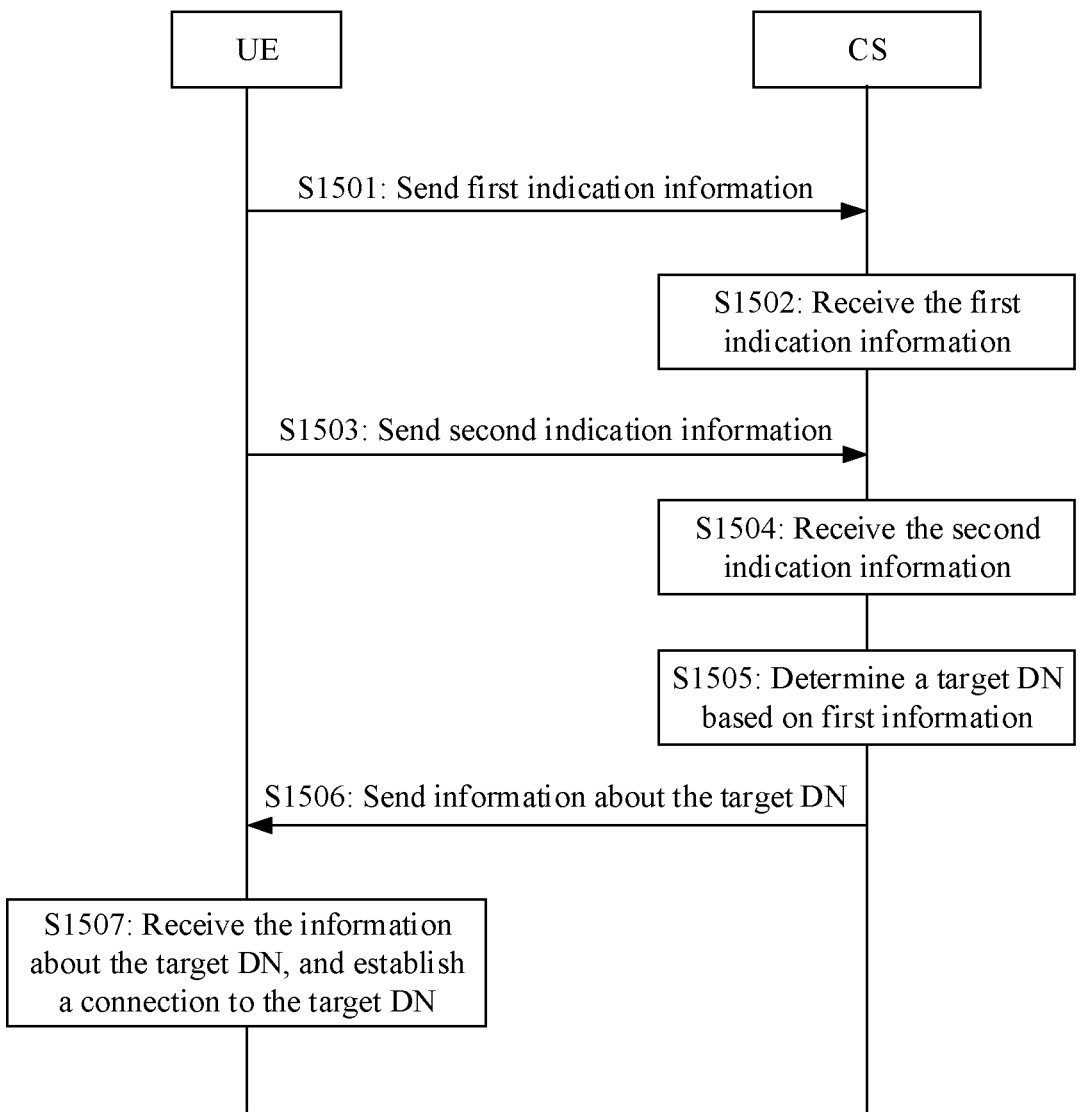
FIG. 15 is a schematic flowchart of another application relocation method according to an embodiment of this application.

For example, an embodiment of this application further provides an application relocation method. The method relates to how to update network information in an application relocation process. FIG. 15 is a schematic flowchart of the method. The method relates to interaction between a CS and UE, and includes the following steps.

S1501: The UE sends first indication information to the CS.

The first indication information indicates the CS to send information about a target DN to the UE when a user plane path of a PDU session of the UE changes.

Optionally, in this embodiment, a change of the user plane path of the PDU session of the UE includes re-establishment of the PDU session of the UE. When the PDU session of the UE is re-established, a handover of a data network accessed by the UE may correspondingly occur.

Optionally, the CS in this embodiment may be the ECS in FIG. 2, and the DN may be the EDN in FIG. 2.

Optionally, in this embodiment, an SSC mode of the PDU session of the UE may be an SSC mode 3.

S1502: The CS receives the first indication information.

S1503: The UE sends second indication information to the CS.

The second indication information indicates that the PDU session of the UE is re-established. Optionally, the second indication information includes first information. S1504: The CS receives the second indication information.

S1505: The CS determines the target DN based on the first information.

For example, the CS may determine the target DN based on the first information included in the second indication information. For example, the first information is a DNAI of the UE.

Optionally, when the second indication information does not include the first information or the first information included in the second indication information is an IP address of the UE, the CS may query a PCF entity or an SMF entity for a DNAI after receiving the second indication information, and determine the target DN based on the DNAI.

S1506: The CS sends the information about the target DN to the UE.

S1507: The UE receives the information about the target DN, and establishes a connection to the target DN.

It should be noted that an execution sequence of steps S1501 to S1507 is not limited in this application. FIG. 15 is merely an example for description.

It may be understood that a difference between the embodiment shown in FIG. 14 and the embodiment shown in FIG. 15 lies in: In the embodiment shown in FIG. 14, the CS subscribes to the user plane management event notification from the PCF entity or the SMF entity to learn that the PDU session of the UE is re-established; in the embodiment shown in FIG. 15, the UE sends the indication information to the CS after re-establishing the session, to notify the CS that the PDU session of the UE is re-established. In other words, the difference between the embodiment shown in FIG. 14 and the embodiment shown in FIG. 15 lies in different manners in which the CS learns that the PDU session of the UE is re-established.

In this embodiment, the UE indicates the CS to send the information about the target DN to the UE when the PDU session of the UE is re-established, and notifies the CS when the PDU session of the UE is re-established, such that the CS can determine the target DN and send the information about the target DN to the UE, to enable the UE to access the target DN.

Figure 16:
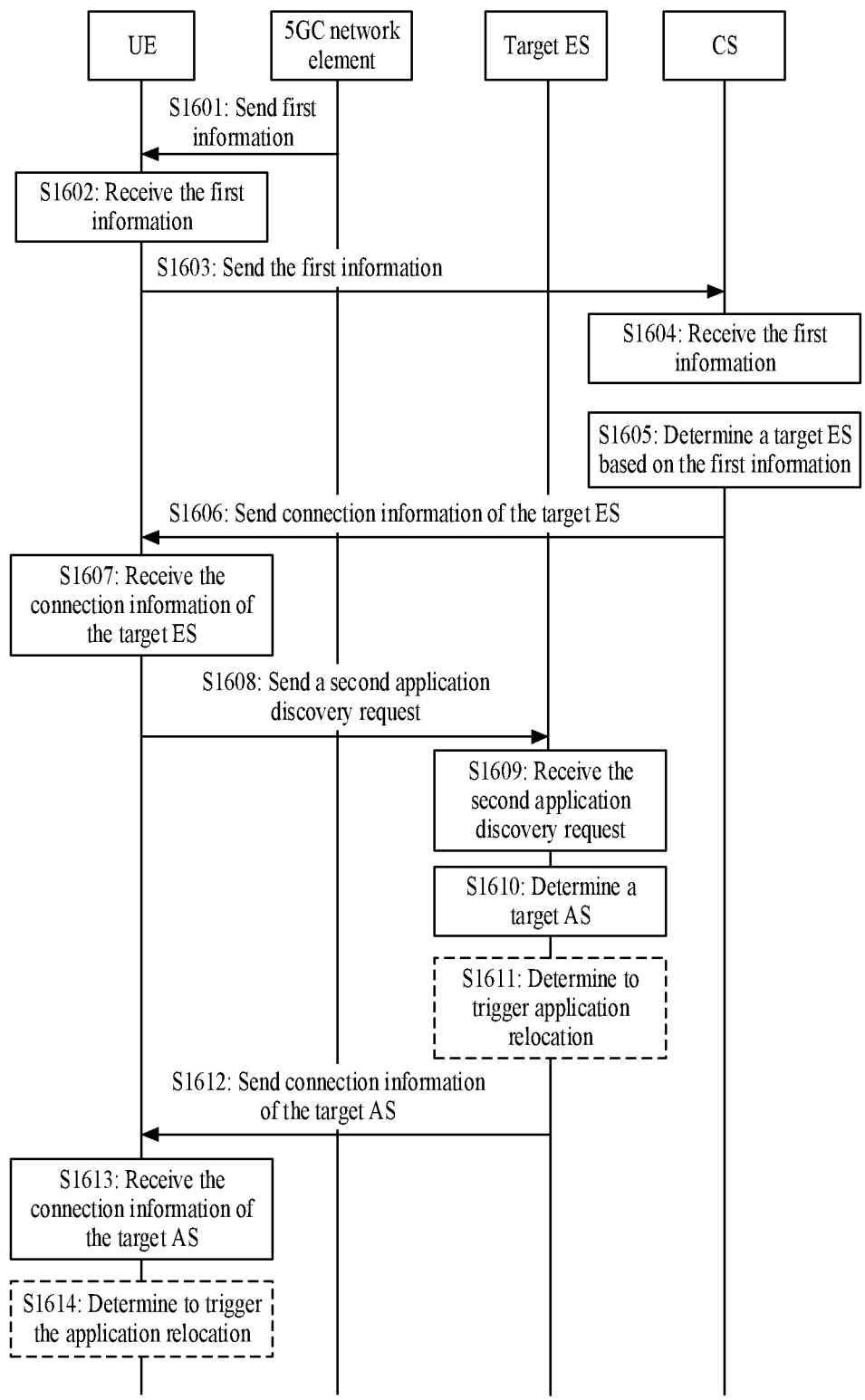
FIG. 16 is a schematic flowchart of another application relocation method according to an embodiment of this application.

FIG. 16 is a schematic flowchart of an application relocation method according to an embodiment of this application. The method relates to interaction between a target ES, a CS, a 5GC network element (for example, an SMF, a UPF, or another entity that can assign an IP address), and UE (which may include an AC, an EEC, an OS, and the like), and includes the following steps.

S1601: The 5GC network element sends first information to the UE.

For example, the 5GC network element may be the SMF entity, the UPF entity, or the other network element that can assign the IP address.

In an implementation, an SSC mode of a session established by the UE is a mode 3. The UE obtains a new IP address from the 5GC network element when re-establishing a new session or creating a multi-homed session. The new IP address may be an IP address that is of the UE and that is obtained after the UE re-establishes the PDU session or an IP address that is of the UE and that corresponds to an anchor UPF newly inserted when the SSC mode 3 is implemented using a multi-homed session creation mechanism. The new IP address may be assigned by the SMF entity, the UPF entity, a DN-AAA, or another entity. This is not limited in this application. Optionally, the 5GC network element (for example, the SMF network element) may further send, to the UE, a DNAI corresponding to an anchor UPF of the new session or a DNAI corresponding to the newly inserted anchor UPF of the multi-homed session.

It may be understood that for descriptions of the first information, refer to the foregoing embodiments. Details are not described herein again.

S1602: The UE receives the first information.

For example, in step S1602, the EEC module in the UE, the AC module in the UE, or the OS in the UE may receive the first information. This is not limited in this application.

S1603: The UE sends the first information to the CS.

For example, the first information may be included in a service provisioning request.

Optionally, in an implementation, the EEC module in the UE may send the first information to the CS.

S1604: The CS receives the first information.

S1605: The CS determines a target ES based on the first information.

In a first implementation, the UE sends the new IP address to the CS. The CS may determine the target ES if a mapping relationship between an IP address (segment) and a target ES or a DN is configured on the CS, where the target ES serves a target DN.

In a second implementation, the UE sends the new IP address to the CS, and the CS may send a request to the 5GC network element, where the request includes the new IP address, and the request is for obtaining, based on the IP address of the UE, the DNAI corresponding to the anchor UPF of the new session of the UE or the DNAI corresponding to the newly inserted anchor UPF of the multi-homed session. The CS may determine the target ES if a mapping relationship between a DNAI and a target ES or a DN is configured on the CS.

In a third implementation, the UE sends, to the CS, the DNAI corresponding to the anchor UPF of the new session or the DNAI corresponding to the newly inserted anchor UPF of the multi-homed session. The CS may determine the target ES if a mapping relationship between a DNAI and a target ES or a DN is configured on the CS. Compared with the second implementation, this implementation can omit a process of querying the 5GC network element for the DNAI.

S1606: The CS sends connection information of the target ES to the UE.

Optionally, the CS may alternatively send the connection information of the target ES to the UE in step S1605. The connection information of the target ES includes address information of the target ES, and the connection information of the target ES may be an IP address of the target ES, a URI of the target ES, a URL of the target ES, an end point of the target ES, or the like.

S1607: The UE receives the connection information of the target ES.

Optionally, in step S1606, the EEC module in the UE may receive the connection information of the target ES.

S1608: The UE sends a second application discovery request to the target ES.

The second application discovery request requests to obtain a target AS.

In an implementation, the EEC module in the UE sends the second application discovery request to the target ES. Optionally, the second application discovery request includes the new IP address.

Optionally, the second application discovery request includes an application identifier of a source AS.

Optionally, the second application discovery request includes the first information.

S1609: The target ES receives the second application discovery request.

S1610: The target ES determines the target AS.

Optionally, the target ES may determine the target AS based on the first information. For details of determining the target AS by the target ES based on the first information, refer to the process of determining the target AS in S602. The details are not described herein again. It may be understood that the target AS determined by the target ES based on the first information has the same application identifier as the source AS.

S1611: Optionally, the target ES determines to trigger application relocation.

In an implementation, the target ES determines, based on the received new IP address and the second application discovery request, that the application relocation needs to be performed, and the target ES may send connection information of the target AS to a source ES or the source AS.

Optionally, if the target ES determines to trigger the application relocation, the target ES may send the connection information of the target AS to the UE.

S1612: The target ES sends the connection information of the target AS to the UE.

Optionally, the target ES may alternatively send the connection information of the target AS to the UE. The connection information of the target AS includes address information of the target AS, and the connection information of the target AS may be an IP address, a URI, a URL, an end point, or the like.

S1613: The UE receives the connection information of the target AS.

In an implementation, the EEC module in the UE receives the connection information of the target AS.

S1614: Optionally, the UE determines to trigger the application relocation.

In an implementation, after receiving the connection information of the target AS, the EEC module in the UE determines that the application relocation needs to be performed.

In an implementation, the source AS directly sends an application context to the target AS.

In another implementation, the source AS sends an application context to the source ES, the source ES sends the context to the target ES, and then the target ES sends the context to the target AS.

It may be understood that in this embodiment of this application, the target ES, the UE, or another network device may determine to trigger the application relocation. This is not limited in this embodiment of this application.

It should be noted that an execution sequence of steps S1601 to S1614 is not limited in this application. FIG. 16 is merely an example for description.

It may be understood that in the application relocation method provided in this embodiment of this application, for the session in the SSC mode 3, when the PDU session of the UE is re-established, the UE receives the first information from the 5GC network element, the UE sends the first information to the CS, and the CS determines, based on the first information, to obtain the target ES, such that the UE can obtain the connection information of the target AS from the target ES. In the method, the target ES determined based on location information of the UE after a user plane path of the PDU session of the UE changes is accurate, and the target AS determined based on the target ES is accurate. Therefore, a delay in accessing the target AS by the UE is short. In addition, in the method, the target ES or the EEC triggers reselection of the target AS and the application relocation, and the AC in the UE is not modified. Therefore, the AC does not need to understand network logic, and a design of the AC can be simplified.

Figure 17A:
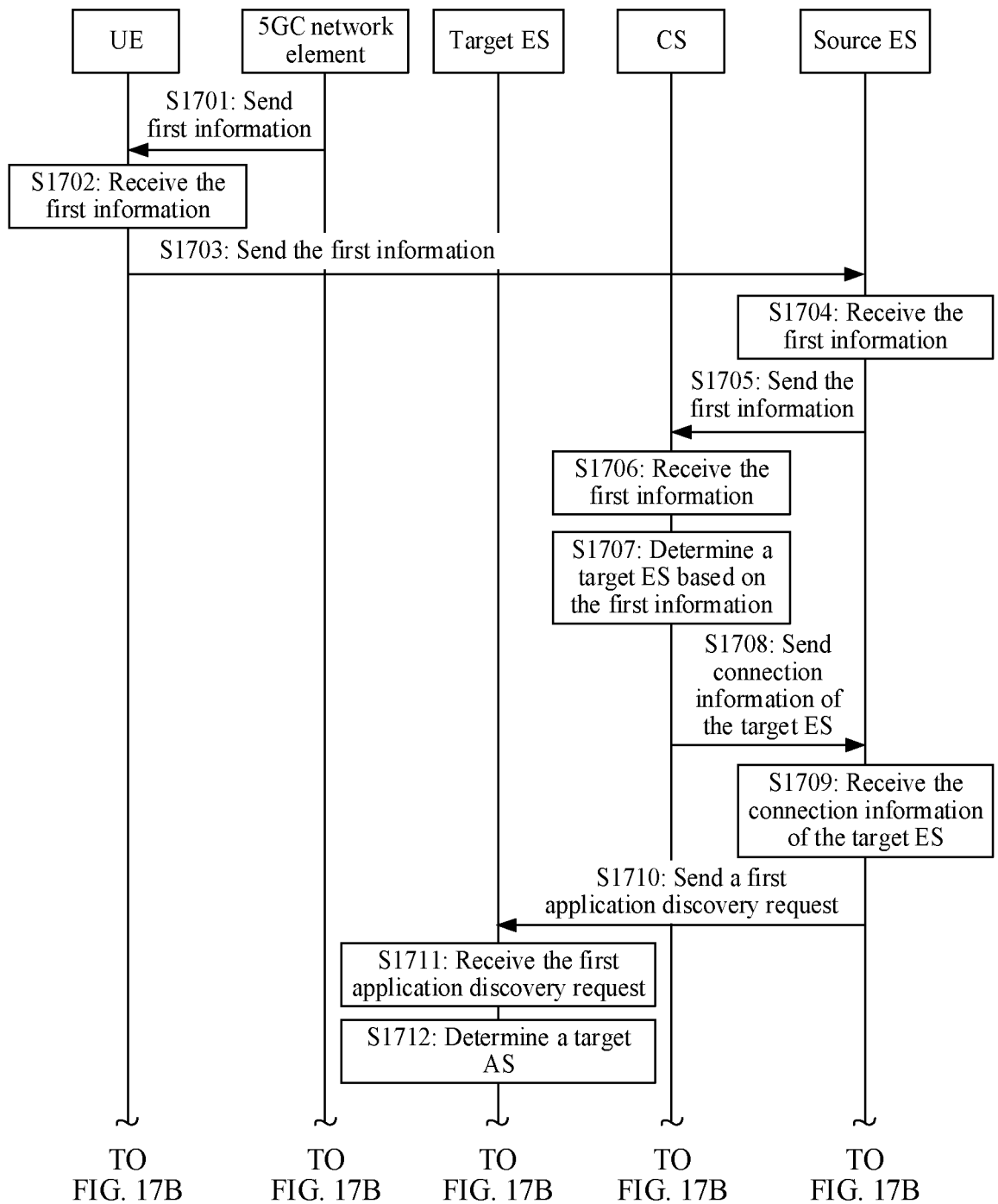
FIG. 17A and FIG. 17B are a schematic flowchart of another application relocation method according to an embodiment of this application.
Figure 17B:
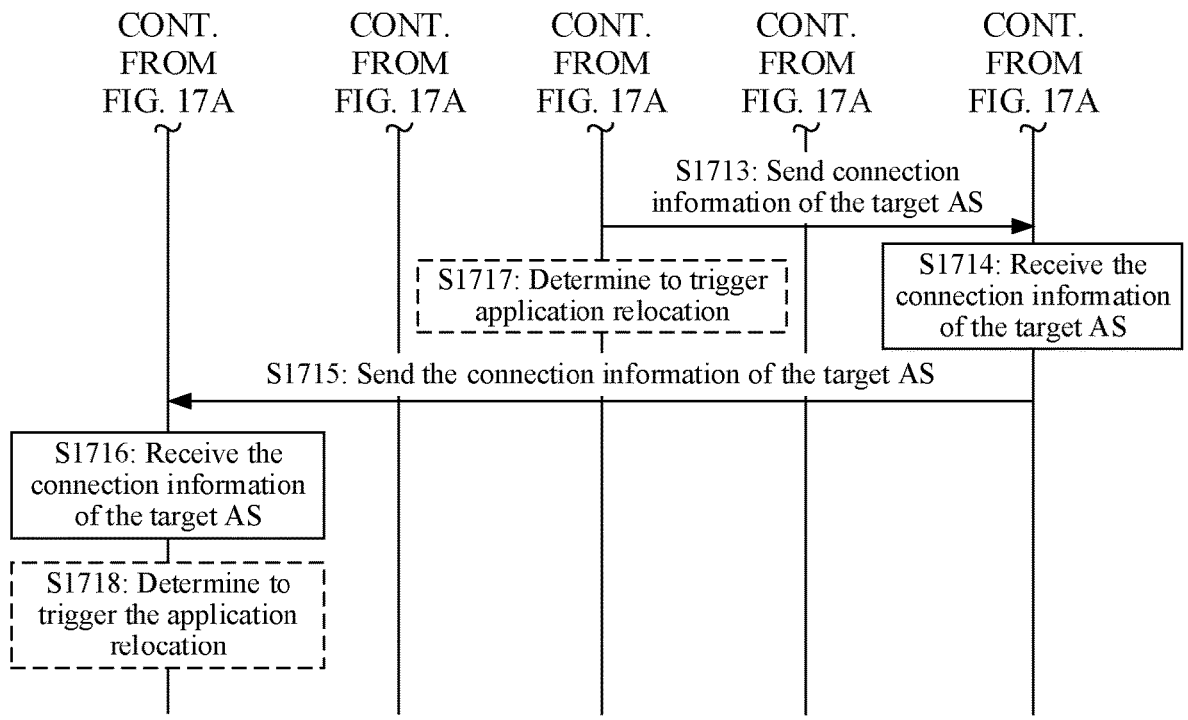

FIG. 17A and FIG. 17B are a schematic flowchart of an application relocation method according to an embodiment of this application. The method relates to interaction between a source ES, a target ES, a CS, a 5GC network element (for example, an SMF, a UPF, or another entity that can assign an IP address), and UE (which may include an AC, an EEC, an OS, and the like), and includes the following steps.

S1701: The 5GC network element sends first information to the UE.

It may be understood that for descriptions of the first information, refer to the foregoing embodiments. Details are not described herein again.

S1702: The UE receives the first information.

For example, in step S1702, the EEC module in the UE, the AC module in the UE, or the OS in the UE may receive the first information. This is not limited in this application.

It may be understood that, for implementations of steps S1701 and S1702, refer to the implementations of steps S1601 and S1602. Details are not described herein again.

S1703: The UE sends the first information to the source ES.

Optionally, in an implementation, the EEC module in the UE may send the first information to the source ES.

Optionally, the first information may be included in a request message, and the request message may be an application server discovery request message.

S1704: The source ES receives the first information.

S1705: The source ES sends the first information to the CS.

Optionally, the first information sent by the source ES to the CS may be included in the request message, and the request message is for obtaining the target ES from the CS.

S1706: The CS receives the first information.

S1707: The CS determines the target ES based on the first information.

It may be understood that, for an example implementation in which the CS determines the target ES based on the first information in step S1707, refer to the implementation in step S1605. Details are not described herein again.

S1708: The CS sends connection information of the target ES to the source ES.

S1709: The source ES receives the connection information of the target ES.

S1710: The source ES sends a first application discovery request to the target ES.

The first application discovery request requests to obtain a target AS.

Optionally, the first application discovery request includes the first information. The first application discovery request is for obtaining the target AS from the target ES.

Optionally, the first application discovery request includes an application identifier of a source AS.

S1711: The target ES receives the first application discovery request.

S1712: The target ES determines the target AS.

Optionally, the target ES may determine the target AS based on the first information. For example, the target ES may determine the target AS based on the first information and application identification information. For details of determining the target AS by the target ES based on the first information, refer to the process of determining the target AS in S602. The details are not described herein again.

Optionally, the target ES may alternatively determine the target ES based on only the application identification information. The application identification information is identification information of an application corresponding to the source AS.

S1713: The target ES sends connection information of the target AS to the source ES.

Optionally, the target ES may directly send the connection information of the target AS to the UE; or the target ES may send the connection information of the target AS to the CS, and the CS sends the connection information of the target AS to the UE.

S1714: The source ES receives the connection information of the target AS.

S1715: The source ES sends the connection information of the target AS to the UE.

S1716: The UE receives the connection information of the target AS.

In an implementation, the EEC module in the UE receives the connection information of the target AS.

S1717: Optionally, the target ES determines that application relocation needs to be performed.

In an implementation, the target ES determines, based on a received new IP address and the first application discovery request, that the application relocation needs to be performed, and then the target ES sends the connection information of the target AS to the source ES or the source AS.

S1718: Optionally, the UE determines that the application relocation needs to be performed.

In an implementation, after receiving the connection information of the target AS, the EEC module in the UE determines that the application relocation needs to be performed.

In an implementation, the source AS directly sends an application context to the target AS.

In another implementation, the source AS sends an application context to the source ES, the source ES sends the context to the target ES, and then the target ES sends the context to the target AS.

It should be noted that an execution sequence of steps S1701 to S1718 is not limited in this application. FIG. 17A and FIG. 17B are merely an example for description.

It may be understood that in the application relocation method provided in this embodiment of this application, for a session in an SSC mode 3, when the PDU session of the UE is re-established, the UE receives the first information from the 5GC network element, the UE sends the first information to the source ES, the source ES sends the first information to the CS, the CS determines the target ES based on the first information, and the source ES may obtain the connection information of the target AS from the target ES, and send the connection information of the target AS to the UE. In the method, the target ES determined based on location information of the UE after a user plane path of the PDU session of the UE changes is accurate, and the target AS determined based on the target ES is accurate. Therefore, a delay in accessing the target AS by the UE is short. In addition, in the method, the target ES or the EEC triggers reselection of the target AS and the application relocation, and the AC in the UE is not modified. Therefore, the AC does not need to understand network logic, and a design of the AC can be simplified.

The foregoing describes, mainly from the perspective of method steps, the solutions provided in embodiments of this application. It may be understood that, to implement the foregoing functions, a computer includes a hardware structure and/or a software module for performing a corresponding function. A person skilled in the art should be easily aware that, in combination with units and algorithm steps of the examples described in embodiments disclosed in this specification, this application may be implemented by a combination of hardware and computer software. A person skilled in the art may use different methods to implement the described functions for each particular application, but it should not be considered that the implementation goes beyond the scope of this application.

In embodiments of this application, the computer may be divided into functional modules based on the foregoing method examples. For example, each functional module may be obtained through division based on each function, or two or more functions may be integrated into one processing module. The integrated module may be implemented by hardware, or may be implemented by a software functional module. It should be noted that, in embodiments of this application, division into modules is an example, and is merely a logical function division. During actual implementation, another division manner may be used.

Figure 18:
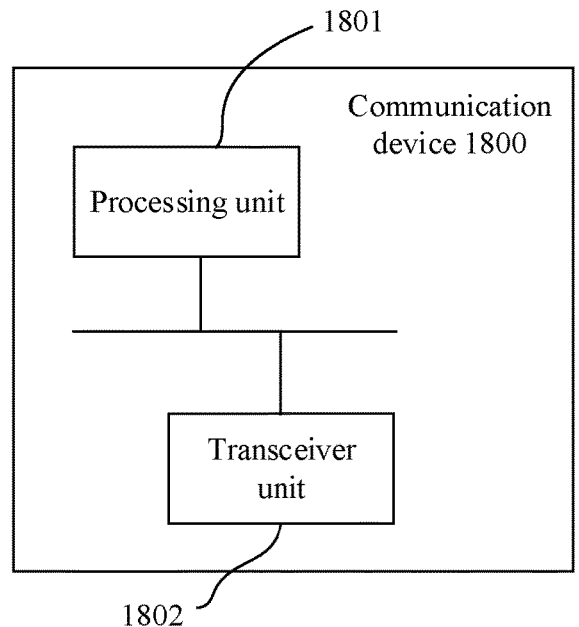
FIG. 18 is a schematic composition diagram of a communication device according to an embodiment of this application.

FIG. 18 is a schematic diagram of a structure of a communication device 1800. The communication device may be the source AS above, or may be a chip in the source AS. The communication device 1800 may be configured to implement the method and the function related to the source AS in any one of the foregoing embodiments.

The communication device 1800 includes a processing unit 1801 and a transceiver unit 1802. For example, the transceiver unit 1802 may be configured to support the source AS in communicating with the source ES, the PCF entity/SMF entity, or the UE in the foregoing embodiments. The processing unit 1801 is configured to control and manage an action of the source AS, and perform processing performed by the source AS in the foregoing embodiments. Optionally, if the communication device 1800 includes a storage unit, the processing unit 1801 may further execute a program or instructions stored in the memory, such that the communication device 1800 implements the method and the function in any one of the foregoing embodiments.

For example, the processing unit 1801 may be configured to perform steps S602 and S603 in FIG. 6, steps S704 and S705 in FIG. 7, steps S907 and S908 in FIG. 9, steps S1009 and S1010 in FIG. 10, trigger of application relocation in step S1212 in FIG. 12, or steps S1307 and S1312 in FIG. 13, and/or perform another process of the technology described in this specification. For example, the transceiver unit 1802 may be configured to perform step S601 in FIG. 6, steps S701, S703, and S706 in FIG. 7, steps S901, S906, and S909 in FIG. 9, steps S1001, S1008, and S1011 in FIG. 10, receiving of connection information of a target AS in step S1212 in FIG. 12, or steps S1301, S1306, S1308, S1311, and S1313 in FIG. 13, and/or perform another process of the technology described in this specification. All related content of the steps in the foregoing method embodiments may be cited in function descriptions of the corresponding functional modules. Details are not described herein again.

For example, the communication device 1800 may be the communication apparatus shown in FIG. 5, the processing unit 1801 may be the processor 501 in FIG. 5, and the transceiver unit 1802 may be the transceiver 503 in FIG. 5. Optionally, the communication device 1800 may further include a memory, and the memory is configured to store corresponding program code and data for performing any one of the foregoing application relocation methods by the communication device 1800. All descriptions of related content of the components in FIG. 5 may be cited in function descriptions of the corresponding components of the communication device 1800. Details are not described herein again.

Figure 19:
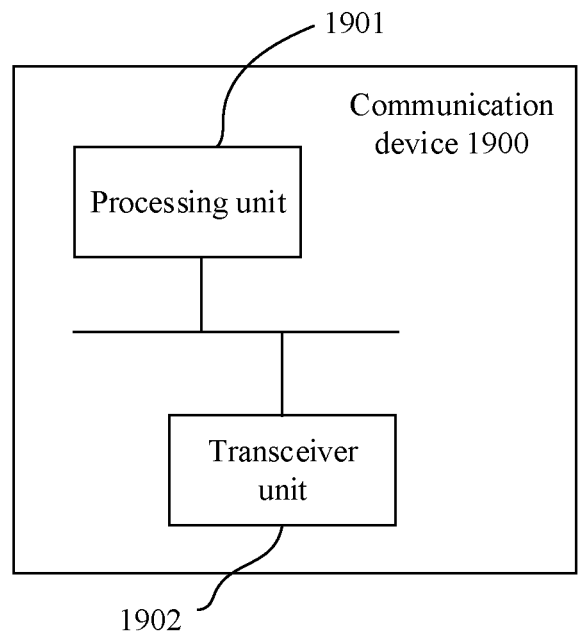
FIG. 19 is a schematic composition diagram of another communication device according to an embodiment of this application.

FIG. 19 is a schematic diagram of a structure of a communication device 1900. The communication device may be the source ES above, or may be a chip in the source ES. The communication device 1900 may be configured to implement the method and the function related to the source ES in any one of the foregoing embodiments.

The communication device 1900 includes a processing unit 1901 and a transceiver unit 1902. For example, the transceiver unit 1902 may be configured to support the source ES in communicating with the source AS, the PCF entity/SMF entity, or the UE in the foregoing embodiments. The processing unit 1901 is configured to control and manage an action of the source ES, and perform processing performed by the source ES in the foregoing embodiments. Optionally, if the communication device 1900 includes a storage unit, the processing unit 1901 may further execute a program or instructions stored in the memory, such that the communication device 1900 implements the method and the function in any one of the foregoing embodiments.

For example, the processing unit 1901 may be configured to perform step S602 in FIG. 6, steps S804 and S805 in FIG. 8, or steps S1106 and S1107 in FIG. 11, and/or perform another process of the technology described in this specification. For example, the transceiver unit 1902 may be configured to perform steps S601 and S603 in FIG. 6, steps S801, S803, and S806 in FIG. 8, steps S902, S904, and S905 in FIG. 9, steps S1006 and S1007 in FIG. 10, steps S1105 and S1108 in FIG. 11, steps S1302, S1304, and S1305 in FIG. 13, or steps S1704, S1705, S1709, S1710, S1714, and S1715 in FIG. 17A and FIG. 17B, and/or perform another process of the technology described in this specification. All related content of the steps in the foregoing method embodiments may be cited in function descriptions of the corresponding functional modules. Details are not described herein again.

For example, the communication device 1900 may be the communication apparatus shown in FIG. 5, the processing unit 1901 may be the processor 501 in FIG. 5, and the transceiver unit 1902 may be the transceiver 503 in FIG. 5. Optionally, the communication device 1900 may further include a memory, and the memory is configured to store corresponding program code and data for performing any one of the foregoing application relocation methods by the communication device 1900. All descriptions of related content of the components in FIG. 5 may be cited in function descriptions of the corresponding components of the communication device 1900. Details are not described herein again.

Figure 20:
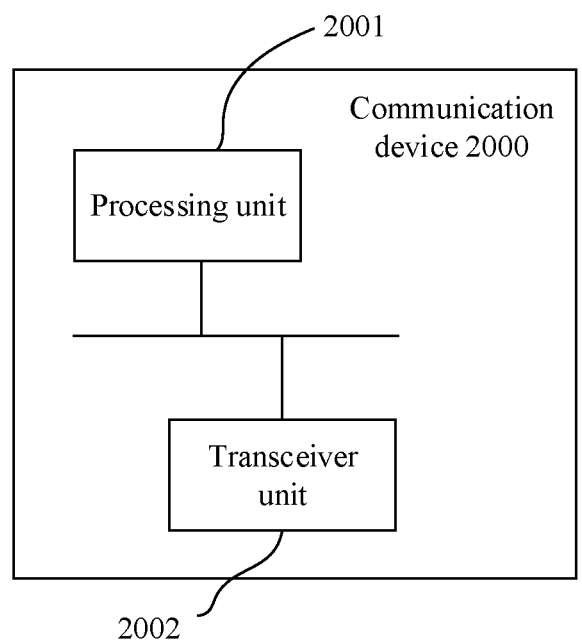
FIG. 20 is a schematic composition diagram of another communication device according to an embodiment of this application.

FIG. 20 is a schematic diagram of a structure of a communication device 2000. The communication device 2000 may be the UE above, or may be a chip in the UE. The communication device 2000 may be configured to implement the method and the function related to the UE in any one of the foregoing embodiments.

The communication device 2000 includes a processing unit 2001 and a transceiver unit 2002. For example, the transceiver unit 2002 may be configured to support the UE in communicating with the source ES, the source AS, and the target ES in the foregoing embodiments. The processing unit 2001 is configured to control and manage an action of the UE, and perform processing performed by the UE in the foregoing embodiments. Optionally, if the communication device 2000 includes a storage unit, the processing unit 2001 may further execute a program or instructions stored in the memory, such that the communication device 2000 implements the method and the function in any one of the foregoing embodiments.

For example, the processing unit 2001 may be configured to perform establishment of a connection to a target AS in FIG. 6 to FIG. 13, establishment of a connection to a target DN in FIG. 14 or FIG. 15, step S1204 and determining, based on a first message, a target AS from one or more ASs managed by a target ES in step S1208 in FIG. 12, step S1614 in FIG. 16, or step S1708 in FIG. 17A and FIG. 17B, and/or perform another process of the technology described in this specification. For example, the transceiver unit 2002 may be configured to perform receiving of connection information of a target AS, step S1005 in FIG. 10, step S1104 in FIGS. 11, S1201 to S1203, S1205, receiving of a first message in step S1208, S1209, and S1211 in FIG. 12, step S1401 and receiving of information about a target DN in step S1408 in FIG. 14, step S1501, step S1503, and receiving information about a target DN in step S1507 in FIG. 15, steps S1602, S1603, S1607, S1608, and S1612 in FIG. 16, or steps S1702, S1703, and S1716 in FIG. 17A and FIG. 17B, and/or perform another process of the technology described in this specification. All related content of the steps in the foregoing method embodiments may be cited in function descriptions of the corresponding functional modules. Details are not described herein again.

For example, the communication device 2000 may be the communication apparatus shown in FIG. 5, the processing unit 2001 may be the processor 501 in FIG. 5, and the transceiver unit 2002 may be the transceiver 503 in FIG. 5. Optionally, the communication device 2000 may further include a memory, and the memory is configured to store corresponding program code and data for performing any one of the foregoing application relocation methods by the communication device 2000. All descriptions of related content of the components in FIG. 5 may be cited in function descriptions of the corresponding components of the communication device 2000. Details are not described herein again.

Figure 21:
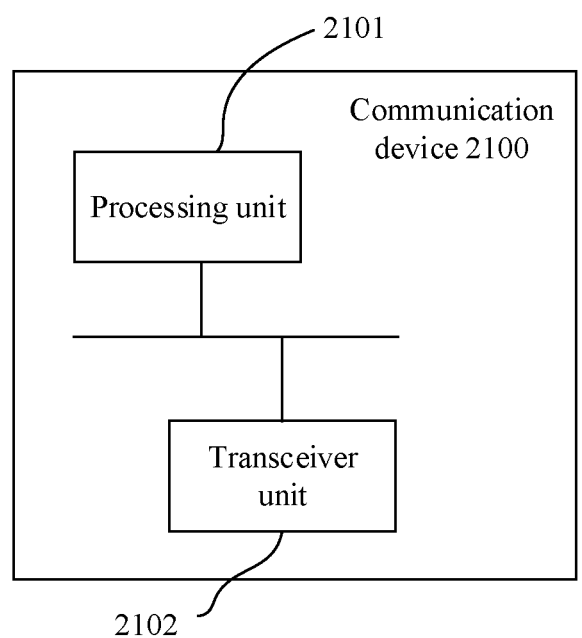
FIG. 21 is a schematic composition diagram of another communication device according to an embodiment of this application.

FIG. 21 is a schematic diagram of a structure of a communication device 2100. The communication device may be the CS above, or may be a chip in the CS. The communication device 2100 may be configured to implement the method and the function related to the CS in any one of the foregoing embodiments.

The communication device 2100 includes a processing unit 2101 and a transceiver unit 2102. For example, the transceiver unit 2102 may be configured to support the CS in communicating with the PCF entity, the SMF entity, or the UE in the foregoing embodiments. The processing unit 2101 is configured to control and manage an action of the CS, and perform processing performed by the CS in the foregoing embodiments. Optionally, if the communication device 2100 includes a storage unit, the processing unit 2101 may further execute a program or instructions stored in the memory, such that the communication device 2100 implements the method and the function in any one of the foregoing embodiments.

For example, the processing unit 2101 may be configured to perform step S1406 in FIG. 14, step S1505 in FIG. 15, step S1605 in FIG. 16, or step S1707 in FIG. 17A and FIG. 17B, and/or perform another process of the technology described in this specification. For example, the transceiver unit 2102 may be configured to perform steps S1402, S1403, S1405, and S1407 in FIG. 14, steps S1502, S1504, and S1506 in FIG. 15, steps S1604 and S1606 in FIG. 16, or steps S1706 and S1708 in FIG. 17A and FIG. 17B, and/or perform another process of the technology described in this specification. All related content of the steps in the foregoing method embodiments may be cited in function descriptions of the corresponding functional modules. Details are not described herein again.

For example, the communication device 2100 may be the communication apparatus shown in FIG. 5, the processing unit 2101 may be the processor 501 in FIG. 5, and the transceiver unit 2102 may be the transceiver 503 in FIG. 5. Optionally, the communication device 2100 may further include a memory, and the memory is configured to store corresponding program code and data for performing any one of the foregoing application relocation methods by the communication device 2100. All descriptions of related content of the components in FIG. 5 may be cited in function descriptions of the corresponding components of the communication device 2100. Details are not described herein again.

For example, an embodiment of this application further provides an application relocation apparatus. The application relocation apparatus includes a processor. The processor is configured to execute computer-executable instructions, to support the application relocation apparatus in implementing the application relocation method in any one of the embodiments in FIG. 6 to FIG. 17A and FIG. 17B. Optionally, the application relocation apparatus may further include a transceiver and a memory. The transceiver is configured to send and receive information, or is configured to communicate with another network element. The memory is configured to store the computer-executable instructions.

An embodiment of this application further provides a computer storage medium. The computer storage medium stores computer program code. When the foregoing processor executes the computer program code, an electric device performs the application relocation method in any one of the embodiments in FIG. 6 to FIG. 17A and FIG. 17B.

An embodiment of this application further provides a computer program product. When the computer program product runs on a computer, the computer is enabled to perform the application relocation method in any one of the embodiments in FIG. 6 to FIG. 17A and FIG. 17B.

An embodiment of this application further provides a communication system. The communication system includes a source AS, a source enabler server ES, and UE. The source AS subscribes to a user plane management event notification from the source ES, where the user plane management event notification notifies the source AS when a user plane path of a PDU session of the UE changes, and the source AS is an AS that the UE accesses before the user plane path of the PDU session changes. The source ES obtains first information, where the first information is location information that is of the UE and that is obtained after the user plane path of the PDU session of the UE changes. The source ES sends a second notification message to the source AS, where the second notification message notifies the source AS that the user plane path of the PDU session of the UE changes, and the second notification message includes the first information. The source AS determines a target AS based on the first information, and triggers application relocation, where the application relocation means relocating the UE from the source AS to the target AS. The source AS sends connection information of the target AS to the UE. The UE receives the connection information of the target AS, and establishes a connection to the target AS.

An embodiment of this application further provides a system-on-a-chip. The system-on-a-chip includes a processor and a memory. The memory stores instructions. When the instructions are executed by the processor, the application relocation method in any one of the embodiments in FIG. 6 to FIG. 17A and FIG. 17B is implemented.

The steps of the methods or algorithms described with reference to content disclosed in this application may be implemented by hardware, or may be implemented by a processor by executing software instructions. The software instructions may include a corresponding software module. The software module may be stored in a random access memory (RAM), a flash memory, an erasable programmable read-only memory (EPROM), an electrically erasable programmable read-only memory (EPROM), an electrically erasable programmable read-only memory (EEPROM), a register, a hard disk, a removable hard disk, a compact disc read-only memory (CD-ROM), or any other form of storage medium well-known in the art. For example, a storage medium is coupled to the processor, such that the processor can read information from the storage medium and write information into the storage medium. Certainly, the storage medium may be a component of the processor. The processor and the storage medium may be located in an ASIC. In addition, the ASIC may be located in a core network interface device. Certainly, the processor and the storage medium may alternatively exist as discrete components in the core network interface device.

A person skilled in the art should be aware that in the foregoing one or more examples, functions described in this application may be implemented by hardware, software, firmware, or any combination thereof. When being implemented by software, the functions may be stored in a computer-readable medium or transmitted as one or more instructions or code in the computer-readable medium. The computer-readable medium includes a computer storage medium and a communication medium, where the communication medium includes any medium that enables a computer program to be transmitted from one place to another. The storage medium may be any available medium accessible to a general-purpose or a special-purpose computer.

The objectives, technical solutions, and beneficial effects of this application are further described in detail in the foregoing implementations. It should be understood that the foregoing descriptions are merely example implementations of this application, and are not intended to limit the protection scope of this application. Any modification, equivalent replacement, or improvement made based on the technical solutions of this application shall fall within the protection scope of this application.

What is claimed is:

1. An application relocation method, comprising:
sending, by a source application server (AS), a subscription request to a source enabler server (ES), wherein the subscription request indicates to notify the source AS when the source ES determines that a target AS exists;
receiving, by the source ES, the subscription request;
obtaining, by the source ES, location information of a user equipment (UE), after a user plane path of a protocol data unit (PDU) session of the UE changes;
determining, by the source ES, the target AS based on the location information;
sending, by the source ES, a notification message to the source AS, wherein the notification message indicates that the target AS exists, and wherein the notification message comprises connection information of the target AS;
receiving, by the source AS, the notification message; and
determining, by the source AS, to relocate a context of the UE from the source AS to the target AS.

2. The application relocation method according to claim 1, wherein the target AS and the source AS serve a same application.

3. The application relocation method according to claim 1, wherein the location information of the UE comprises at least one of an Internet Protocol (IP) address of the UE, a data network access identifier (DNAI) corresponding to the user plane path of the PDU session-of-the-UE, a tracking area identity (TAI) of the UE, a cell identifier of the UE, a radio access network identifier of the UE, or geographic location information of the UE.

4. The application relocation method according to claim 1, wherein obtaining the location information comprises receiving, by the source ES, a third notification message from a policy control function (PCF) entity or a session management function (SMF) entity, wherein the third notification message notifies the source ES that the user plane path of the PDU session of the UE has changed, and wherein the third notification message comprises the location information.

5. The application relocation method according to claim 4, further comprising subscribing, by the source ES, to a user plane management event notification from the PCF entity or the SMF entity, wherein the user plane management event notification notifies the source ES when the user plane path of the PDU session of the UE changes.

6. The application relocation method according to claim 1, further comprising sending, by the source AS, an application relocation request message to the target AS, wherein the application relocation request message is for relocating the context from the source AS to the target AS.

7. The application relocation method according to claim 6, further comprising receiving, by the source AS, an application relocation response message from the target AS, wherein the application relocation response message comprises third indication information indicating whether the target AS agrees to application relocation.

8. The application relocation method according to claim 7, wherein determining to relocate the context of the UE comprises determining, by the source AS, to relocate the context of the UE from the source AS to the target AS when the third indication information indicates that the target AS agrees application relocation.

9. A communications system, comprising:
a source application server (AS) configured to send a subscription request, wherein the subscription request indicates to notify the source AS when a target AS exists; and
a source enabler server (ES) configured to:
receive the subscription request from the source AS;
obtain location information of a user equipment (UE) after a user plane path of a protocol data unit (PDU) session of the UE changes;
determine the target AS based on the location information; and
send a notification message to the source AS, wherein the notification message indicates that the target AS exists, and wherein the notification message comprises connection information of the target AS,
wherein the source AS is further configured to:
receive the notification message; and
determine to relocate a context of the UE from the source AS to the target AS.

10. The communications system according to claim 9, wherein the target AS and the source AS serve a same application.

11. The communications system according to claim 9, wherein the location information of the UE comprises an Internet Protocol (IP) address of the UE.

12. The communications system according to claim 9, wherein the source ES is further configured to receive a third notification message from a policy control function (PCF) entity or a session management function (SMF) entity, wherein the third notification message notifies the source ES that the user plane path of the PDU session of the UE changes, and wherein the third notification message comprises the location information.

13. The communications system according to claim 12, wherein the source ES is further configured to subscribe to a user plane management event notification from the PCF entity or the SMF entity, and wherein the user plane management event notification notifies the source ES when the user plane path of the PDU session of the UE changes.

14. The communications system according to claim 9, wherein the source AS is further configured to: send an application relocation request message to the target AS, and wherein the application relocation request message is for relocating the context on the source AS to the target AS.

15. The communications system according to claim 14, wherein the source AS is further configured to receive an application relocation response message from the target AS, wherein the application relocation response message comprises third indication information, and wherein the third indication information indicates whether the target AS agrees to application relocation.

16. The communications system according to claim 15, wherein the source AS is further configured to determine to relocate the context of the UE from the source AS to the target AS when the third indication information indicates that the target AS agrees to application relocation.

17. The communications system according to claim 9, wherein the location information of the UE comprises a data network access identifier (DNAI) corresponding to the user plane path of the PDU session of the UE.

18. The communications system according to claim 9, wherein the location information of the UE comprises a tracking area identity (TAI) of the UE.

19. The communications system according to claim 9, wherein the location information of the UE comprises a cell identifier of the UE.

20. The communications system according to claim 9, wherein the location information of the UE comprises a radio access network identifier of the UE.

* * * * *

UNITED STATES PATENT AND TRADEMARK OFFICE
CERTIFICATE OF CORRECTION

| | | |
|---|---|---|
| PATENT NO. | : 12,445,821 B2 | Page 1 of 1 |
| APPLICATION NO. | : 18/167476 | |
| DATED | : October 14, 2025 | |
| INVENTOR(S) | : Qi Yao and Zaifeng Zong | |

It is certified that error appears in the above-identified patent and that said Letters Patent is hereby corrected as shown below:

In the Claims

Claim 3, Column 62, Line 58: "PDU session-of-the-UE, a tracking" should read "PDU session, a tracking"

Signed and Sealed this
Twenty-fifth Day of November, 2025

John A. Squires
*Director of the United States Patent and Trademark Office*